(12) United States Patent
Zhao et al.

(10) Patent No.: US 10,876,584 B2
(45) Date of Patent: Dec. 29, 2020

(54) WHEEL MODULE

(71) Applicant: MINEBEA MITSUMI Inc., Nagano (JP)

(72) Inventors: Shen Zhao, Yokohama (JP); Hiroyuki Furusaki, Minato (JP); Takanobu Koyama, Fujisawa (JP)

(73) Assignee: MINEBEA MITSUMI INC., Nagano (JP)

(*) Notice: Subject to any disclaimer, the term of this patent is extended or adjusted under 35 U.S.C. 154(b) by 64 days.

(21) Appl. No.: 16/152,757

(22) Filed: Oct. 5, 2018

(65) Prior Publication Data

US 2019/0040921 A1 Feb. 7, 2019

Related U.S. Application Data

(63) Continuation of application No. PCT/JP2017/015172, filed on Apr. 13, 2017.

(30) Foreign Application Priority Data

Apr. 15, 2016 (JP) .................................. 2016-082470
Sep. 27, 2016 (JP) .................................. 2016-188853

(51) Int. Cl.
*F16D 55/08* (2006.01)
*F16D 65/18* (2006.01)
(Continued)

(52) U.S. Cl.
CPC ............... *F16D 55/08* (2013.01); *B60K 7/00* (2013.01); *B60K 7/0007* (2013.01); *F16D 55/00* (2013.01);
(Continued)

(58) Field of Classification Search
CPC .......... F16D 55/08; F16D 55/06; F16D 55/00; F16D 63/00; F16D 65/18; B60K 7/00;
(Continued)

(56) References Cited

U.S. PATENT DOCUMENTS 4,930,590 A 6/1990 Love et al.
5,163,528 A * 11/1992 Kawamoto .......... B60K 7/0007
180/65.51
(Continued)

FOREIGN PATENT DOCUMENTS

CN 101456348 A 6/2009
CN 103419617 A 12/2013
(Continued)

OTHER PUBLICATIONS

English translation of Written Opinion for corresponding International Application No. PCT/JP2017/015172 dated Jul. 18, 2017.
(Continued)

*Primary Examiner* — Erez Gurari
(74) *Attorney, Agent, or Firm* — Pearne & Gordon LLP

(57) ABSTRACT

A wheel module according to an embodiment includes a wheel, a motor, a shaft, a holding member and a brake. A tire is mounted on the wheel. The motor is arranged on the inner side of the wheel and includes a stator and a rotor. The shaft is fixed to the rotor coaxially with a rotation axis of the rotor and transmits rotation force of the rotor to the wheel. The holding member holds the stator. The brake restricts rotation of the shaft. One end portion of the holding member in the axial direction of the rotation axis of the rotor is fixed to and supported by a support member. The brake is on the opposite side to the wheel with the support member interposed therebetween. The shaft extends to an inner portion of the brake while passing through through-holes formed in the one end portion and the supporting member.

16 Claims, 34 Drawing Sheets

(51) Int. Cl.
  H02K 7/102    (2006.01)
  H02K 7/116    (2006.01)
  F16D 55/00    (2006.01)
  B60K 7/00     (2006.01)
  F16D 55/06    (2006.01)
  F16D 63/00    (2006.01)
  H02K 11/215   (2016.01)
  H02K 7/08     (2006.01)
  F16D 121/22   (2012.01)
  F16D 125/40   (2012.01)
  F16D 127/04   (2012.01)
  F16D 129/04   (2012.01)

(52) U.S. Cl.
  CPC ............ *F16D 55/06* (2013.01); *F16D 63/00* (2013.01); *F16D 65/18* (2013.01); *H02K 7/083* (2013.01); *H02K 7/102* (2013.01); *H02K 7/116* (2013.01); *H02K 11/215* (2016.01); *B60K 2007/0092* (2013.01); *F16D 2121/22* (2013.01); *F16D 2125/40* (2013.01); *F16D 2127/04* (2013.01); *F16D 2129/04* (2013.01)

(58) Field of Classification Search
  CPC .... B60K 7/0007; H02K 11/215; H02K 7/083; H02K 7/102; H02K 7/116
  See application file for complete search history.

(56) References Cited

U.S. PATENT DOCUMENTS

| | | | | |
|---|---|---|---|---|
| 2004/0080223 A1* | 4/2004 | Shimizu | ................ | H02K 7/116 310/75 C |
| 2005/0045393 A1* | 3/2005 | Mizutani | .............. | B60K 7/0007 180/65.51 |
| 2007/0257570 A1* | 11/2007 | Walter | ................. | B60K 17/046 310/67 R |
| 2009/0166112 A1 | 7/2009 | Yoshino et al. | | |
| 2012/0248851 A1 | 10/2012 | Nakashima | | |
| 2013/0057048 A1* | 3/2013 | Ishikawa | ................... | B60L 7/24 301/6.5 |
| 2014/0020966 A1* | 1/2014 | Lee | ..................... | B60K 7/0007 180/55 |
| 2014/0041619 A1* | 2/2014 | Yamauchi | .......... | F16H 57/0006 123/196 R |
| 2014/0285041 A1* | 9/2014 | Lankin | .................... | B60K 1/00 310/71 |
| 2014/0300175 A1* | 10/2014 | Takahashi | ............. | G01L 5/0009 301/6.5 |
| 2015/0083508 A1* | 3/2015 | Bluethmann | ....... | B60W 10/192 180/204 |
| 2015/0133253 A1* | 5/2015 | Huang | ................ | B60K 17/046 475/149 |
| 2015/0343874 A1* | 12/2015 | Kurata | .................. | B60G 17/06 701/29.1 |
| 2017/0110933 A1* | 4/2017 | Michel | .................. | H02K 7/083 |
| 2017/0129522 A1* | 5/2017 | Lee | ........................ | B62B 5/0053 |
| 2019/0040921 A1* | 2/2019 | Zhao | ....................... | B60K 7/00 |

FOREIGN PATENT DOCUMENTS

| | | |
|---|---|---|
| EP | 0 699 550 A2 | 3/1996 |
| JP | 2002-054664 A | 2/2002 |
| JP | 2005-075189 A | 3/2005 |
| JP | 2005-278234 A | 10/2005 |
| JP | 2006-211764 A | 8/2006 |
| JP | 2007-269129 A | 10/2007 |
| JP | 2008-043404 A | 2/2008 |
| JP | 2009-173068 A | 8/2009 |
| JP | 2009-286296 A | 12/2009 |
| JP | 2010-163037 A | 7/2010 |
| JP | 2012-144228 A | 8/2012 |
| JP | 2012-214147 A | 11/2012 |
| JP | 2013-164139 A | 8/2013 |
| KR | 10-2013-0127324 A | 11/2013 |

OTHER PUBLICATIONS

International Preliminary Report on Patentability for corresponding International Application No. PCT/JP2017/015172 dated Oct. 16, 2018.
Notice of Reasons for Refusal dated Jul. 23, 2019 for corresponding Japanese Application No. 2017-079886 with partial English translation.
Chinese Office Action dated Sep. 17, 2019 for corresponding Chinese Application No. 201780023404.4 and partial English translation.
Extended European Search Report dated Nov. 15, 2019 for corresponding European Application No. 17782483.6.
International Search Report for corresponding International Application No. PCT/JP2017/015172 dated Jul. 18, 2017.
Written Opinion for corresponding International Application No. PCT/JP2017/015172 dated Jul. 18, 2017.
Second Chinese Office Action dated Jul. 16, 2020 for corresponding Chinese Application No. 201780023404.4 and English translation.
Notice of Termination of Reconsideration by Examiners before Appeal Proceedings dated Aug. 7, 2020 for corresponding Japanese Application No. 2017-079886 and English translation.
Reconsideration Report by Examiners before Appeal Proceedings dated Aug. 3, 2020 for corresponding Japanese Application No. 2017-079886 and English translation.
Decision of Refusal dated Mar. 10, 2020 for corresponding Japanese Application No. 2018-512075 and English translation.
Decision to Grant a Patent dated Jun. 19, 2020 for corresponding Japanese Application No. 2018-512075 and English translation.

* cited by examiner

WHEEL MODULE

CROSS-REFERENCE TO RELATED APPLICATION(S)

This application is a continuation of PCT international application Ser. No. PCT/JP2017/015172 filed on Apr. 13, 2017 which designates the United States and which claims the benefit of priority from Japanese Patent Application No. 2016-082470, filed on Apr. 15, 2016 and Japanese Patent Application No. 2016-188853, filed on Sep. 27, 2016; the entire contents of which are incorporated herein by reference.

BACKGROUND OF THE INVENTION

1. Field of the Invention

Field
The present invention relates to a wheel module.

2. Description of the Related Art

Conventionally, wheel devices that are used as driving devices of traveling vehicles and the like have been known. For example, wheel devices having a double-end support shaft structure in which both ends of a rotation axis of a wheel are supported have been known as the wheel devices that are used as the driving devices of electric vehicles and the like.

The above-mentioned wheel devices can however be desired to have a cantilever shaft structure depending on applications thereof.

The present invention has been made in view of the above-described circumstances and an object thereof is to provide a wheel module having a brake appropriate for a cantilever shaft structure.

SUMMARY OF THE INVENTION

It is an object of the present invention to at least partially solve the problems in the conventional technology. A wheel module according to an embodiment includes a wheel, a motor, a shaft, a holding member and a brake. A tire is mounted on the wheel. The motor is arranged on an inner side of the wheel and includes a stator and a rotor. The shaft is fixed to the rotor coaxially with a rotation axis of the rotor and transmits rotation force of the rotor to the wheel. The holding member holds the stator. The brake restricts rotation of the shaft. One end portion of the holding member in an axial direction of the rotation axis is fixed to and supported by a support member. Further, the brake is arranged on an opposite side to the wheel with the support member interposed between the brake and the wheel. Further, the shaft extends to an inner portion of the brake while passing through through-holes formed in the one end portion of the holding member and the support member.

DETAILED DESCRIPTION OF THE PREFERRED EMBODIMENTS

Figure 1:
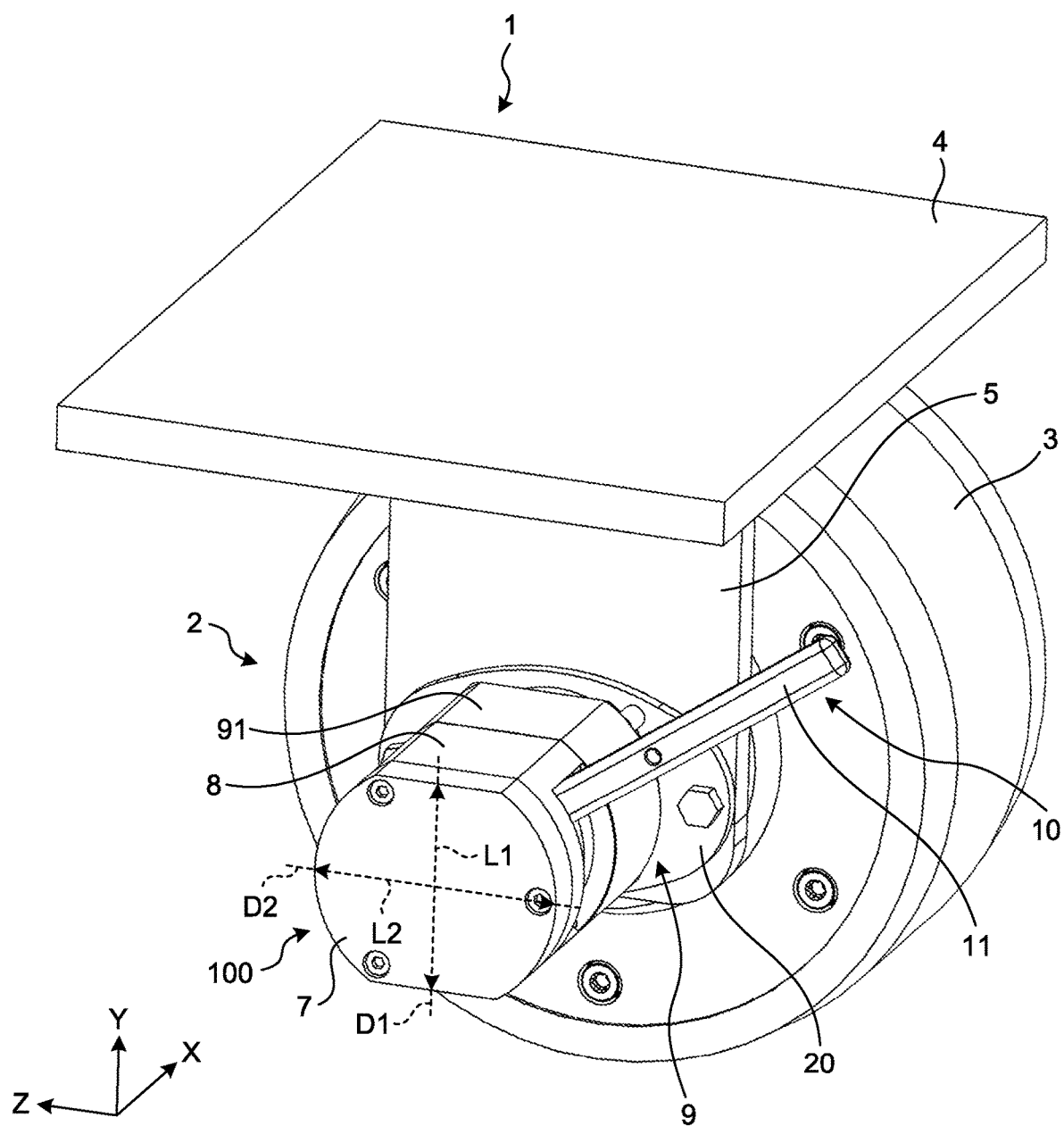
FIG. 1 is a perspective view illustrating an electric carriage using a brake device according to a first embodiment.

A wheel module according to an embodiment includes a wheel, a motor, a shaft, a holding member and a brake. A tire is mounted on the wheel. The motor is arranged on an inner side of the wheel and includes a stator and a rotor. The shaft is fixed to the rotor coaxially with a rotation axis of the rotor and transmits rotation force of the rotor to the wheel. The holding member holds the stator. The brake restricts rotation of the shaft. One end portion of the holding member in an axial direction of the rotation axis is fixed to and supported by a support member. Further, the brake is arranged on an opposite side to the wheel with the support member interposed between the brake and the wheel. Further, the shaft extends to an inner portion of the brake while passing through through-holes formed in the one end portion of the holding member and the support member.

Hereinafter, wheel modules according to embodiments will be described with reference to the drawings. In the respective drawings that are referred in the following description, dimensional relations among respective elements, ratios thereof, and the like can be different from actual ones. Portions with different dimensional relations or ratios among the drawings can be included. In the respective drawings, the same reference numerals denote components having the same functions.

First Embodiment

A brake device 100 in a first embodiment is used as a brake mechanism of a driving device 2, as an example. The driving device 2 including the brake device 100 in the first embodiment is used as a driving mechanism of an electric carriage 1. It should be noted that the following embodiment does not limit applications of the brake device 100 and the driving device 2. For example, the driving device 2 is not limited to be used as the driving mechanism of the electric carriage 1 and may be used as a driving mechanism of a desired device in accordance with purposes, such as a robot and a wheelchair. Note that the drawings are schematic and that dimensional relations among respective elements, ratios of the respective elements, and the like can be different from actual ones. Portions with different dimensional relations or ratios among the drawings can be included.

Figure 2:
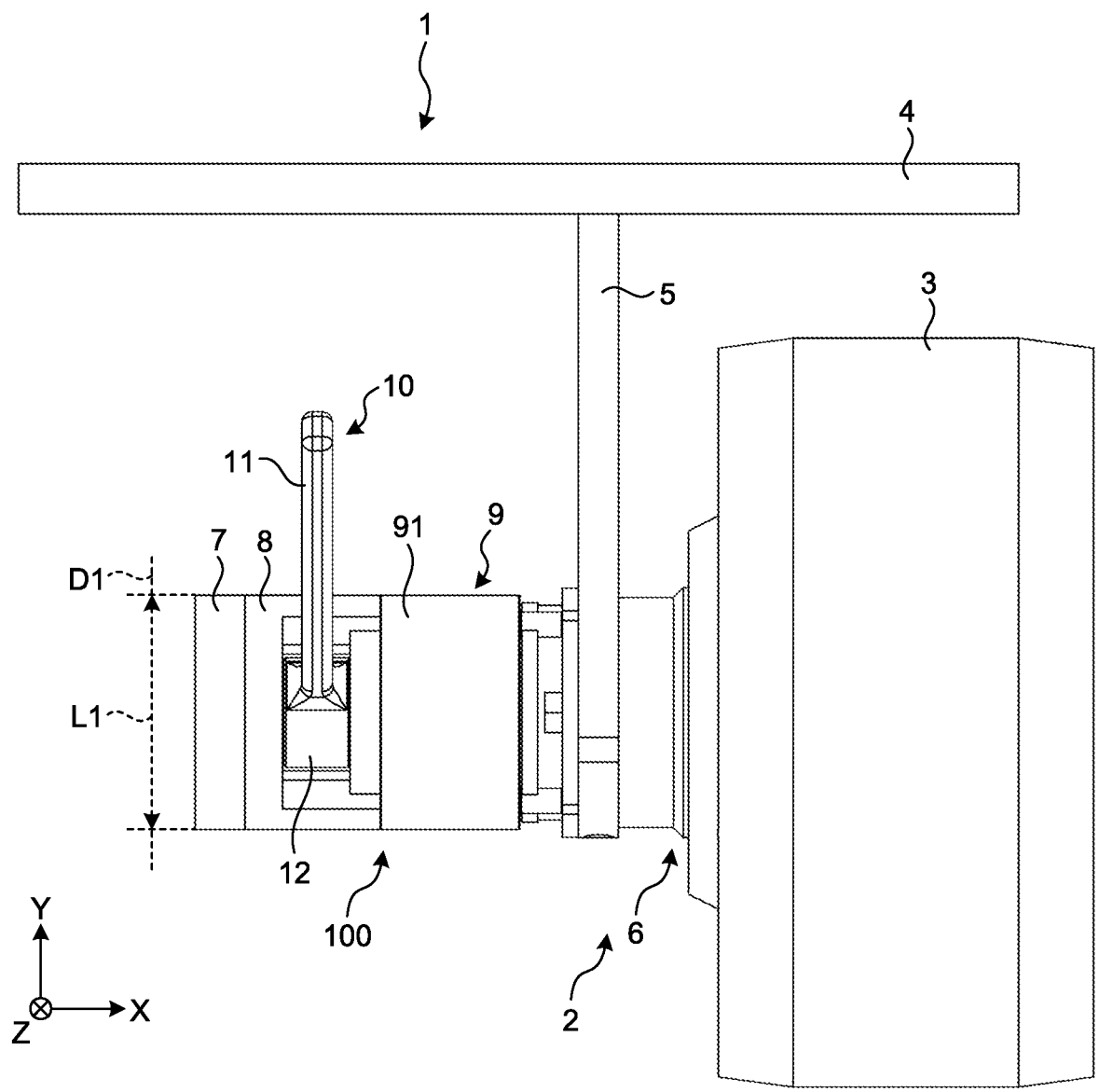
FIG. 2 is a side view illustrating the electric carriage using the brake device in the first embodiment.
Figure 3:
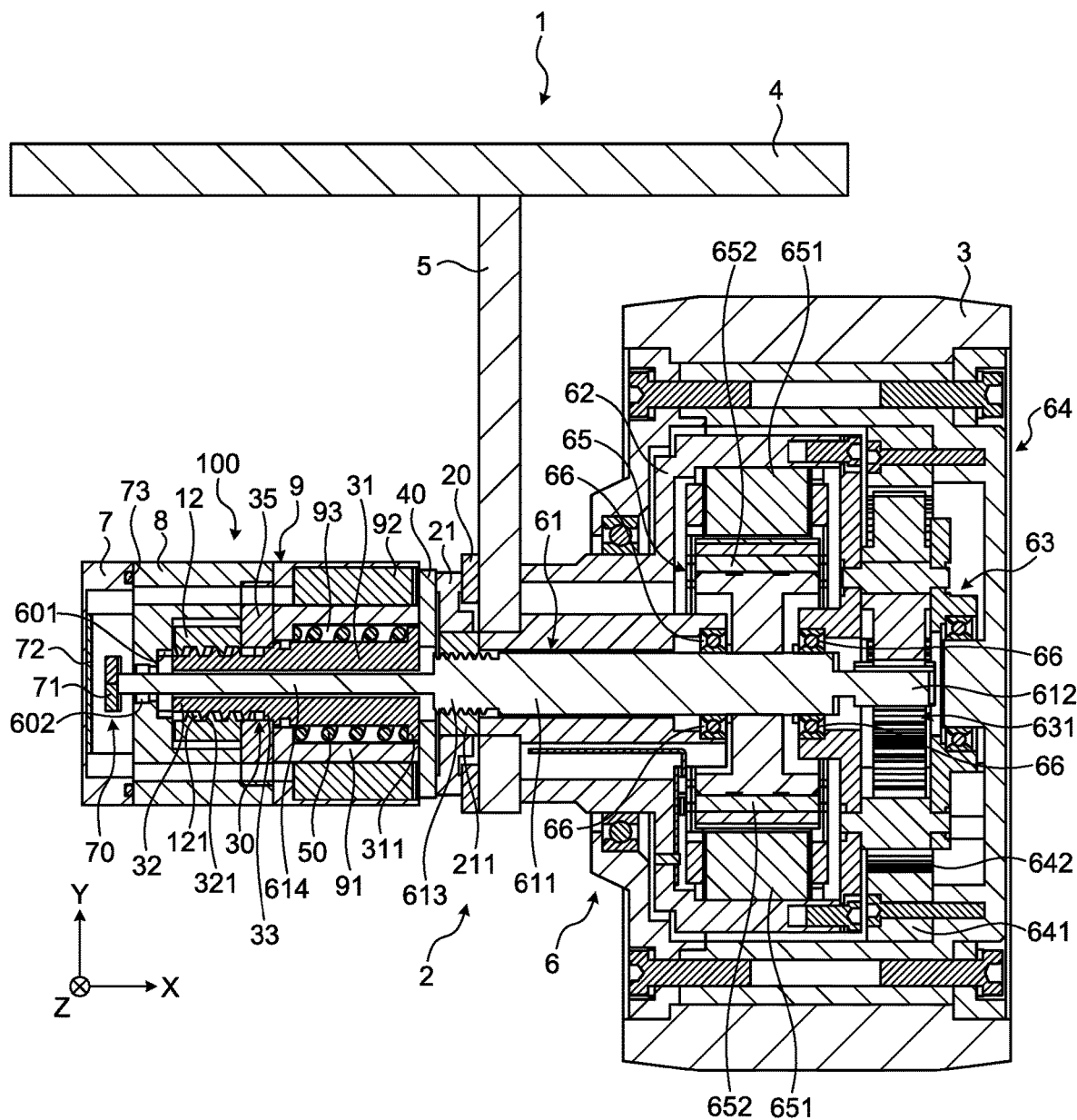
FIG. 3 is a side cross-sectional view illustrating the electric carriage using the brake device in the first embodiment.

Outline of the configuration of the brake device 100 will be described with reference to FIGS. 1 to 3. FIG. 1 is a perspective view illustrating the electric carriage using the brake device according to the first embodiment. FIG. 2 is a side view illustrating the electric carriage using the brake device in the first embodiment. FIG. 3 is a side cross-sectional view illustrating the electric carriage using the brake device in the first embodiment. To be specific, FIG. 3 is the side cross-sectional view of the electric carriage 1 at the center of a length L2 (hereinafter, also referred to as a "second length L2") of the brake device 100 in a second direction D2 (see FIGS. 1 and 6), which will be described later.

Figure 8:
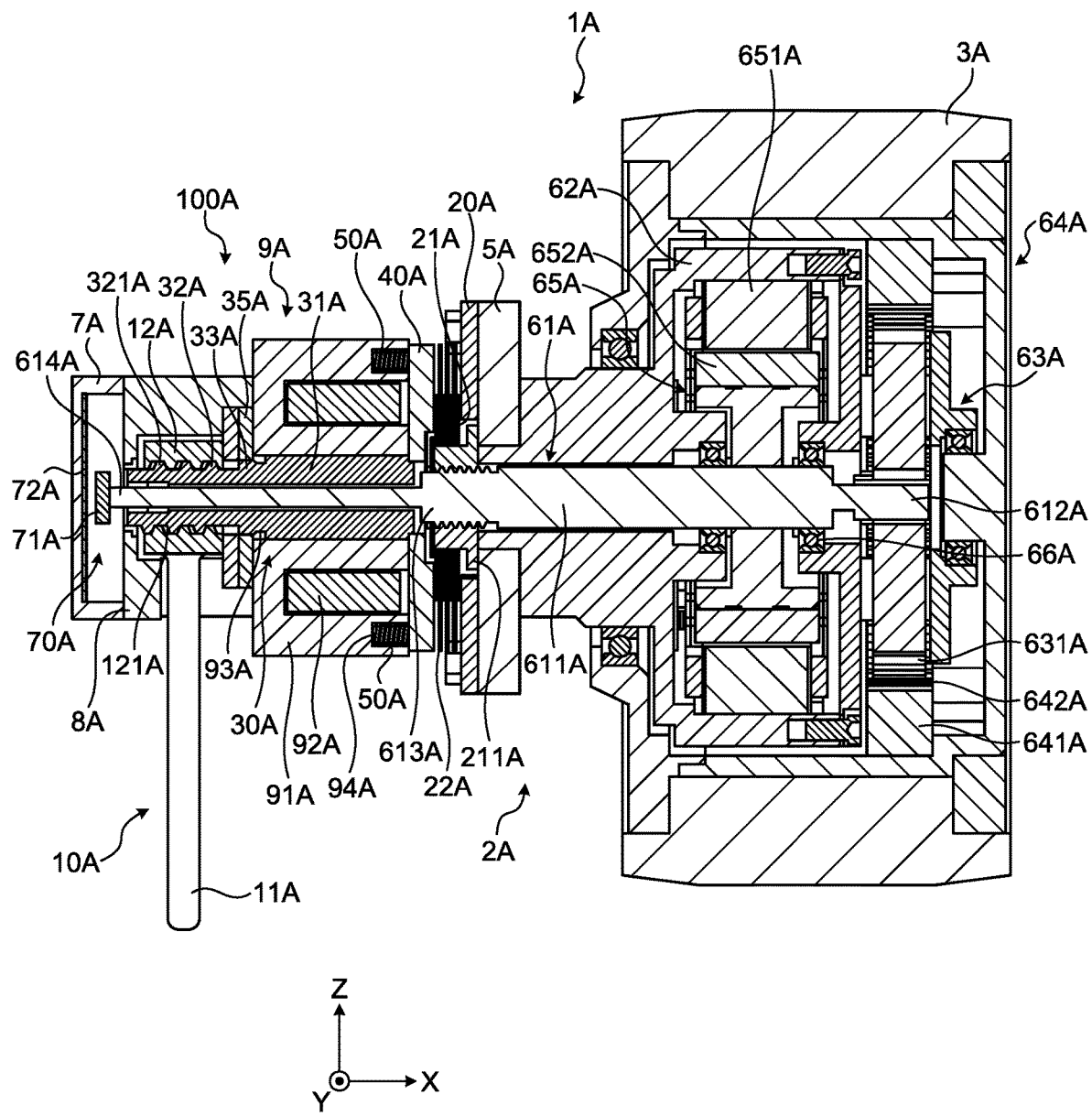
FIG. 8 is a cross-sectional view illustrating an electric carriage using a brake device according to a first modification of the first embodiment.

The electric carriage 1 in the embodiment includes the driving device 2, a tire 3, a placement table 4, and a support plate 5. In the following description, a surface of the tire 3 of the electric carriage 1 that makes contact with grounds is referred to as a grounding surface and a direction orthogonal to the grounding surface is referred to as a vertical direction in some cases. In FIG. 8, the grounding surface is a plane along an XZ plane, for example.

As illustrated in FIG. 1, the placement table 4 is mounted between the brake device 100 and the tire 3 by the support plate 5 and is arranged with a placement surface facing a Y-axis positive direction. As illustrated in FIG. 3, the driving device 2 includes a driving portion 6 that drives the tire 3 and the brake device 100.

First, the configuration of the driving portion 6 will be described simply. In an example illustrated in FIG. 3, the driving portion 6 includes a shaft 61, a motor housing 62, a wheel 64, a motor 65 as a driving source, and a bearing 66. The shaft 61 includes a base portion 611 that is mounted on a rotation axis of the motor 65. The shaft 61 includes a gear portion 612 on one end portion of the base portion 611 and a screwing portion 613 at the other end side. The shaft 61 includes an insertion portion 614 continuous to the screwing portion 613 at the other end side.

The motor 65 includes a stator 651 and a rotor 652. The base portion 611 of the shaft 61 is mounted on the rotor 652 of the motor 65 in the motor housing 62. The shaft 61 thereby rotates about the rotation axis of the shaft 61 with rotation of the motor 65. The bearing 66 is provided on the base portion 611 of the shaft 61.

The gear portion 612 of the shaft 61 is engaged with a gear 631 of a gear portion 63. The gear portion 63 may have any configuration such as a planetary gear mechanism. The gear 631 of the gear portion 63 is engaged with inner teeth 642 of a gear portion 641 of the wheel 64. The tire 3 is mounted on the wheel 64. The tire 3 thereby rotates with rotation of the wheel 64. The driving portion 6 may have any configuration as long as it rotates the tire 3 by rotating the shaft 61.

Next, the configuration of the brake device 100 will be described. As illustrated in FIG. 1, the brake device 100 is arranged outside the tire 3. To be specific, as illustrated in FIG. 3, the brake device 100 is arranged on the side of the screwing portion 613 and the insertion portion 614. The brake device 100 includes a first case 7, a second case 8, a cylindrical body 9, a switching mechanism 10 (see FIG. 1), and a mounting member 20.

The switching mechanism 10 is, for example, a manual lever, and includes a lever portion 11 and a receiving portion 12 that is screwed together with an end portion 32 of a plunger 30, which will be described later. The receiving portion 12 of the switching mechanism 10 is formed into a cylindrical shape and is arranged in the second case 8. A groove 121 is formed in the receiving portion 12 and a part of a peripheral wall of the receiving portion 12 is continuous to one end of the lever portion 11. The lever portion 11 protrudes from an opening portion of the second case 8. For example, an operator of the electric carriage 1 manually operates the lever portion 11 to release the brake and so on.

The switching mechanism 10 switches, with rotational movement of the receiving portion 12, between a first state in which the plunger 30 is pressed against an armature 40, which will be described later, a second state in which pressure to the armature 40 by the plunger 30 is released, and a third state in which the receiving portion 12 is located at a position between the first state and the second state, and a spring member 50, which will be described later, biases the armature 40 to the mounting member 20 side in a non-conduction state whereas magnetic force of the cylindrical body 9 attracts the armature 40 to the plunger 30 side in a conduction state, and details thereof will be described later.

As illustrated in FIG. 3, the cylindrical body 9 has a hollow hole 93 formed to penetrate therethrough in a direction of the rotation axis of the shaft 61 and causes the armature 40 to move forward and backward in the direction of the rotation axis of the shaft 61 with the magnetic force, and details thereof will be described later. As illustrated in FIG. 1, the mounting member 20 is formed into a plate shape, is fixed to the support plate 5, and functions as a brake mechanism, and details thereof will be described later. The brake device 100 includes the plunger 30 and the armature 40.

The plunger 30 has a base portion 31 arranged in the hollow hole 93 of the cylindrical body 9 and the end portion 32 projecting from the hollow hole 93 and subjected to screw processing. For example, a screw thread 321 is formed on the end portion 32. The insertion portion 614 of the shaft 61 penetrating in the direction (right and left direction in FIG. 3) in which the base portion 31 and the end portion 32 are aligned is inserted through a center portion of the plunger 30.

The plunger 30 includes a rotation stopping mechanism so as to prevent the plunger 30 from rotating when the receiving portion 12 rotates with an operation of the lever portion 11. The plunger 30 has a rotation restricting portion 33 between the base portion 31 and the end portion 32. The rotation restricting portion 33 is formed into, for example, a hexagonal shape when seen from above, is fixed to the cylindrical body 9, and is inserted into a restricting member 35 having a hexagonal through-hole to thereby implement the rotation stopping mechanism of the plunger 30. The rotation stopping mechanism of the plunger 30 may have any configuration as long as the plunger 30 does not rotate when the receiving portion 12 rotates with the operation of the lever portion 11.

The armature 40 is formed into a plate shape and has magnetism. The armature 40 is arranged at such a position that a first friction body 21, which will be described later, is interposed between the armature 40 and the mounting member 20 along the direction of the rotation axis of the shaft 61, and is fixed to the plunger 30. The armature 40 may be integrated with the plunger 30. The plunger 30 and the armature 40 may be integrally molded, for example. As illustrated in FIG. 3, a sliding bearing 601 is arranged on a front end portion (end portion 32) of the plunger 30. In this manner, the sliding bearing 601 supports the plunger 30 in a state in which the plunger 30 is movable in the axial direction. The sliding bearing 601 can therefor improve backlash prevention and sliding of the plunger 30. As illustrated in FIG. 3, a roll bearing 602 is arranged on a front end portion of the insertion portion 614.

Figure 4:
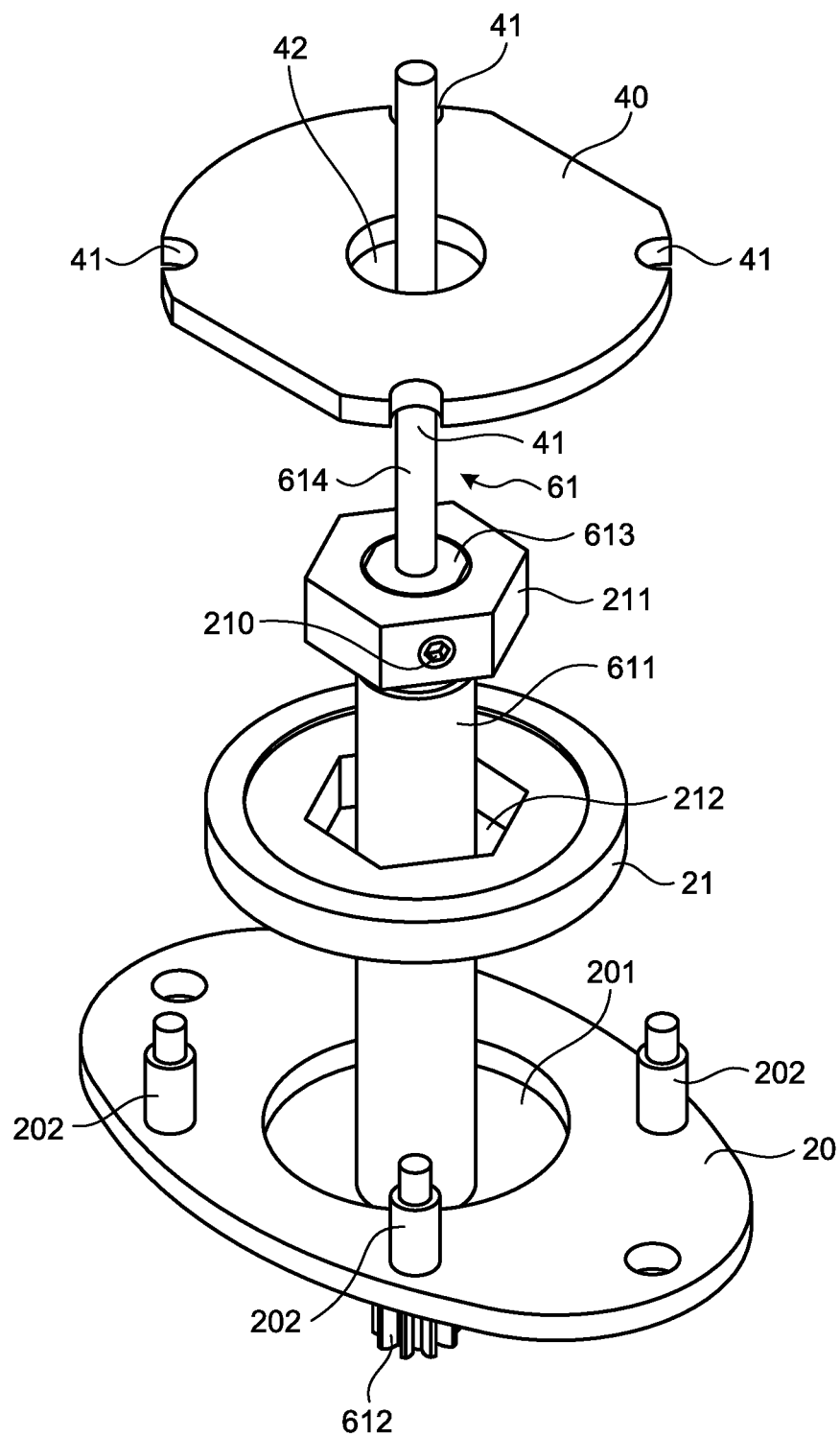
FIG. 4 is a perspective view illustrating a main part of the brake device in the first embodiment.

A main part of the brake mechanism will be described with reference to FIG. 4. FIG. 4 is a perspective view illustrating a main part of the brake device in the first embodiment. The brake device 100 implements the brake mechanism with friction generated by pressing the first friction body 21 between the armature 40 and the mounting member 20. The first friction body 21 is arranged between the armature 40 and the mounting member 20.

The shaft 61 is inserted through a through-hole 201 that is formed in a center portion of the mounting member 20. A plurality of projections 202 are formed on a peripheral end portion of the mounting member 20. The projections 202 formed on the mounting member 20 may be formed integrally with the mounting member 20 or may be formed separately.

The first friction body 21 is formed into a disk shape having an outer diameter that is larger than the diameter of the through-hole 201 of the mounting member 20. The first friction body 21 is mounted on a restricting member 211 that rotates together with the shaft 61. The restricting member 211 is screwed together with the screwing portion 613 of the shaft 61 and is fixed to the shaft 61 by a screw 210 to thereby rotate together with the shaft 61. This configuration prevents the restricting member 211 from rotating relatively to the shaft 61 and dropping from the shaft 61. In an example illustrated in FIG. 4, the first friction body 21 has, for example, a hexagonal through-hole 212 in a center portion when seen from above and the restricting member 211 is inserted into the through-hole 212. The first friction body 21 thereby rotates together with the shaft 61 and is fixed to the shaft 61 so as to be relatively displaced in the axial direction. The through-hole 212 and the restricting member 211 may have desired shapes as long as the first friction body 21 and the shaft 61 rotate together.

The armature 40 is arranged such that the first friction body 21 is interposed between the armature 40 and the mounting member 20. The armature 40 has a plurality of cutout grooves 41 formed on a peripheral end portion and a through-hole 42 formed in a center portion. The diameter of the through-hole 42 of the armature 40 is smaller than the outer diameter of the first friction body 21.

The cutout grooves 41 of the armature 40 are provided at positions corresponding to the projections 202 of the mounting member 20 and the projections 202 corresponding to the respective cutout grooves 41 are fitted into them. Thus, the armature 40 is arranged so as to be overlapped with the first friction body 21 in the direction of the rotation axis of the shaft 61 and can be displaced relatively to the mounting member 20 in the axial direction but is restricted from being displaced relatively to the mounting member 20 in the circumferential direction. The armature 40 presses the first friction body 21 to the mounting member 20 side to thereby implement the brake mechanism with the friction of the first friction body 21. The brake device 100 has the configuration using one friction body (first friction body 21) and the armature 40 and the mounting member 20 function as a second friction body.

The cylindrical body 9 has a field 91 in which a cavity is formed therein along the circumferential direction of the hollow hole 93 and a coil 92 that is provided in the cavity of the field 91. The cylindrical body 9 causes the armature 40 to move forward and backward in the direction (right and left direction in FIG. 3) of the rotation axis of the shaft 61 with the magnetic force. As illustrated in FIG. 1, the cylindrical body 9 is formed such that a length L1 (hereinafter, also referred to as a "first length L1") of a cross section orthogonal to the rotation axis of the shaft 61 in a first direction D1 (see FIGS. 1 and 6) is shorter than the second length L2 of the cross section in the second direction D2 orthogonal to the first direction D1.

Thus, the cylindrical body 9 having a substantially rectangular outer shape the length of which in the direction along the grounding surface (XZ plane) is longer and the length of which in the vertical direction (Y-axis direction) is shorter is used, thereby increasing a distance to the grounding surface when output torque of the brake is equivalent. A range of road surfaces on which the electric carriage 1 or the like or a vehicle using the brake device 100 can travel is increased.

Figure 5:
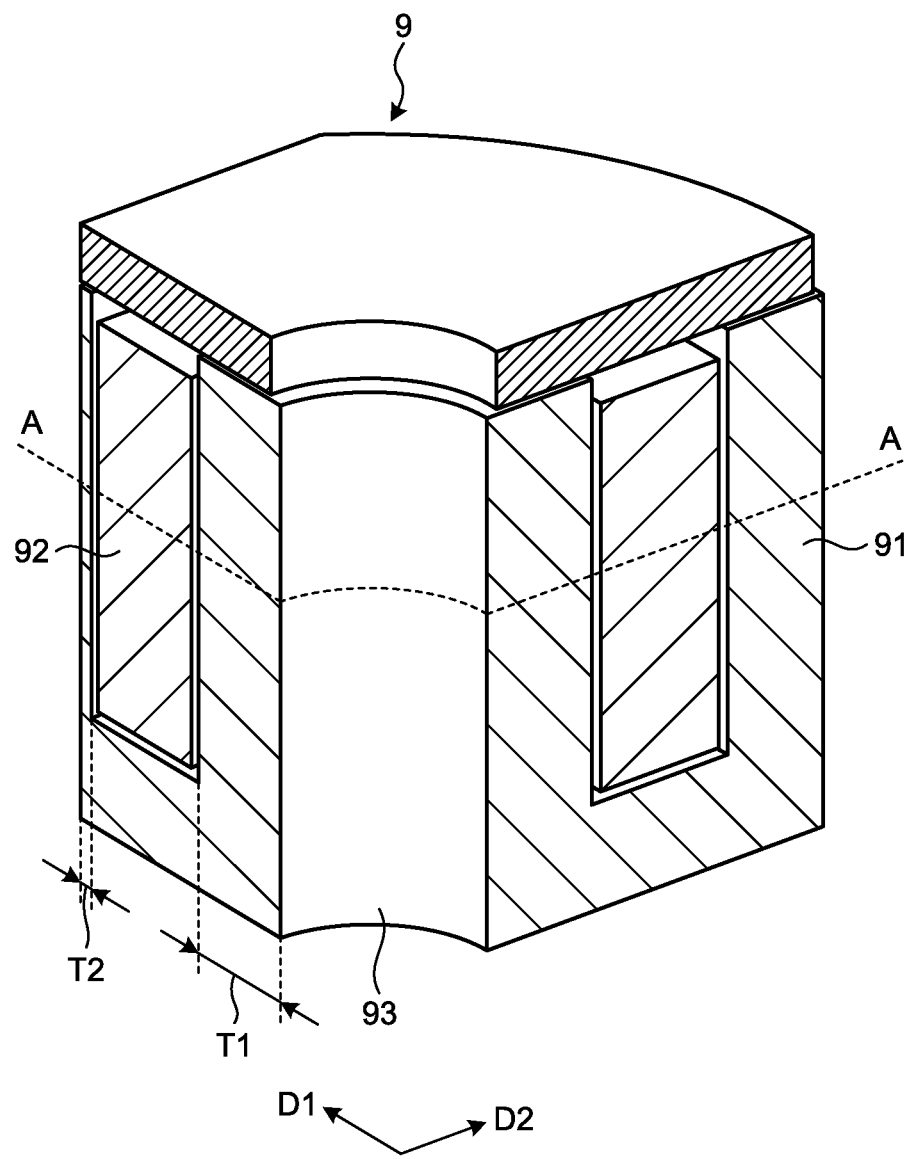
FIG. 5 is a perspective view illustrating thicknesses of an inner wall and an outer wall of a cylindrical body of the brake device in a first direction in the first embodiment.

Next, a relation in the thickness of the cylindrical body 9 in the first direction D1 will be described with reference to FIG. 5. FIG. 5 is a perspective view illustrating the thicknesses of an inner wall and an outer wall of the cylindrical body of the brake device in the first direction D1 in the first embodiment. To be specific, FIG. 5 is a perspective view illustrating a cross section of a main part of the cylindrical body 9 of the brake device 100. In an example illustrated in FIG. 5, the cylindrical body 9 is formed such that a first thickness T1 of a portion (inner wall) between the inner circumferential surface of the cavity of the field 91 and the outer circumferential surface of the hollow hole 93 is larger than a second thickness T2 of a portion (outer wall) between the outer circumferential surface of the cylindrical body 9 and the outer circumferential surface of the cavity of the field 91 in the first direction D1.

Thus, the cylindrical body 9 is formed such that the first thickness T1 is large and the second thickness T2 is small, for example. The brake device 100 can thereby increase an attraction force with the thick inner wall of the field when input power is equivalent. That is to say, there is no influence on the attraction force even when the thickness of the outer wall is decreased to some extent whereas increase in the thickness of the inner wall can increase the attraction force. It is sufficient that the axial cross-sectional areas (cross-sectional areas of A-A cross section) of the outer wall and the inner wall are made equivalent to each other. The armature 40 may have the same outer shape as the shape of the field 91 and the first friction body 21 may have the same diameter as a distance between straight sides of the armature 40. The field 91 may have an outer shape formed by grinding and flattening the upper and lower sides of a circle to make the average wall thickness thereof on the inner side be larger than that on the outer side. Although FIG. 5 is a cross sectional view while the A-A cross-sectional area of the inner wall and the A-A cross-sectional area of the outer wall are divided for explaining the thicknesses of the inner wall and the outer wall, the equivalent cross-sectional areas indicate that the axial cross-sectional area of the inner wall and the axial cross-sectional area of the outer wall in a non-divided state are also equivalent to each other, of course.

The brake device 100 includes the spring member 50 as a biasing body and a sensor portion 70.

The spring member 50 is arranged in a center portion of the cylindrical body 9, for example. In the example illustrated in FIG. 3, the spring member 50 is arranged in the hollow hole 93 of the cylindrical body 9. For example, a coil spring is used for the spring member 50. The spring member 50 biases the armature 40 to the mounting member 20 side along the direction of the rotation axis of the shaft 61. In the example of FIG. 3, the spring member 50 biases the armature 40 to the mounting member 20 side by biasing a flange portion 311 provided on the front end of the base portion 31 of the plunger 30 to the mounting member 20 side along the direction of the rotation axis of the shaft 61. In this manner, the brake device 100 has the configuration in which the plunger 30 penetrates through the center of one spring member 50 and the cylindrical body 9 is arranged so as to surround the spring member 50. The brake device 100 can therefore be reduced in size by arranging the spring member 50 at the center of the cylindrical body 9.

The sensor portion 70 includes a magnet 71 arranged on the rotation axis of the shaft 61 and a substrate 72 on which a circuit and the like of a magnetic sensor are mounted, and functions as a magnetic sensor that detects an angle position of the rotor 652 of the motor 65 as the driving source. For example, a permanent magnet is used for the magnet 71. The sensor portion 70 is subject to waterproofing processing with a packing 73 and details of this point will be described later. As illustrated in FIG. 3, the magnet 71 is arranged on the front end of the insertion portion 614 of the shaft 61 inserted through the plunger 30. The substrate 72 is arranged at a position opposing the magnet 71. In the example illustrated in FIG. 3, the substrate 72 is arranged on a left end surface in the first case 7. The substrate 72 detects magnetic flux change with rotation of the magnet 71. The sensor portion 70 therefore converts the magnetic flux change with the rotation of the magnet 71 into an electric signal and outputs it. In this manner, in the driving device 2 of the electric carriage 1, the motor 65 and the brake device 100 are coaxially arranged and a magnetic flux generated from the magnet 71 mounted on the end portion of the shaft 61 penetrating through the brake device 100 (plunger 30) is detected to detect the angle position of the rotor 652 of the motor 65.

The sensor portion 70 is arranged on the rotation axis of the shaft 61. Conventionally, for example, in order to measure an angle position of a rotor of a motor and control an electric apparatus, a space and cost for providing an angle sensor have been necessary. The space is however not required to be provided around the brake mechanism by arranging the sensor portion 70 on the front end of the insertion portion 614 of the shaft 61, the number of components can be reduced, and the rotation angle can be detected while preventing increase in cost. Influence on the sensor portion 70 by the magnetic flux and heat from the motor 65 and the cylindrical body 9 can be reduced by arranging the sensor portion 70 at a position farther from the motor 65, the cylindrical body 9, and the like. The brake device 100 may include no sensor portion 70 when a motor for which angle detection is not needed, such as a stepping motor, is used as the motor 65.

Figure 6:
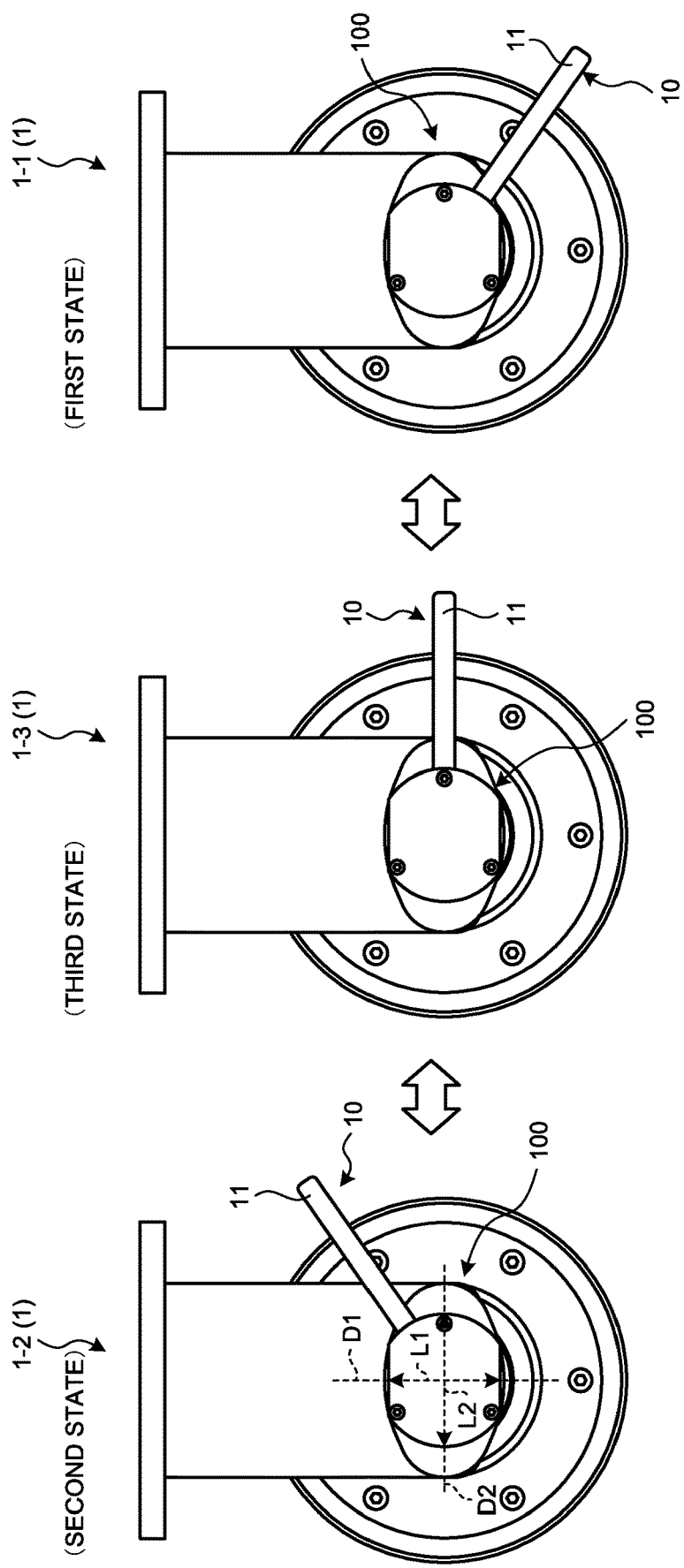
FIG. 6 is a front view illustrating positions of a lever portion in respective states of a switching mechanism in the first embodiment.
Figure 7:
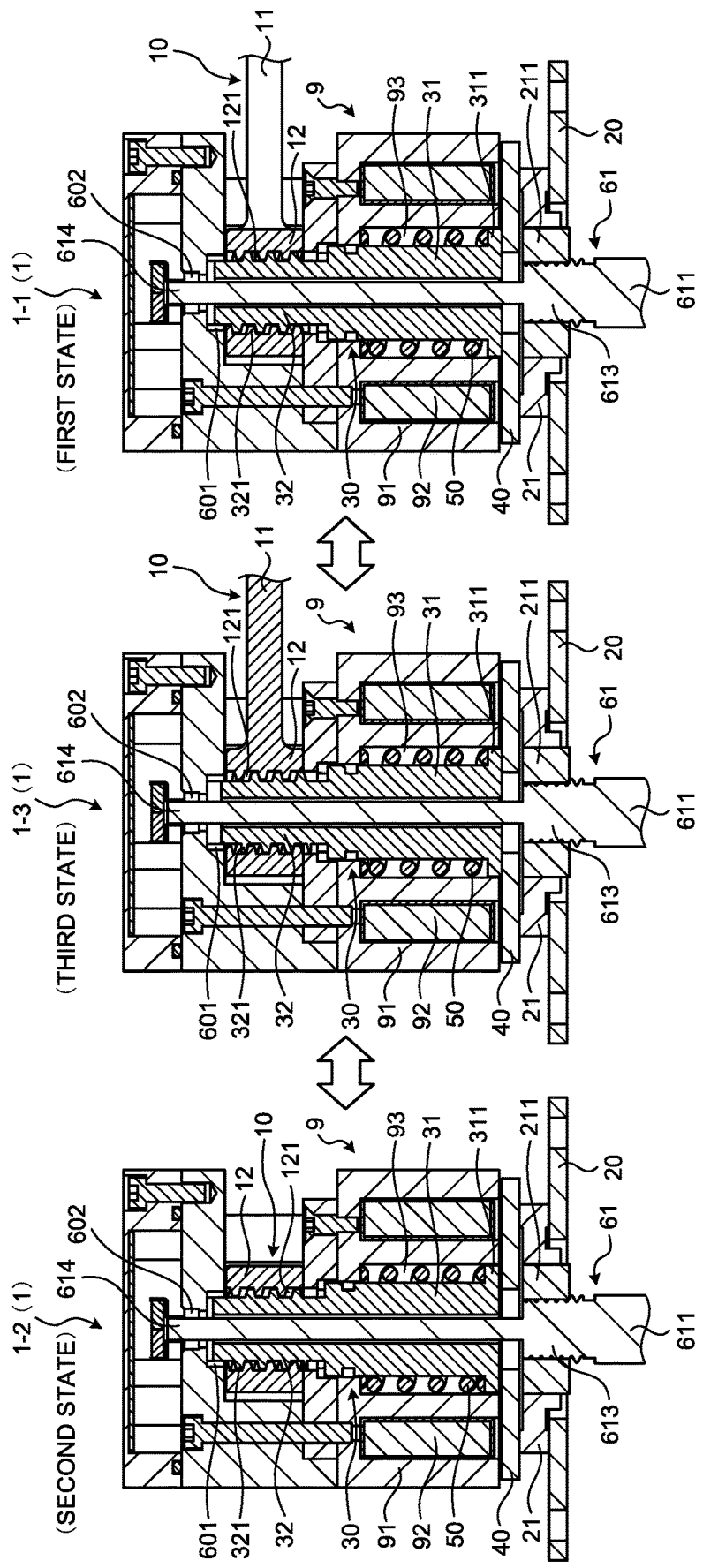
FIG. 7 is a cross-sectional view illustrating positions of a plunger in the respective states of the switching mechanism in the first embodiment.

In the electric carriage 1 including the brake device 100, respective states that are changed by manually operating the lever portion 11 of the switching mechanism 10 will be described with reference to FIGS. 6 and 7. FIG. 6 is a front view illustrating positions of the lever portion in the respective states of the switching mechanism in the first embodiment. FIG. 7 is a cross-sectional view illustrating positions of the plunger in the respective states of the switching mechanism in the first embodiment. A cross-sectional view of an electric carriage 1-2 in FIG. 7 is a cross-sectional view along the second direction D2 illustrated in FIG. 7 when seen from the opposite side to the grounding surface. The same holds true for other electric carriages 1-1 and 1-3.

The electric carriage 1-1 to the electric carriage 1-3 illustrated in FIGS. 6 and 7 indicate the electric carriage 1 in the respective states of the switching mechanism 10 in accordance with positions of the lever portion 11 of the switching mechanism 10. To be specific, FIG. 7 is a cross-sectional view of the electric carriage 1 at the center of the second length L2 of the brake device 100 in FIG. 6 in the second direction D2. When the electric carriage 1-1 to the electric carriage 1-3 are not distinguished from one another, they are referred to as the electric carriage 1. In an example illustrated in FIG. 6, a state in which the lever portion 11 is inclined to the grounding surface side is a first state and a state in which the lever portion 11 is inclined in the direction of being farther from the grounding surface is a second state. Alternatively, desired correspondence between the inclination of the lever portion 11 and the respective states may be employed or the correspondence may be capable of being appropriately set. For example, the state in which the lever portion 11 is inclined to the grounding surface side may be a second state and the state in which the lever portion 11 is inclined in the direction of being farther from the grounding surface may be a first state.

First, the first state of the switching mechanism 10 will be described. The electric carriage 1-1 corresponds to the first state in which the plunger 30 is pressed against the armature 40. As illustrated in FIG. 6, in the electric carriage 1-1, the lever portion 11 of the switching mechanism 10 is inclined in the direction close to the grounding surface and presses the plunger 30 against the armature 40 with a relation between the receiving portion 12 of the switching mechanism 10 and the end portion 32 of the plunger 30 in this state.

To be specific, as illustrated in FIG. 7, the surface of the groove 121 of the receiving portion 12 at the side farther from the armature 40 in the direction of the rotation axis of the shaft 61 abuts against the screw thread 321 of the end portion 32. The plunger 30 thereby moves to the mounting member 20 side to be pressed against the armature 40. In the first state, even when the brake device 100 is energized, pressure to the armature 40 by the plunger 30 is not released because the receiving portion 12 restricts the position of the plunger 30 in the direction of the rotation axis of the shaft 61. That is to say, in this state, the brake device 100 functions as a parking brake that can hold a stop state of the electric carriage 1 or the like reliably because the motor 65 is non-rotatable (for example, in a state in which the brake device 100 restricts the rotation). Usage of the parking brake can stop the electric carriage 1 or the like even on a road surface with a steep slope, for example. In this state, the armature 40 cannot move in the direction of the rotation axis of the shaft 61 even when the coil 92 is energized, and the wheel of the electric carriage 1 or the like does not therefore rotate.

Then, the second state of the switching mechanism 10 will be described. The electric carriage 1-2 corresponds to the second state in which the pressure to the armature 40 by the plunger 30 is released. As illustrated in FIG. 6, in the electric carriage 1-2, the lever portion 11 of the switching mechanism 10 is inclined in the direction of being father from the grounding surface and releases the pressure to the armature 40 by the plunger 30 with the relation between the receiving portion 12 of the switching mechanism 10 and the end portion 32 of the plunger 30 in this state.

To be specific, as illustrated in FIG. 7, the surface of the groove 121 of the receiving portion 12 at the side closer to the armature 40 in the direction of the rotation axis of the shaft 61 abuts against the screw thread 321 of the end portion 32. The plunger 30 thereby moves in the direction of being farther from the mounting member 20 and the pressure to the armature 40 by the plunger 30 is released. In the second state, even when the brake device 100 is not energized, the plunger 30 does not press the armature 40 because the receiving portion 12 restricts the position of the plunger 30 in the direction of the rotation axis of the shaft 61. That is to say, a manual release state in which the electric carriage 1 or the like can be manually pushed to be moved is established because the motor 65 is rotatable in this state. Usage of the manual release state enables the electric carriage 1 or the like to be movable by pushing it manually even when the wheel is locked due to battery exhaustion, disconnection of a wiring between a power supply and the brake device, or the like.

Subsequently, the third state of the switching mechanism 10 will be described. The electric carriage 1-3 corresponds to the third state in which application and release of the pressure to the first friction body 21 by the armature 40 are switched in accordance with presence and absence of energization to the brake device 100. As illustrated in FIG. 6, in the electric carriage 1-3, the lever portion 11 of the switching mechanism 10 is inclined in the direction of being parallel with the grounding surface and switches application and release of the pressure to the first friction body 21 by the armature 40 in accordance with the presence and absence of energization to the brake device 100 with the relation between the receiving portion 12 of the switching mechanism 10 and the end portion 32 of the plunger 30 in this state. To be specific, in the electric carriage 1-3 corresponding to the third state, the receiving portion 12 is located at a position between the first state and the second state, and the spring member 50, which will be described later, biases the armature 40 to the mounting member 20 side in the non-conduction state whereas the magnetic force of the cylindrical body 9 attracts the armature 40 to the plunger 30 side in the conduction state. That is to say, in this state, traveling of the electric carriage 1 or the like can be controlled because the rotation of the motor 65 can be switched on the basis of the energization state to the brake device 100. The brake in the third state is generally referred to as a non-excitation operation brake (negative operating electromagnetic brake).

As illustrated in FIGS. 3 and 7, the width of the groove 121 of the receiving portion 12 in the direction of the rotation axis of the shaft 61 is larger than the width of the screw thread 321 of the end portion 32 in the direction of the rotation axis of the shaft 61. That is to say, the plunger 30 can move in a predetermined range in the direction of the rotation axis of the shaft 61 in the receiving portion 12 of the switching mechanism 10. The magnetic force of the cylindrical body 9 attracts the armature 40, so that the end portion 32 of the plunger 30 is caused to shift in the opposite direction to the pressing direction against the armature 40 in the third state of the switching mechanism 10. Pressure to the first friction body 21 by the armature 40 is therefore released. A gap is formed between the groove 121 of the receiving portion 12 and the screw thread 321 of the end portion 32 in the direction of the rotation axis of the shaft 61 such that the rotation of the receiving portion 12 by the lever portion 11 enables the plunger 30 to move in the axial direction and the first friction body 21 and the armature 40 can relatively move when torque exceeds a constant magnitude.

The example in FIG. 7 illustrates the third state in the state in which the brake device 100 is not energized. In the electric carriage 1-3, the armature 40 is therefore biased with the biasing force of the spring member 50. When the coil 92 of the brake device 100 is energized in the electric carriage 1-3, for example, the pressure to the first friction body 21 by the armature 40 is released because the armature 40 is attracted by the cylindrical body 9 with force stronger than the biasing force of the spring member 50.

As described above, the brake device 100 enables a brake state to be switched at desired timing to thereby adjust the magnitude of friction torque. For example, the brake device 100 enables the negative operating electromagnetic brake to be manually unlocked by the switching mechanism 10 in the non-energization state. The brake device 100 therefore makes the negative operating brake easy to be applied to an electric wheelchair and a motor-assisted vehicle. In the brake device 100, the formation of the gap between the groove 121 of the receiving portion 12 and the screw thread 321 of the end portion 32 in the direction of the rotation axis of the shaft 61 causes friction plates (the armature 40 and the first friction body 21) to slide on each other when the torque exceeds the constant magnitude, thereby preventing breakage. In the brake device 100, the manual operation portion is configured by the screw mechanism with the groove 121 of the receiving portion 12 and the screw thread 321 of the end portion 32, thereby making the operation on the lever portion 11 light and smooth.

The brake device 100 enables the electric operation and the manual operation of the brake mechanism of an in-wheel motor to be switched by a single operation, for example. The brake device 100 can therefore implement functions in accordance with work and applications regardless of the strength of the brake, thereby improving work efficiency. The brake device 100 can release the locking of the wheel due to battery exhaustion, disconnection of the wiring between the power supply and the brake mechanism, or the like to enable manual movement, thereby releasing braking force in an emergency. The brake device 100 can ensure a sufficient distance between the ground surface and the brake mechanism because the brake mechanism is reduced in size, and can thereby be mounted on the wheel directly. The brake device 100 can control the traveling speed of the electric carriage 1 with the magnitude of a current because the attraction force is changed with the magnitude of the current that is applied to the coil 92 in the third state. In the electric carriage 1 using the brake device 100, the speed, for example, on a downward slope and when turning to right or left during traveling can therefore be controlled.

The brake device is not limited to the brake device 100 in the embodiment and various modes may be employed. This point will be described below with reference to the drawings.

First Modification of First Embodiment

Figure 9:
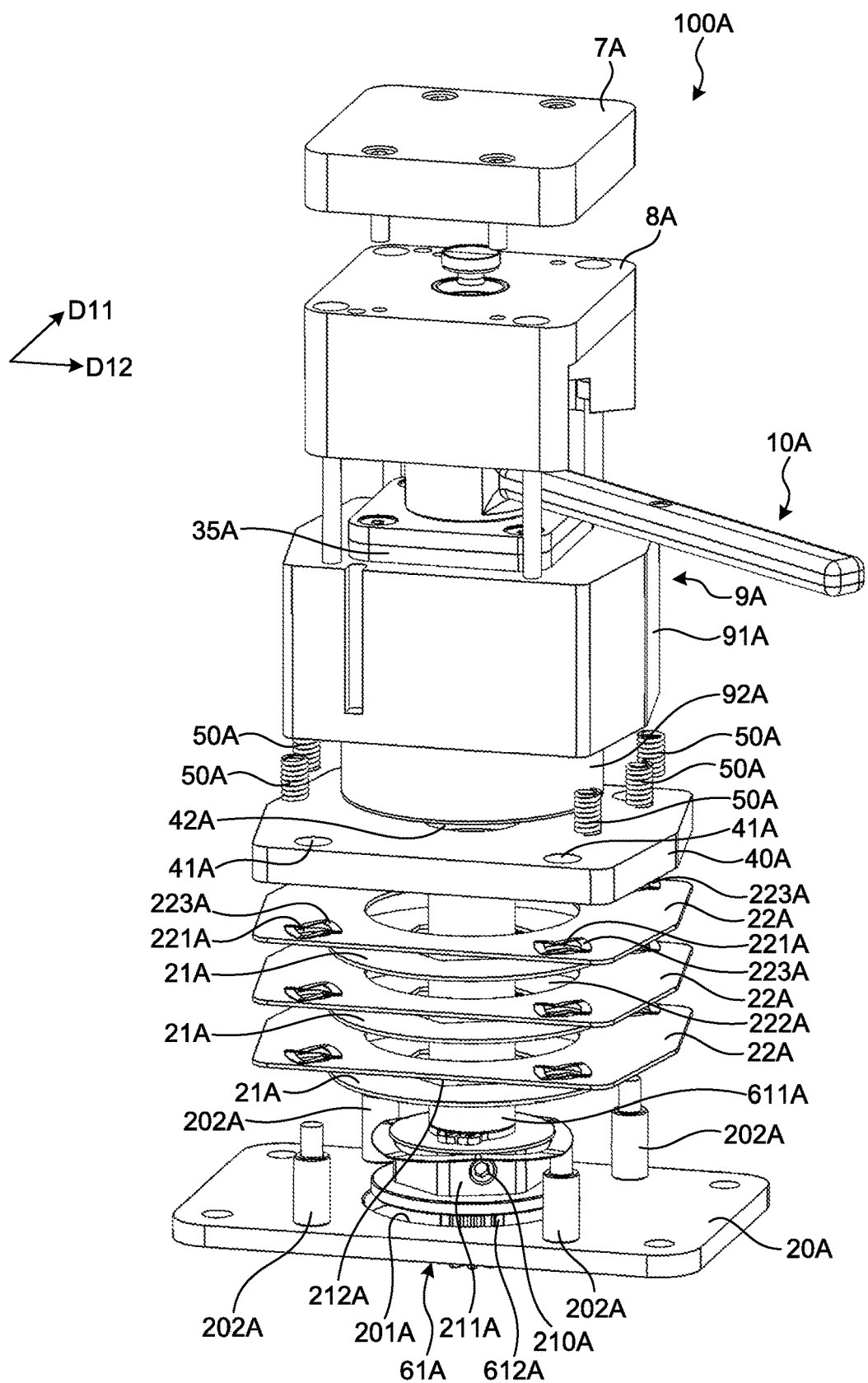
FIG. 9 is an exploded perspective view illustrating the brake device in the first modification of the first embodiment.

The brake device may be of, for example, a multi-plate type that is formed by stacking a plurality of friction bodies having two types of shapes. A brake device 100A that is used for an electric carriage 1A according to a first modification of the first embodiment will be described with reference to FIGS. 8 and 9. FIG. 8 is a cross-sectional view illustrating the electric carriage using the brake device in the first modification of the first embodiment. FIG. 9 is an exploded perspective view illustrating the brake device in the first modification of the first embodiment.

In the first modification, "A" is added to the ends of reference numerals for configurations corresponding to the configurations in the embodiment, and points differing from the embodiment will be described below. The same reference numerals as those in the embodiment denote the same configurations as those in the embodiment and description thereof is omitted as appropriate. That is to say, in the first modification, "*A" replaces "*" for the same configurations as those in the embodiment. For example, a tire 3A in the first modification has the same configuration as the tire 3 in the embodiment and description thereof is omitted.

The brake device 100A in the first modification illustrated in FIGS. 8 and 9 is different from the brake device 100 in the embodiment in the configuration of a brake mechanism and in the arrangement positions of spring members 50A. Points differing from those in the brake device 100 will be described below.

The brake device 100A includes a plurality of first friction bodies 21A and a plurality of second friction bodies 22A. As illustrated in FIG. 9, the brake device 100A includes, for example, three first friction bodies 21A and three second friction bodies 22A. To be specific, the three first friction bodies 21A and the three second friction bodies 22A are provided so as to be alternately overlapped between a mounting member 20A and an armature 40A. The number of friction bodies is not limited and the number of first friction bodies 21A and the number of second friction bodies 22A may not be necessarily the same. The number of first friction bodies 21A may be larger than or smaller than the number of second friction bodies 22A by one. The number of second friction bodies 22A is preferably larger than the number of first friction bodies 21A by one. In this case, the armature 40A and the mounting member 20A function as the second friction body and interpose the first friction bodies 21A therebetween, thereby efficiently generating friction force.

Each second friction body 22A has a plurality of insertion holes 221A formed in a peripheral end portion and a through-hole 222A formed in a center portion. A shaft 61A is inserted through the through-hole 222A of each second friction body 22A. The diameter of the through-hole 222A of the second friction body 22A is smaller than the outer diameter of each first friction body 21A.

The insertion holes 221A of the second friction body 22A are provided at positions corresponding to projections 202A of the mounting member 20A and the corresponding projections 202A are inserted through the respective insertion holes 221A. In this manner, the second friction bodies 22A are arranged so as to be overlapped with the first friction bodies 21A in the direction of the rotation axis of the shaft 61A, are mounted on the mounting member 20A, and are restricted from rotating.

Each second friction body 22A includes a plurality of plate springs 223A having openings in center portions. The respective plate springs 223A are provided such that the openings are overlapped with the insertion holes 221A. When the armature 40A does not apply pressure, gaps in the direction of the rotation axis of the shaft 61A are formed between the second friction bodies 22A with the plate springs 223A. The brake device 100A can thereby reduce influence due to friction by the first friction bodies 21A and the second friction bodies 22A while the brake is released.

The armature 40A is fixed to a plunger 30A and is arranged such that the first friction bodies 21A and the second friction bodies 22A are interposed between the armature 40A and the mounting member 20A. The armature 40A has a plurality of insertion holes 41A formed in a peripheral end portion and a through-hole 42A formed in a center portion.

The insertion holes 41A of the armature 40A are provided at positions corresponding to the projections 202A of the mounting member 20A and the corresponding projections 202A are inserted through the respective insertion holes 41A. In this manner, the armature 40A is arranged so as to be overlapped with the first friction bodies 21A and the second friction bodies 22A in the direction of the rotation axis of the shaft 61A, is mounted on the mounting member 20A, and is restricted from rotating. The armature 40A presses the first friction bodies 21A and the second friction bodies 22A to the mounting member 20A side to thereby implement the brake mechanism with friction of the first friction bodies 21A and the second friction bodies 22A.

As illustrated in FIG. 9, a cylindrical body 9A is formed such that a first length of a cross section orthogonal to the rotation axis of the shaft 61A in a first direction D11 is shorter than a second length of the cross section in a second direction D12 orthogonal to the first direction D11. The cylindrical body 9A has a plurality of insertion holes 94A on both of end portions of a field 91A in the second direction D12. To be specific, the cylindrical body 9A has the insertion holes 94A on both of the end portions of the surface of the field 91A that opposes the armature 40A in the second direction D12.

The spring members 50A are arranged at positions separated from the rotation axis of the shaft 61A in the second direction D12. In the example illustrated in FIG. 9, six spring members 50A are arranged on both of the end portions in the second direction D12. To be specific, for example, three spring members 50A are arranged on each of the end portions in the second direction D12. The respective spring members 50A are arranged in the insertion holes 94A provided in both of the end portions of the field 91A of the cylindrical body 9A in the second direction D12.

As described above, in the brake device 100A, the spring members 50A are arranged not in a hollow hole 93A of the cylindrical body 9A but in the insertion holes 94A provided on both of the end portions of the field 91A in the second direction D12. The brake device 100A can be reduced in the length in the vertical direction (Y-axis direction) by arranging the spring members 50A at the positions separated in the direction along the grounding surface (XY plane) to prevent increase in the length in the first direction D11. Accordingly, a distance between the brake device 100A and the grounding surface is increased when output torque of the brake is equivalent. The electric carriage 1A or the like or a vehicle using the brake device 100A is thereby applicable even to a road with a rough surface, for example.

Second Modification of First Embodiment

Figure 10:
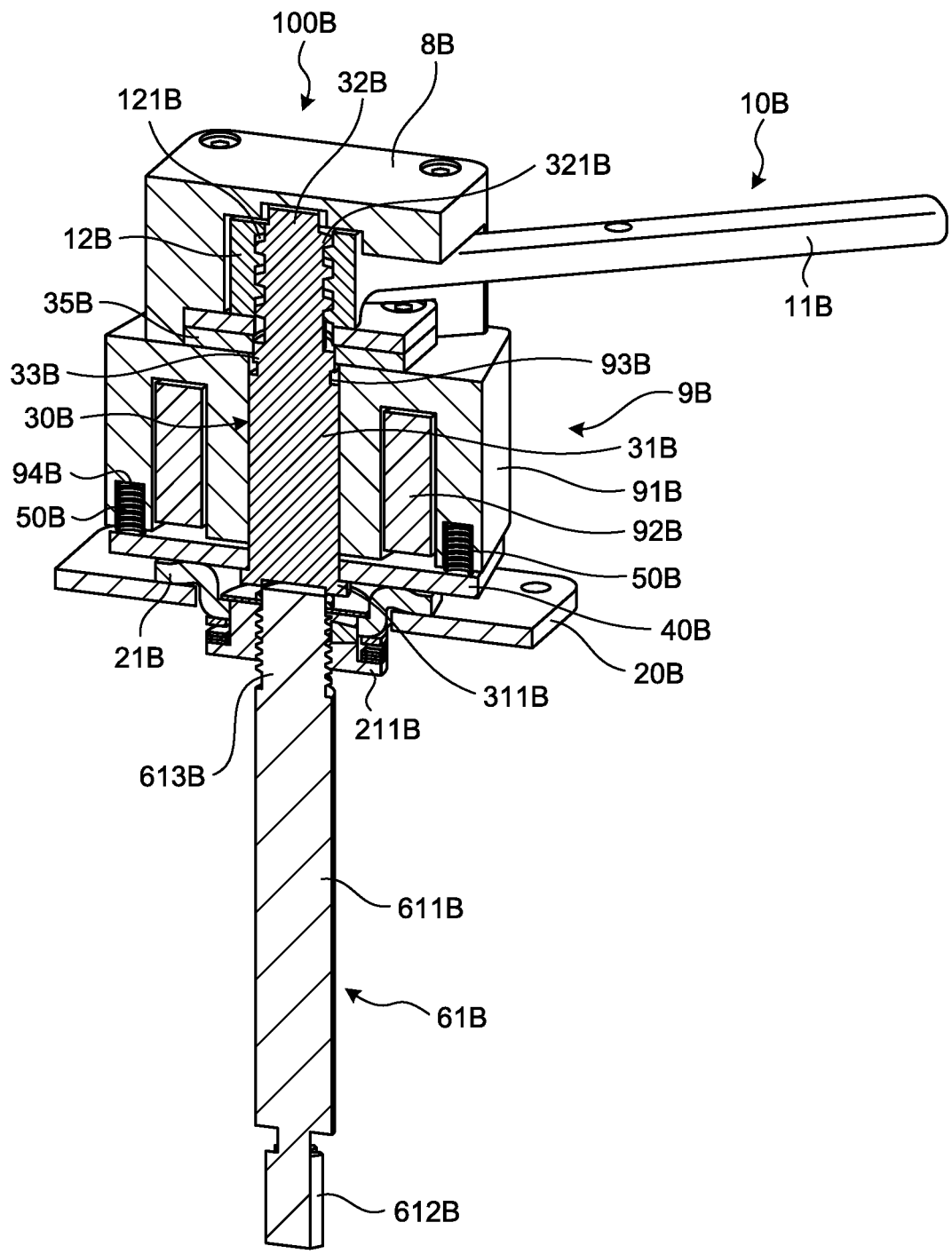
FIG. 10 is a cross-sectional view illustrating a brake device according to a second modification of the first embodiment.
Figure 11:
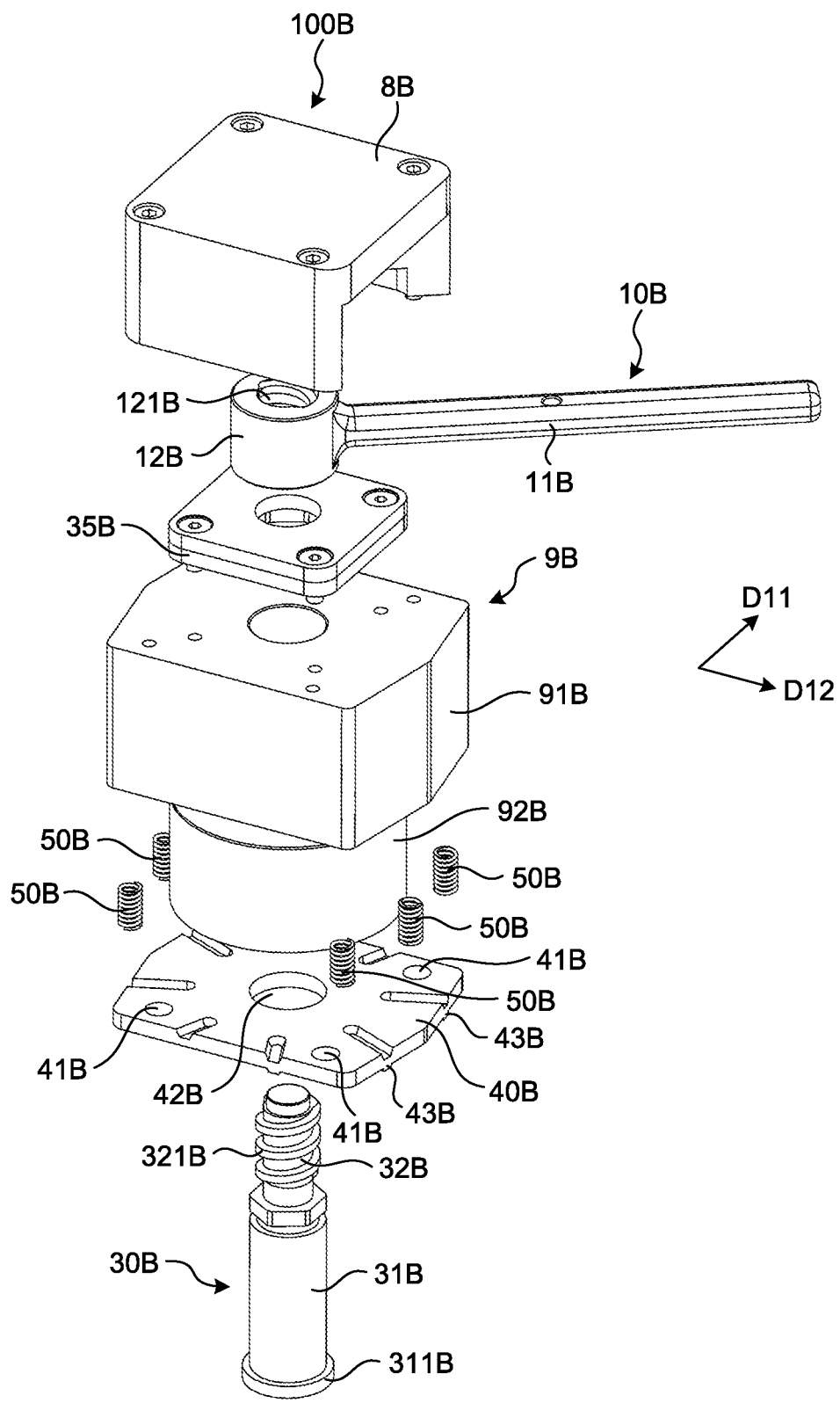
FIG. 11 is an exploded perspective view illustrating the brake device in the second modification of the first embodiment.
Figure 12:
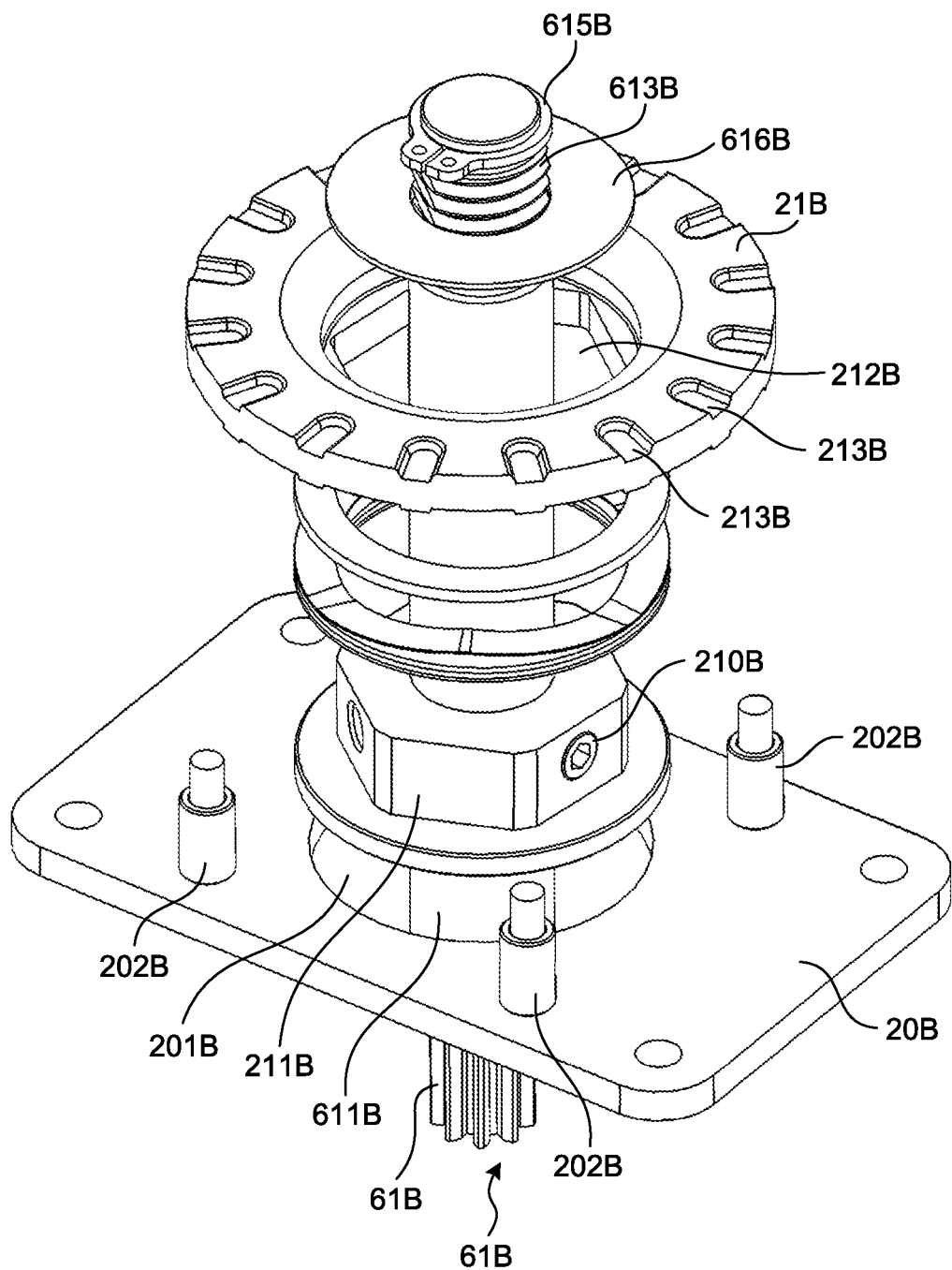
FIG. 12 is a perspective view illustrating a main part of the brake device in the second modification of the first embodiment.

In the above-mentioned examples, the brake device 100 and the brake device 100A have the brake mechanism utilizing contact (surface contact) between the friction bodies. The brake mechanism is however not limited to have the mechanism utilizing the contact and various brake mechanisms utilizing engagement between corrugated members such as gears, for example, may be employed. As for this point, a brake device 100B according to a second modification of the first embodiment will be described with reference to FIGS. 10 to 12. FIG. 10 is a cross-sectional view illustrating the brake device in the second modification of the first embodiment. FIG. 11 is an exploded perspective view illustrating the brake device in the second modification of the first embodiment. FIG. 12 is a perspective view illustrating a main part of the brake device in the second modification of the first embodiment.

In the second modification, "B" is added to the ends of reference numerals for configurations corresponding to the configurations in the embodiment and/or the first modification, and points differing from the embodiment and the first modification will be described below. The same reference numerals as those in the embodiment denote the same configurations as those in the embodiment and/or the first modification and description thereof is omitted as appropriate. That is to say, in the second modification, "*B" replaces "*" and/or "***A" for the same configurations as those in the embodiment and/or the first modification. For example, a cylindrical body 90B in the second modification has the same configuration as the cylindrical body 90A in the first modification and description thereof is omitted.

The brake device 100B in the second modification illustrated in FIGS. 10 to 12 is different from the brake device 100 in the embodiment and the brake device 100A in the first modification in the configuration of a brake mechanism and in the point that the brake device 100B includes no sensor portion. Points differing from those in the brake device 100 and/or the brake device 100A will be described below.

As illustrated in FIG. 10, the brake device 100B includes a first friction body 21B that is arranged between an armature 40B and a mounting member 20B.

A shaft 61B is inserted through a through-hole 201B that is formed in a center portion of the mounting member 20B. A plurality of projections 202B are formed on a peripheral end portion of the mounting member 20B.

The first friction body 21B is formed into a disk shape having an outer diameter that is larger than the diameter of the through-hole 201B of the mounting member 20B. The first friction body 21B is screwed together with a screwing portion 613B of the shaft 61B and is fixed to the shaft 61B by a screw 210B, so that it is mounted on a restricting member 211B rotating together with the shaft 61B. The first friction body 21B has, for example, a hexagonal through-hole 212B in a center portion when seen from above and the restricting member 211B is inserted into the through-hole 212B. The first friction body 21B thereby rotates together with the shaft 61B. The through-hole 212B and the restricting member 211B may have desired shapes as long as the first friction body 21B and the shaft 61B rotate together. The first friction body 21B has a plurality of recesses 213B formed along a peripheral end portion.

The armature 40B is arranged such that the first friction body 21B is interposed between the armature 40B and the mounting member 20B. The armature 40B has a plurality of insertion holes 41B formed in a peripheral end portion and a through-hole 42B formed in a center portion. The armature 40B has a plurality of projections 43B projecting to the side of a surface opposing the first friction body 21B.

The insertion holes 41B of the armature 40B are provided at positions corresponding to the projections 202B of the mounting member 20B and the corresponding projections 202B are inserted through the respective insertion holes 41B. In this manner, the armature 40B is arranged so as to be overlapped with the first friction body 21B in the direction of the rotation axis of the shaft 61B, is mounted on the mounting member 20B, and is restricted from rotating. The projections 43B of the armature 40B are engaged with the recesses 213B of the first friction body 21B. The armature 40B presses the first friction body 21B and the second friction body 22B to the mounting member 20B side to thereby implement the brake mechanism through the engagement between the first friction body 21B and the armature 40B. The brake device 100B has the configuration using one friction body (first friction body 21B) and the armature 40B functions as a second friction body. Alternatively, the second friction body may be provided separately from the armature 40B.

The brake device 100B includes no sensor portion and may therefore include no first case accommodating therein the sensor portion. The brake device 100B is used as, for example, a brake device of a motor for which angle detection is not needed, such as a stepping motor. The shaft 61B is not inserted through a plunger 30B and the shaft 61B therefore has no insertion portion while the screwing portion 613B is at the front end. A C-shaped ring 615B and a washer 616B configuring a slip-off preventive mechanism are provided on the screwing portion 613B. It is sufficient that a corrugated portion of the first friction body and a corrugated portion of the second friction body oppose and are engaged with each other, and one corrugated portion may have an annular shape and the other corrugated portion may have a partially annular shape.

Third Modification of First Embodiment

Figure 13:
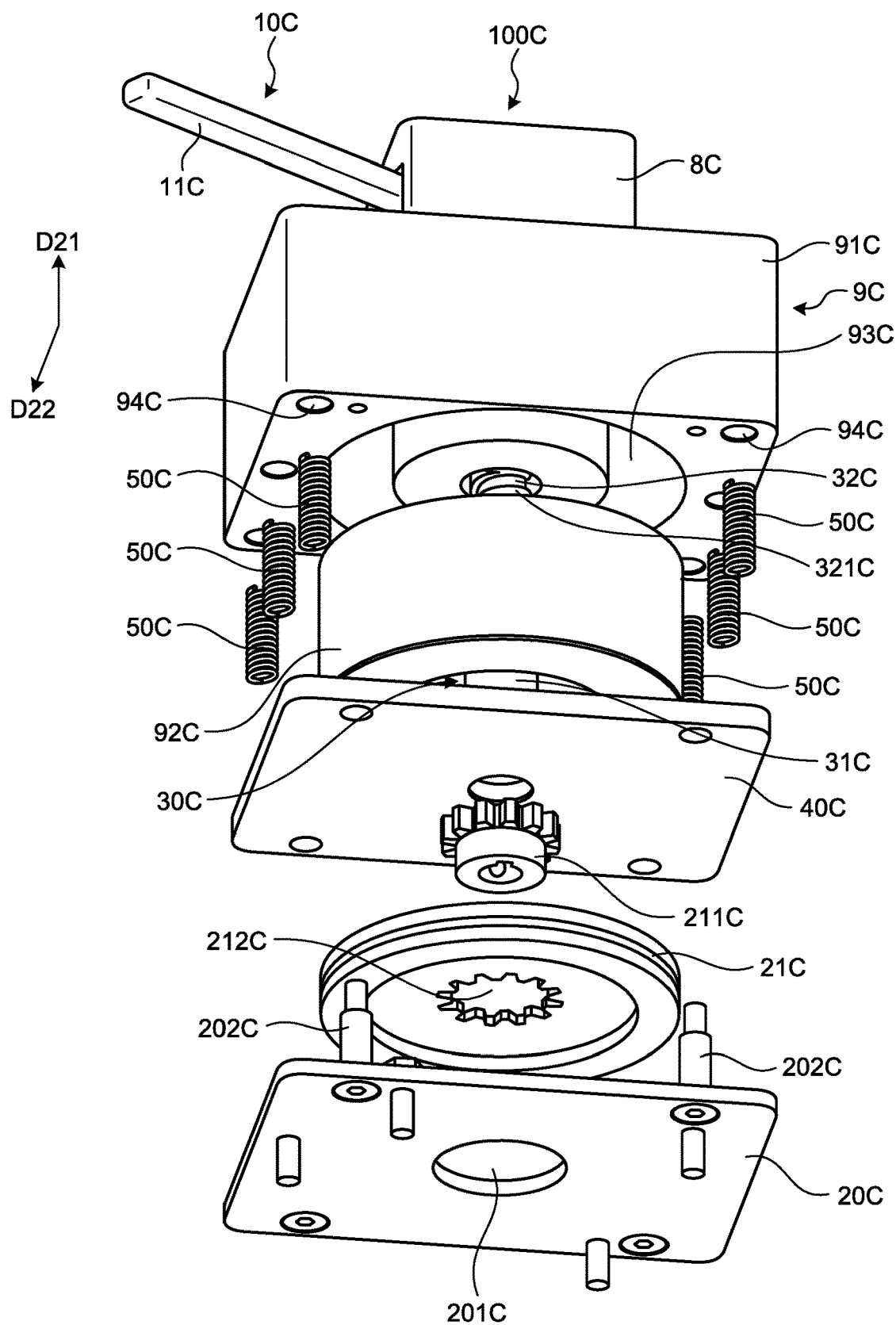
FIG. 13 is an exploded perspective view illustrating a brake device according to a third modification of the first embodiment.

For example, even when a brake device is a single plate-type brake device like the brake device 100 in the embodiment, the spring member may be arranged not in the center portion of the cylindrical body but at a position separated from the rotation axis of the shaft in the second direction. A brake device 100C that is used for an electric carriage 1C according to a third modification of the first embodiment will be described with reference to FIG. 13. FIG. 13 is an exploded perspective view illustrating the brake device in the third modification of the first embodiment.

In the third modification, "C" is added to the ends of reference numerals for configurations corresponding to the configurations in any of the embodiment and the first and second modifications, and points differing from the embodiment and the first and second modifications will be described below. The same reference numerals as those in the embodiment denote the same configurations as those in any of the embodiment and the first and second modifications and description thereof is omitted as appropriate. That is to say, in the third modification, "*C" replaces any of "*", "*A", and "*B" for the same configurations as those in any of the embodiment and the first and second modifications. For example, a switching mechanism 10C in the third modification has the same configuration as the switching mechanism 10 in the embodiment and description thereof is omitted.

The brake device 100C in the third modification illustrated in FIG. 13 is different from the brake device 100 in the embodiment in a shape of a through-hole of a first friction body and in arrangement positions of spring members 50C. Points differing from those in the brake device 100 will be described below.

A first friction body 21C has a gear-shaped through-hole 212C in a center portion when seen from above and, for example, a gear-shaped restricting member 211C is inserted into the through-hole 212C. The first friction body 21C thereby rotates together with a shaft 61C. The through-hole 212C and the restricting member 211C may have desired shapes as long as the first friction body 21C and the shaft 61C rotate together.

As illustrated in FIG. 13, a cylindrical body 9C is formed such that a first length of a cross section orthogonal to the rotation axis of the shaft 61C in a first direction D21 is shorter than a second length of the cross section in a second direction D22 orthogonal to the first direction D21. The cylindrical body 9C has a plurality of insertion holes 94C on both of end portions of a field 91C in the second direction D22. To be specific, the cylindrical body 9C has the insertion holes 94C on both of the end portions of a surface of the field 91C that opposes an armature 40C in the second direction D22.

The spring members 50C are arranged at positions separated from the rotation axis of the shaft 61C in the second direction D22. In the example illustrated in FIG. 13, six spring members 50C are arranged on both of the end portions in the second direction D22. To be specific, three spring members 50C are arranged on each of the end portions in the second direction D22. The respective spring members 50C are arranged in the insertion holes 94C provided on both of the end portions of the field 91C of the cylindrical body 9C in the second direction D22.

As described above, in the brake device 100C, the respective spring members 50C are arranged not in a hollow hole 93C of the cylindrical body 9C but in the insertion holes 94C provided on both of the end portions of the field 91C in the second direction D22. The brake device 100C can therefore be reduced in the length in the vertical direction (Y-axis direction) by arranging the spring members 50C at the positions separated in the direction along the grounding surface (XZ plane) to prevent increase in the length in the first direction D21. Accordingly, a distance between the brake device 100C and the grounding surface is increased when output torque of the brake is equivalent. A range of road surfaces on which the electric carriage 1C or the like or a vehicle using the brake device 100C can travel is increased.

Fourth Modification of First Embodiment

Figure 14:
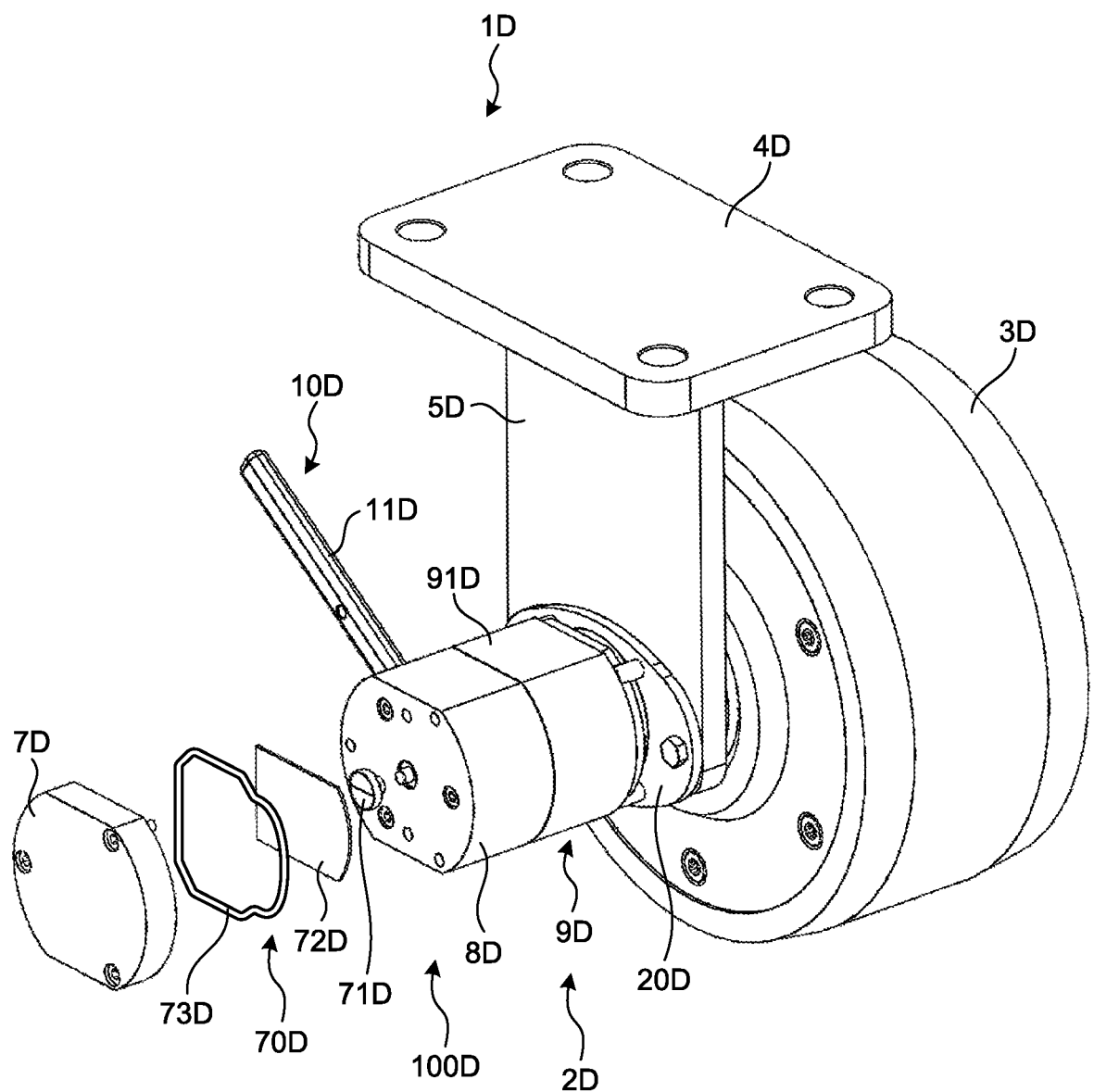
FIG. 14 is an exploded perspective view illustrating an electric carriage using a brake device according to a fourth modification of the first embodiment.
Figure 15:
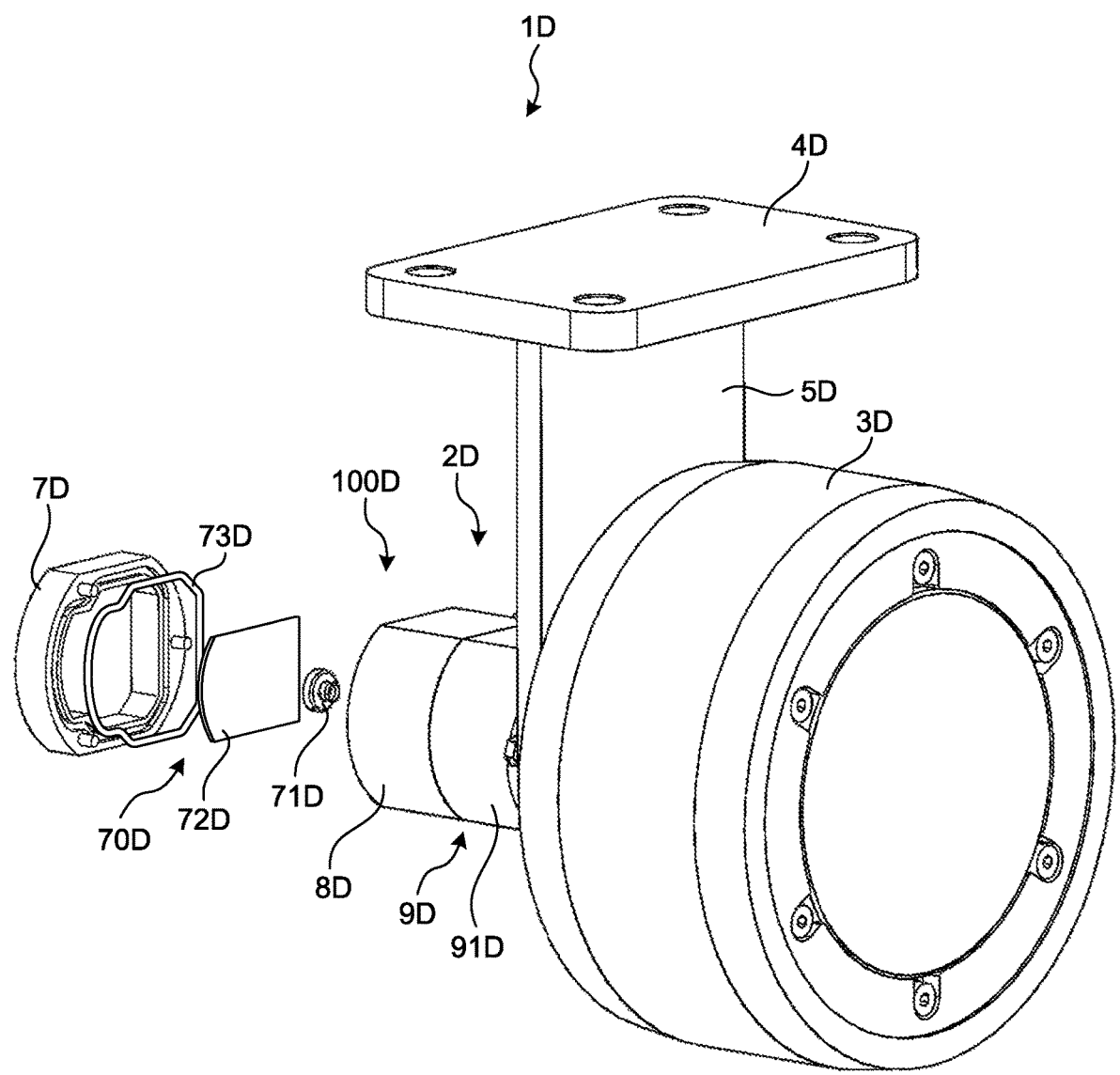
FIG. 15 is an exploded perspective view illustrating the electric carriage using the brake device in the fourth modification of the first embodiment.
Figure 16:
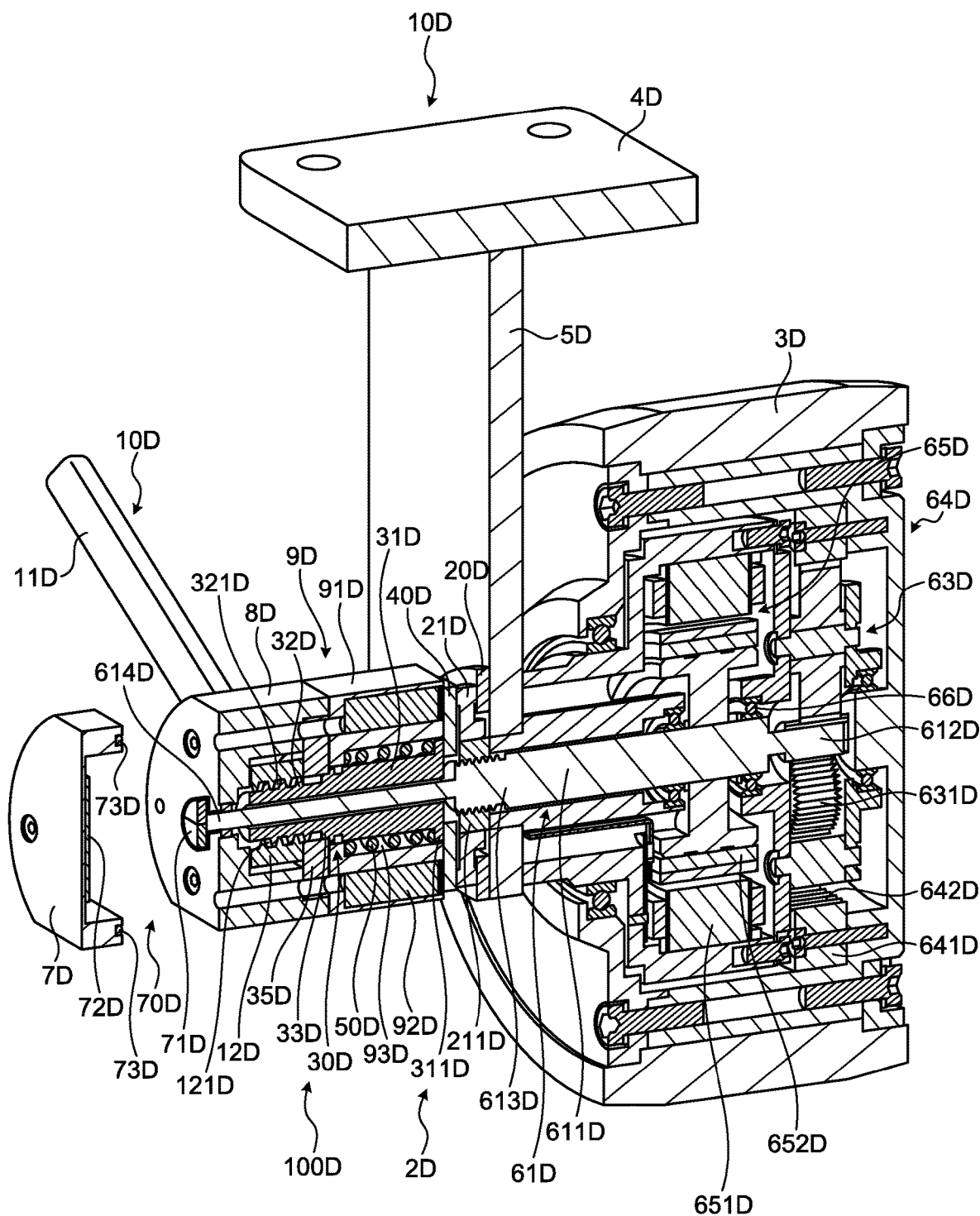
FIG. 16 is a cross-sectional view illustrating the electric carriage using the brake device in the fourth modification of the first embodiment.

A brake device may have, for example, a mechanism for waterproofing and dustproofing in a first case when a sensor portion is arranged in the first case. A brake device 100D that is used for an electric carriage 1D according to a fourth modification of the first embodiment will be described with reference to FIGS. 14 to 16. FIGS. 14 and 15 are exploded perspective views illustrating the electric carriage using the brake device in the fourth modification of the first embodiment. FIG. 14 is an exploded perspective view when seen from the side of the brake device 100D of the electric carriage 1D. FIG. 15 is an exploded perspective view when seen from the side of a tire 3D of the electric carriage 1D. FIG. 16 is a cross-sectional view illustrating the electric carriage using the brake device in the fourth modification of the first embodiment.

In the fourth modification, "D" is added to the ends of reference numerals for configurations corresponding to the configurations in any of the embodiment and the first to third modifications, and points differing from the embodiment and the first to third modifications will be described below. The same reference numerals as those in the embodiment denote the same configurations as those in any of the embodiment and the first to third modifications and description thereof is omitted as appropriate. That is to say, in the fourth modification, "*D" replaces any of "*", "*A" to "*C" for the same configurations as those in any of the embodiment and the first to third modifications. For example, a cylindrical body 9D in the fourth modification has the same configuration as the cylindrical body 9 in the embodiment and description thereof is omitted.

The brake device 100D in the fourth modification illustrated in FIG. 14 includes a sensor portion 70D in a first case 7D. The sensor portion 70D includes a magnet 71D arranged on the rotation axis of a shaft 61D and a substrate 72D on which a circuit and the like of a magnetic sensor are mounted, and functions as a magnetic sensor that detects an angle position of a rotor 652D of a motor 65D as a driving source. As illustrated in FIG. 16, the magnet 71D is arranged on the front end of an insertion portion 614D of the shaft 61D inserted through a plunger 30D. The substrate 72D is arranged at a position opposing the magnet 71D. In the example illustrated in FIG. 16, the substrate 72D is arranged on a left end surface in the first case 7D. The substrate 72D detects magnetic flux change with rotation of the magnet 71D. The sensor portion 70D therefore converts the magnetic flux change with the rotation of the magnet 71D into an electric signal and outputs it.

The sensor portion 70D is arranged in the first case 7D and an opening portion of the first case 7D is covered by one surface of a second case 8D. Water, dust, and the like enter the first case 7D from between the opening portion of the first case 7D and one surface of the second case 8D in some cases. The water, dust, and the like that have entered the first case 7D may influence detection by the sensor portion 70D. The brake device 100D prevents water, dust, and the like from entering the first case 7D from between the opening portion of the first case 7D and the one surface of the second case 8D by providing a packing 73D on the outer circumferential end of the opening portion of the first case 7D. The brake device 100D thereby reduces influence on the sensor portion 70D.

Thus, the brake device 100D keeps waterproofing and dustproofing of the substrate 72D of the sensor portion 70D by arranging the packing 73D between the first case 7D and the second case 8D. Each of the brake device 100 in the embodiment and the brake device 100A in the first modification also has a packing and has the same configuration as that of the brake device 100D. When the sensor portion and the first case are used for the brake device 100B in the second modification or the brake device 100C in the third modification, a packing may be arranged in the same manner as the above-mentioned brake device 100D.

Fifth Modification of First Embodiment

Figure 17:
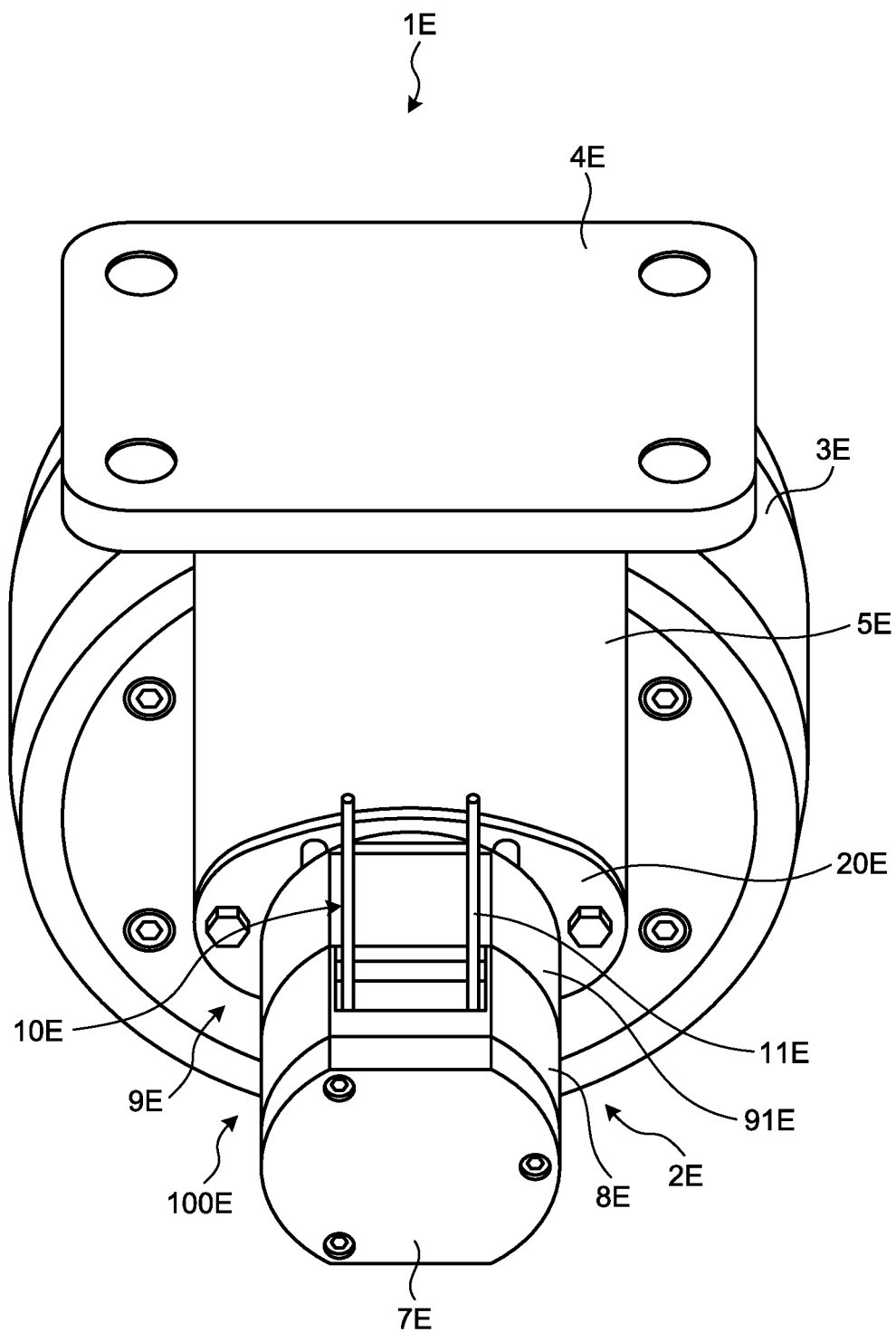
FIG. 17 is a perspective view illustrating an electric carriage using a brake device according to a fifth modification of the first embodiment.
Figure 18:
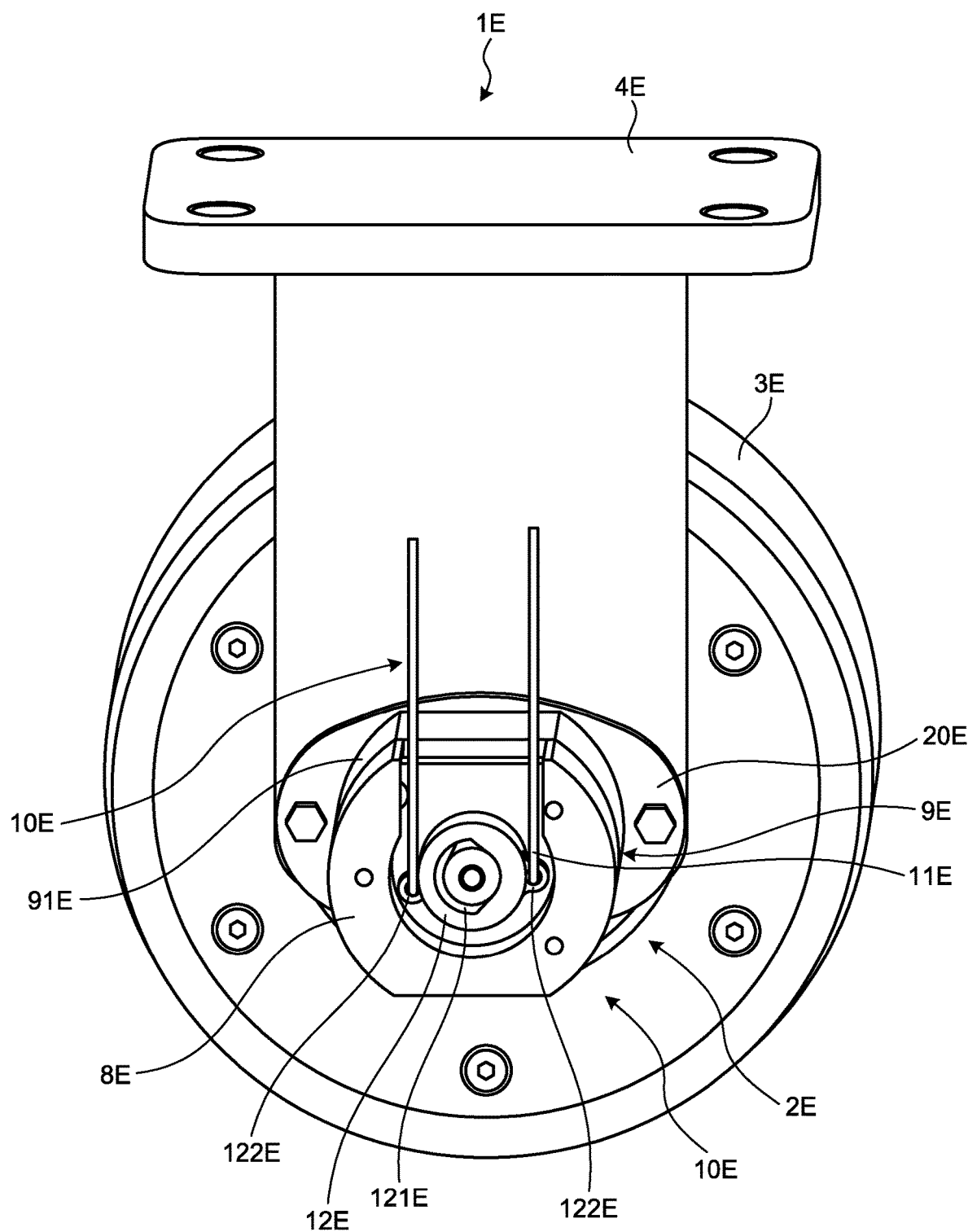
FIG. 18 is a perspective view illustrating the electric carriage using the brake device in the fifth modification of the first embodiment.
Figure 19:
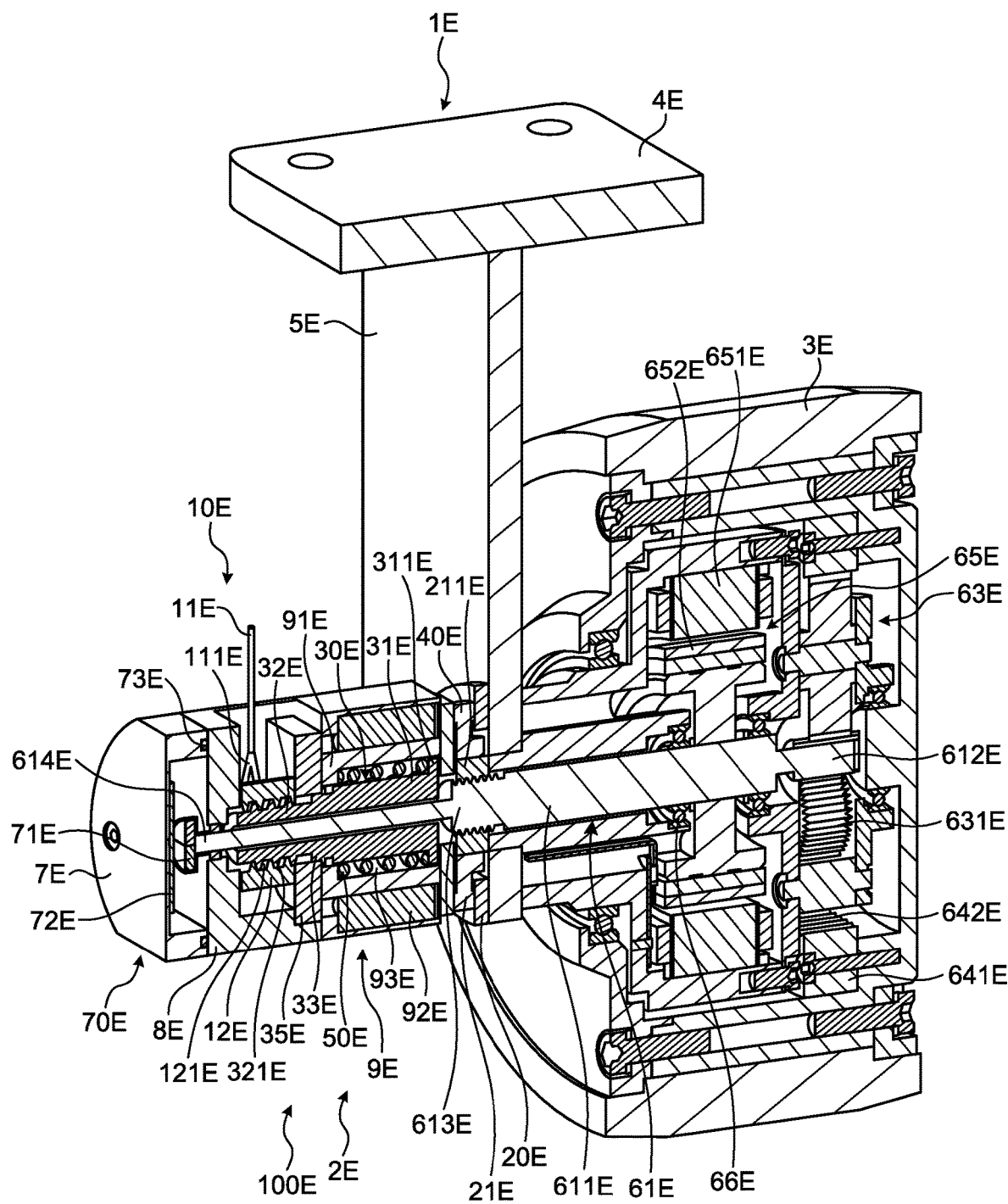
FIG. 19 is a cross-sectional view illustrating the electric carriage using the brake device in the fifth modification of the first embodiment.

In the above-mentioned examples, the lever is provided as the portion receiving the manual operation of the switching mechanism. The manual operation is however not limited to be received by the lever and various configurations may be appropriately employed. The portion receiving the manual operation of the switching mechanism may be, for example, a wire member. A brake device 100E that is used for an electric carriage 1E according to a fifth modification of the first embodiment will be described with reference to FIGS. 17 to 19. FIGS. 17 and 18 are perspective views illustrating the electric carriage using the brake device in the fifth modification of the first embodiment. To be specific, FIG. 17 is a perspective view illustrating an exposure mode of a wire member 11E from a second case 8E in the brake device 100E. Specifically, FIG. 18 is a perspective view illustrating the configuration in the second case 8E while removing a first case 7E and one surface of the second case 8E in the brake device 100E. FIG. 19 is a cross-sectional view illustrating the electric carriage using the brake device in the fifth modification of the first embodiment.

In the fifth modification, "E" is added to the ends of reference numerals for configurations corresponding to the configurations in any of the embodiment and the first to fourth modifications, and points differing from the embodiment and the first to fourth modifications will be described below. The same reference numerals as those in the embodiment denote the same configurations as those in any of the embodiment and the first to fourth modifications and description thereof is omitted as appropriate. That is to say, in the fifth modification, "*E" replaces any of "*" and "*A" to "*D" for the same configurations as those in any of the embodiment and the first to fourth modifications. For example, a cylindrical body 9E in the fifth modification has the same configuration as the cylindrical body 9 in the embodiment and description thereof is omitted.

A switching mechanism 10E is a mechanism receiving a manual operation by a wire and includes wire members 11E and a receiving portion 12E that is screwed together with an end portion 32E of a plunger 30E. The receiving portion 12E of the switching mechanism 10E is formed into a bottomed cylindrical shape and is arranged in the second case 8E. A groove 121E is formed in the receiving portion 12E and a pair of locking portions 122E is provided on a peripheral wall of the receiving portion 12E. As illustrated in FIG. 18, the pair of locking portions 122E is provided on the outer peripheral wall of the receiving portion 12E at positions interposing the center of the receiving portion 12E therebetween. As illustrated in FIG. 19, the wire members 11E are locked to the respective locking portions 122E by inserting front end portions 111E of the respective wire members 11E thereinto. For example, an operator of the electric carriage 1E rotates the receiving portion 12E by pulling the wire member 11E to change a state of the switching mechanism 10E into a desired state among a first state to a third state. The switching mechanism 10E that is operated using the wire members 11E as described above is preferably applied to a motor-assisted vehicle, a handcart with electric assist, or the like. The switching mechanism 10E that is operated using the wire members 11E as described above can, for example, switch a state of the brake device 100E at a position separated from a place at which the brake device 100E is provided. The operator of the brake device 100E can therefore switch the state of the brake device 100E in a state of sitting on the motor-assisted vehicle or a state of pushing the handcart. That is to say, convenience of the operator of the brake device 100E is improved by using the wire members 11E for the switching mechanism 10E.

Sixth Modification of First Embodiment

Figure 20:
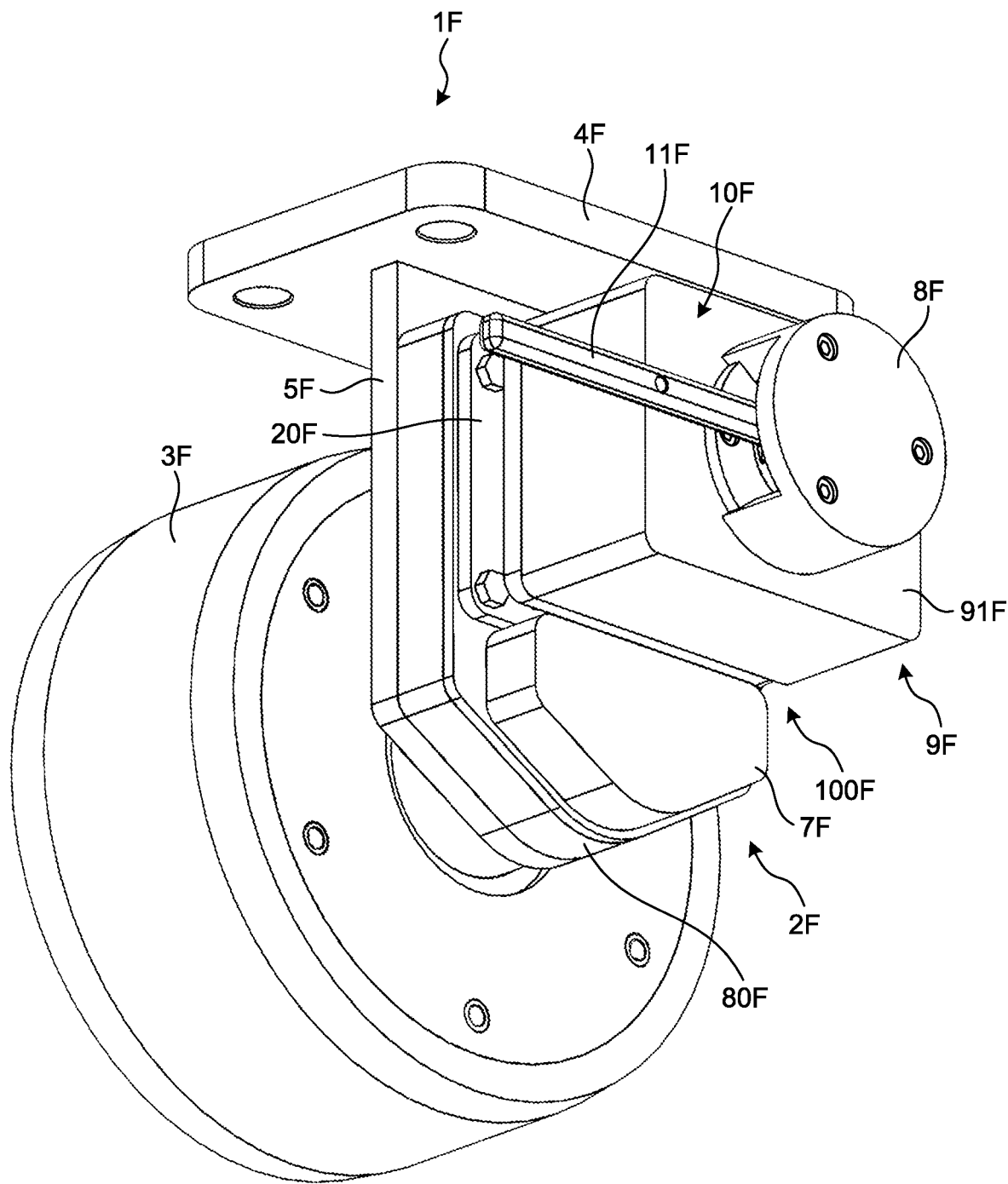
FIG. 20 is a perspective view illustrating an electric carriage using a brake device according to a sixth modification of the first embodiment.
Figure 21:
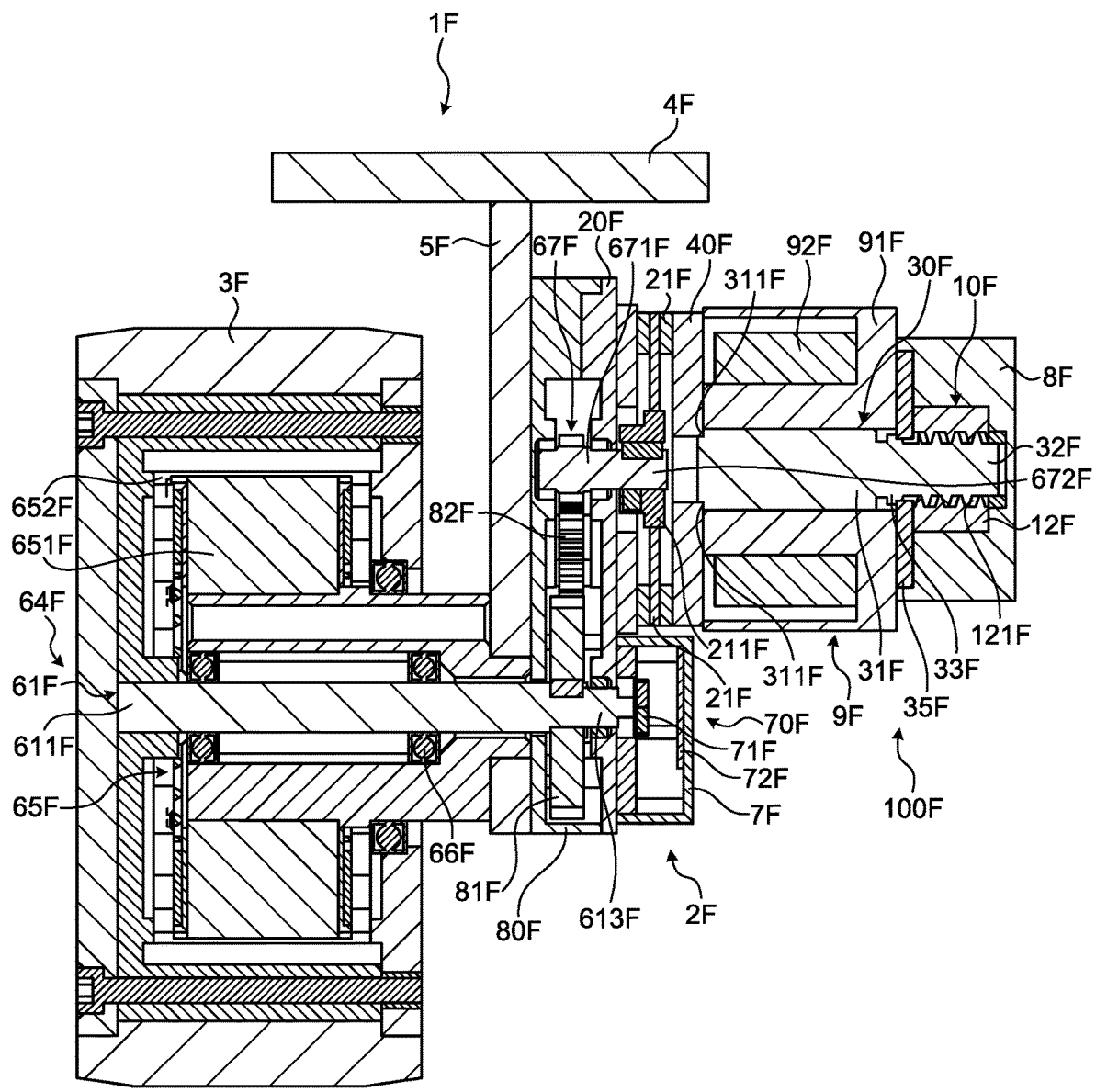
FIG. 21 is a cross-sectional view illustrating the electric carriage using the brake device in the sixth modification of the first embodiment.

In the above-mentioned examples, the brake device is arranged on the rotation axis of the shaft. Alternatively, the brake device may be arranged at a position other than the position on the rotation axis of the shaft. The brake device may include a shaft bar that is different from a shaft extending from a driving source driving a wheel and rotates with rotation of the shaft, for example. As for this point, a brake device 100F according to a sixth modification of the first embodiment will be described with reference to FIGS. 20 and 21. FIG. 20 is a perspective view illustrating an electric carriage using the brake device in the sixth modification of the first embodiment. FIG. 21 is a cross-sectional view illustrating the electric carriage using the brake device in the sixth modification of the first embodiment.

In the sixth modification, "F" is added to the ends of reference numerals for configurations corresponding to the configurations in any of the embodiment and the first to fifth modifications, and points differing from the embodiment and the first to fifth modifications will be described below. The same reference numerals as those in the embodiment denote the same configurations as those in any of the embodiment and the first to fifth modifications and description thereof is omitted as appropriate. That is to say, in the sixth modification, "*F" replaces any of "*" and "*A" to "*E" for the same configurations as those in any of the embodiment and the first to fifth modifications. For example, a tire 3F in the sixth modification has the same configuration as the tire 3 in the embodiment and description thereof is omitted.

The brake device 100F in the sixth modification illustrated in FIGS. 20 and 21 is different from the other brake devices 100 to 100E in the point that the brake device 100F includes a shaft bar differing from the shaft. Points differing from those in the other brake devices 100 to 100E will be described below.

As illustrated in FIG. 21, the brake device 100F includes a gear 81F, a gear 82F, and a shaft bar 67F that are arranged in a third case 80F. A mounting portion 613F of a shaft 61F is inserted into the third case 80F and the gear 81F is mounted on the mounting portion 613F. The gear 81F is engaged with the gear 82F. The gear 82F is engaged with a gear formed on a peripheral wall of a base portion 671F of the shaft bar 67F. The shaft bar 67F thereby rotates together with the shaft 61F that rotates in accordance with driving of a motor 65F. A front end portion 672F of the shaft bar 67F that is continuous to the base portion 671F projects to the outside of the third case 80F and a restricting member 211F is mounted thereon. A first friction body 21F is mounted on the restricting member 211F and the first friction body 21F rotates together with the shaft bar 67F. For example, in the motor 65F, a rotor 652F is arranged on the outer circumferential side of a stator 651F. In this manner, the motor 65F that is used for a driving device 2F may be of an outer rotor type.

As described above, in the driving device 2F of the electric carriage 1F, an output shaft (shaft 61F) of the motor 65F and a shaft (shaft bar 67F) of the brake are provided as separate bodies and a gear box (third case 80F) for the brake device 100F is provided. This configuration can implement a stronger brake than a brake in which the output shaft of the motor and the shaft of the brake are coaxial. That is to say, in the brake device 100F, torque of the brake mechanism can be amplified by interposing the gears between the shaft bar 67F of the brake device 100F and the shaft 61F rotating together with the motor 65F.

Seventh Modification of First Embodiment

Figure 22:
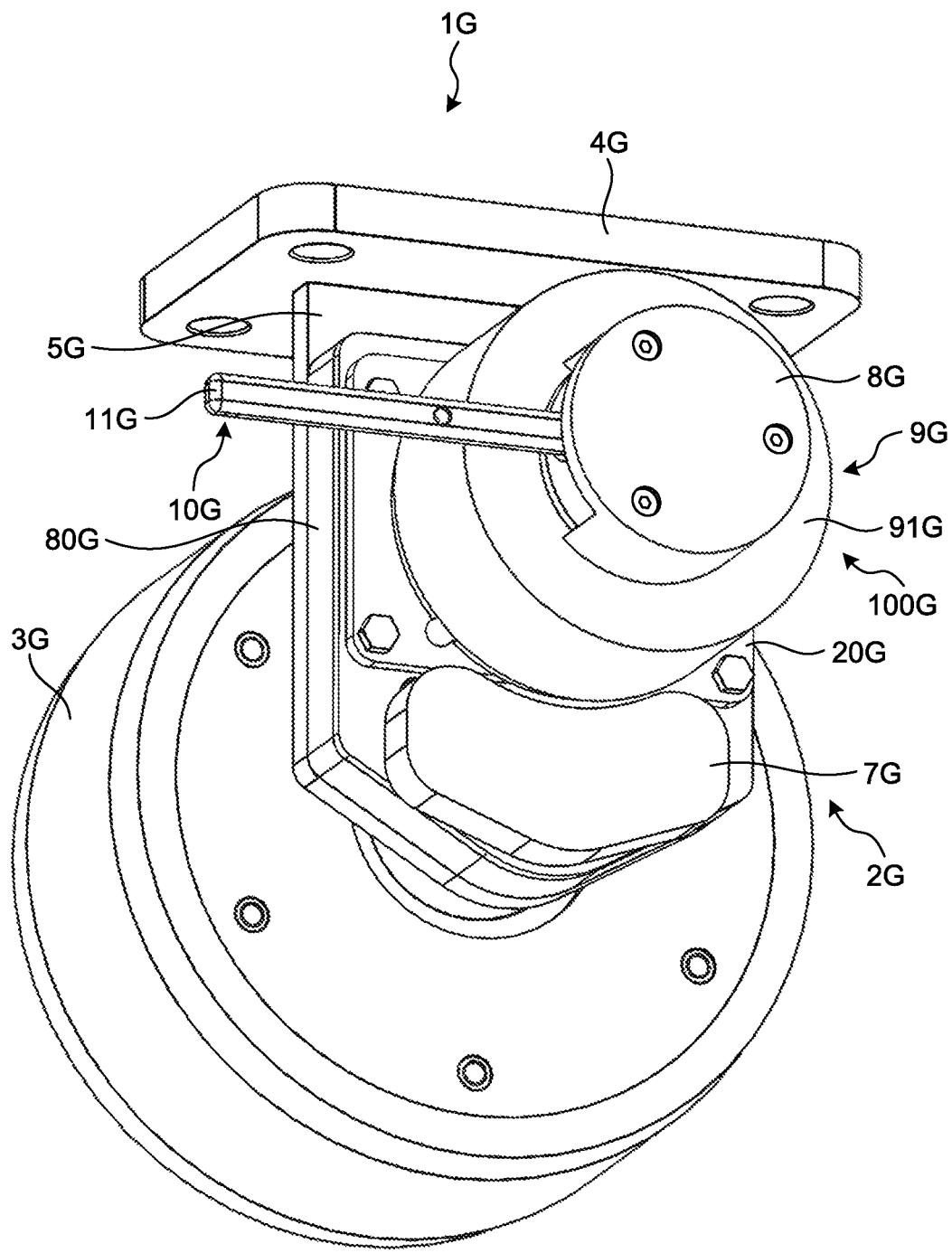
FIG. 22 is a perspective view illustrating an electric carriage using a brake device according to a seventh modification of the first embodiment.
Figure 23:
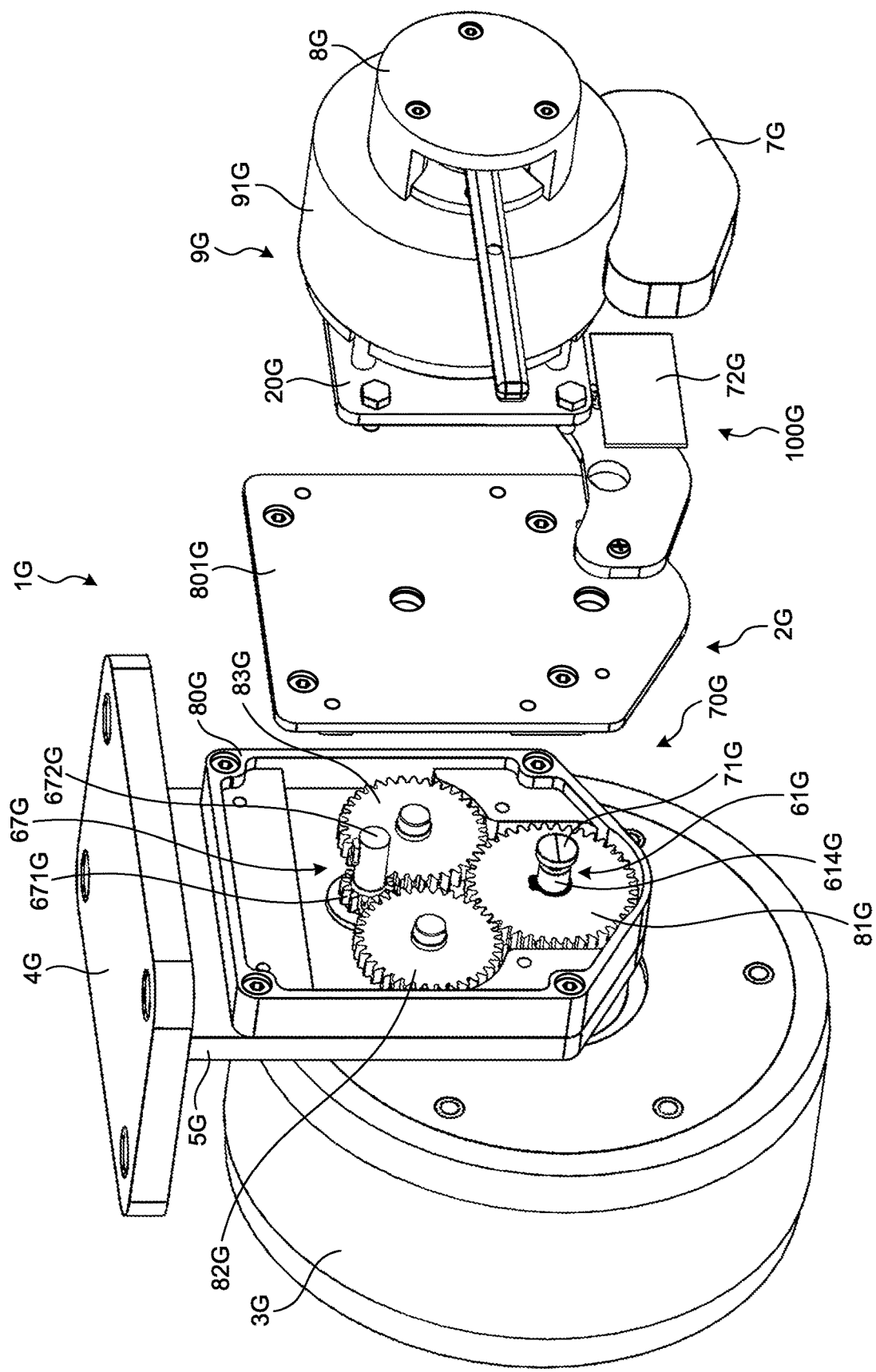
FIG. 23 is an exploded perspective view illustrating the electric carriage using the brake device in the seventh modification of the first embodiment.

In the above-mentioned examples, the brake device is arranged on the rotation axis of the shaft. Alternatively, the brake device may be arranged at a position other than the position on the rotation axis of the shaft. The brake device may include a shaft bar that is different from a shaft extending from a driving source driving a wheel and rotates with rotation of the shaft, for example. As for this point, a brake device 100G according to a seventh modification of the first embodiment will be described with reference to FIGS. 22 and 23. FIG. 22 is a perspective view illustrating an electric carriage using the brake device in the seventh modification of the first embodiment. FIG. 23 is an exploded perspective view illustrating the electric carriage using the brake device in the seventh modification of the first embodiment.

In the seventh modification, "G" is added to the ends of reference numerals for configurations corresponding to the configurations in any of the embodiment and the first to sixth modifications, and points differing from the embodiment and the first to sixth modifications will be described below. The same reference numerals as those in the embodiment denote the same configurations as those in any of the embodiment and the first to sixth modifications and description thereof is omitted as appropriate. That is to say, in the seventh modification, "*G" replaces any of "*" and "*A" to "*F" for the same configurations as those in any of the embodiment and the first to sixth modifications. For example, a tire 3G in the seventh modification has the same configuration as the tire 3 in the embodiment and description thereof is omitted.

The brake device 100G in the seventh modification illustrated in FIGS. 22 and 23 is different from the other brake devices 100 to 100E in the point that the brake device 100G includes the shaft bar differing from the shaft. The brake device 100G in the seventh modification is different from the brake device 100F in the sixth modification in the configurations of gears in a third case. Points differing from those in the brake devices 100 to 100F will be described below.

As illustrated in FIG. 23, a sensor portion 70G and the brake device 100G are arranged in parallel. A magnet 71G of the sensor portion 70G is arranged on a front end portion 614G of a shaft 61G. The brake device 100G includes a gear 81G, a gear 82G, a gear 83G, and a shaft bar 67G that are arranged in a third case 80G and a lid portion 801G thereof. A mounting portion 613G of the shaft 61G is inserted into the third case 80G and the gear 81G is mounted on the mounting portion 613G. The gear 81G is engaged with the gear 82G and the gear 83G. The gear 82G and the gear 83G are engaged with a gear formed on a peripheral wall of a base portion 671G of the shaft bar 67G. The shaft bar 67G thereby rotates together with the shaft 61G that rotates in accordance with driving of a motor 65G. A front end portion 672G of the shaft bar 67G that is continuous to the base portion 671G projects to the outside of the third case 80G and a restricting member 211G is mounted thereon. A first friction body 21G is mounted on the restricting member 211G and rotates together with the shaft bar 67G.

As described above, in a driving device 2G of an electric carriage 1G, the motor 65G and the brake device 100G are arranged in parallel coaxially and have different shafts (the shaft 61G and the shaft bar 67G). The magnet 71G of the sensor portion 70G is mounted on the front end portion 614G of the shaft 61G penetrating through a torque amplification box (third case 80G). A magnetic flux generated from the magnet 71G mounted on the end portion 614G of the shaft 61G as the shaft of the motor 65G is detected to detect an angle position of a rotor of the motor 65G. In the brake device 100G, torque of the brake mechanism can be amplified by interposing the gears between the shaft bar 67G of the brake device 100G and the shaft 61G rotating together with the motor 65G.

Eighth Modification of First Embodiment

Figure 24:
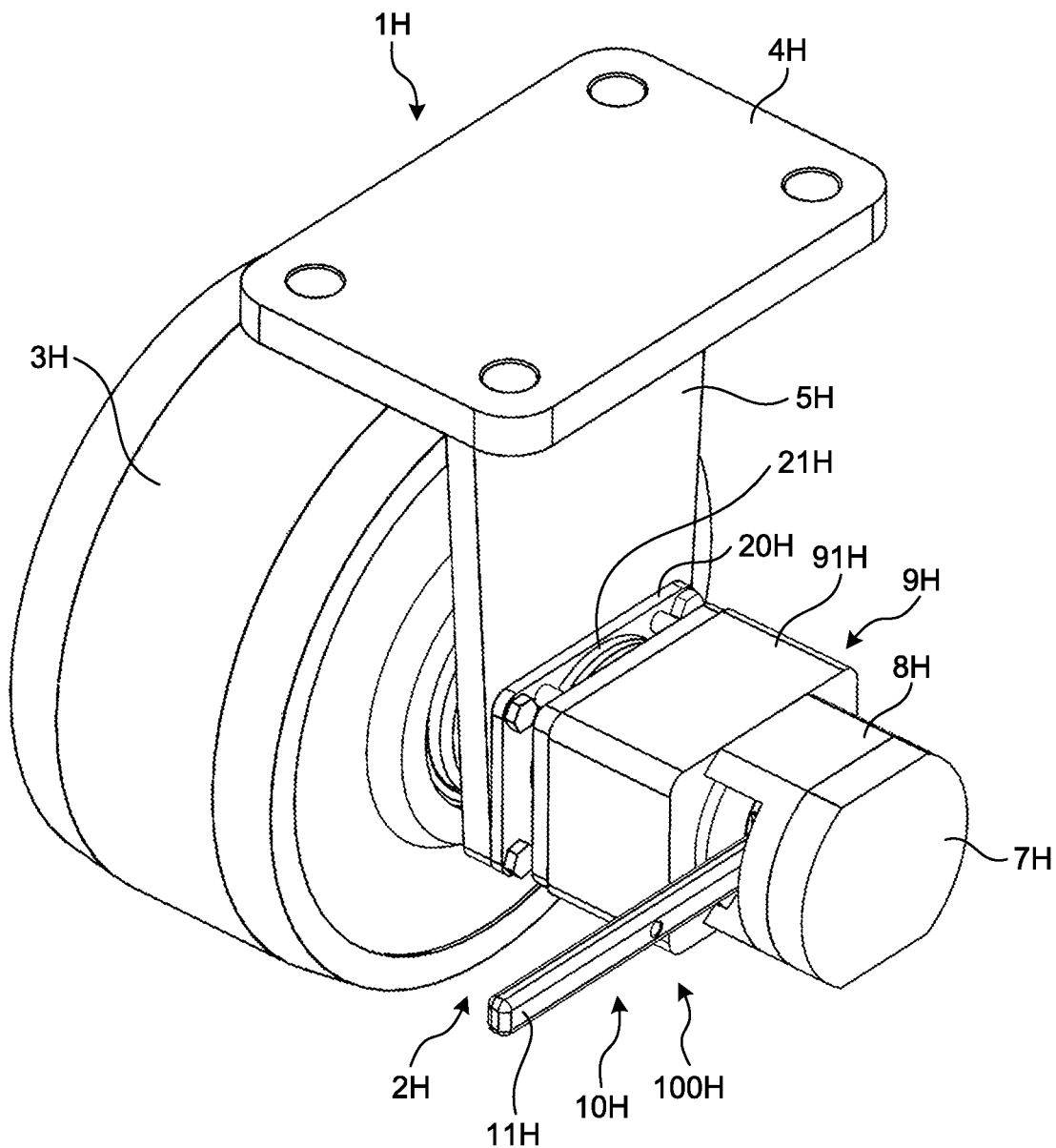
FIG. 24 is a perspective view illustrating an electric carriage using a brake device according to an eighth modification of the first embodiment.
Figure 25:
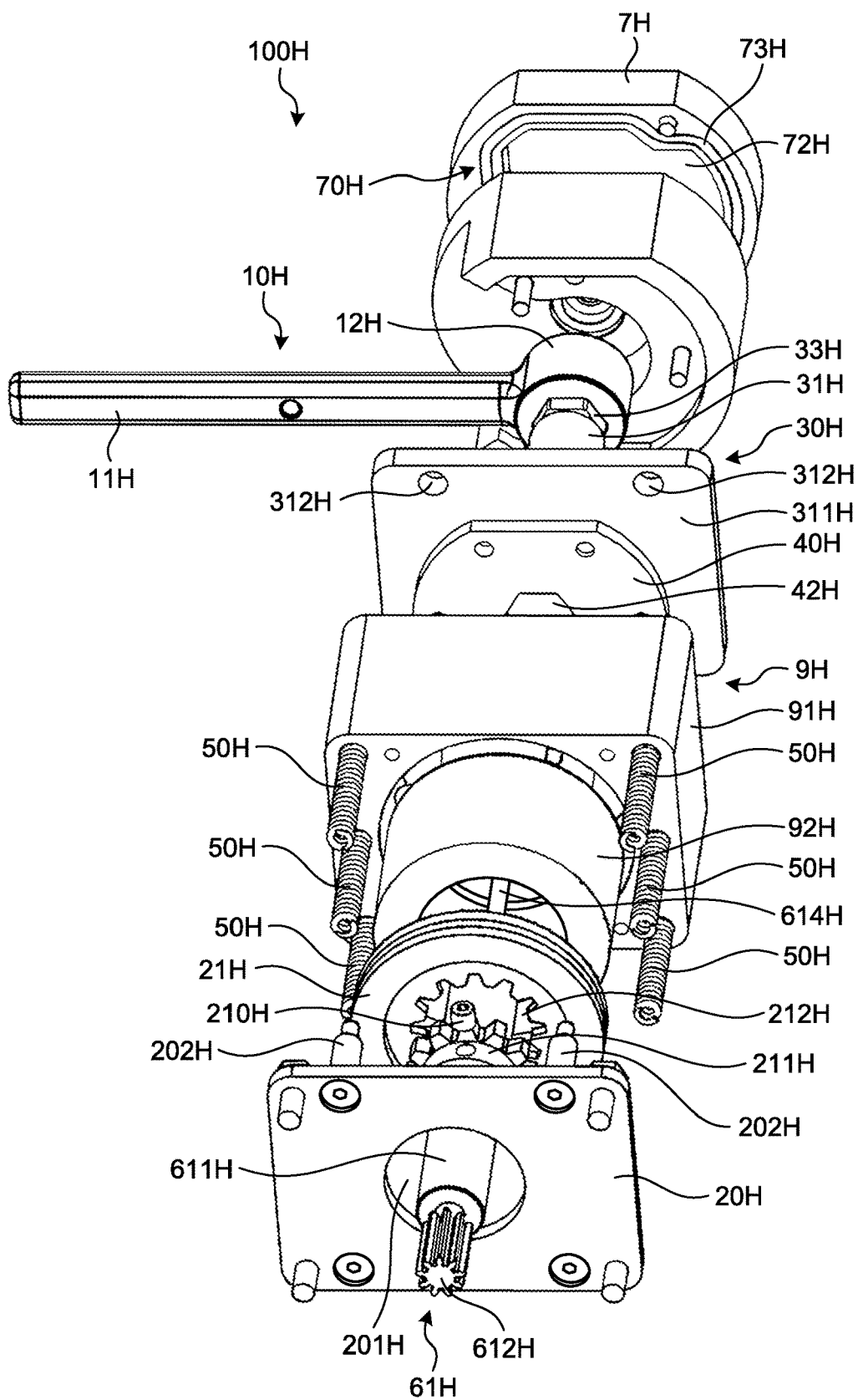
FIG. 25 is an exploded perspective view illustrating the brake device in the eighth modification of the first embodiment.

A brake device configured by appropriately combining various configurations in the above-mentioned embodiment and the first to seventh modifications may be employed. As for this point, a brake device 100H according to an eighth modification of the first embodiment will be described with reference to FIGS. 24 and 25. FIG. 24 is a perspective view illustrating an electric carriage using the brake device in the eighth modification of the first embodiment. FIG. 25 is an exploded perspective view illustrating the brake device in the eighth modification of the first embodiment.

In the eighth modification, "H" is added to the ends of reference numerals for configurations corresponding to the configurations in any of the embodiment and the first to seventh modifications, and points differing from the embodiment and the first to seventh modifications will be described below. The same reference numerals as those in the embodiment denote the same configurations as those in any of the embodiment and the first to seventh modifications and description thereof is omitted as appropriate. That is to say, in the eighth modification, "*H" replaces any of "*" and "*A" to "*G" for the same configurations as those in any of the embodiment and the first to seventh modifications. For example, a tire 3H in the eighth modification has the same configuration as the tire 3 in the embodiment and description thereof is omitted.

Hereinafter, the configuration of the brake device 100H in the eighth modification illustrated in FIGS. 24 and 25 will be described. Arrangement in the exploded view illustrated in FIG. 25 is the arrangement for illustrating respective configurations of the brake device 100H and does not illustrate a positional relation in the brake device 100H. For example, a flange portion 311H of a plunger 30H and an armature 40H are located between a cylindrical body 9H and a first friction body 21H in the brake device 100H.

As illustrated in FIG. 25, the brake device 100H includes a sensor portion 70H in a first case 7H in the same manner as the brake device 100D in the fourth modification. The sensor portion 70H includes a magnet (not illustrated) arranged on the rotation axis of a shaft 61H and a substrate 72H on which a circuit and the like of a magnetic sensor are mounted, and functions as a magnetic sensor that detects an angle position of a rotor 652H of a motor 65H as a driving source. The magnet of the sensor portion 70H is arranged on the front end of an insertion portion 614H of the shaft 61H inserted through the plunger 30H in the same manner as the magnet 71D in the fourth modification. The brake device 100H can prevent water, dust, and the like from entering the first case 7H from between an opening portion of the first case 7H and one surface of a second case 8H by providing a packing 73H on the outer circumferential end of the opening portion of the first case 7H. The brake device 100H can thereby reduce influence on the sensor portion 70H.

The brake device 100H includes the first friction body 21H. The brake device 100H implements a brake mechanism with friction generated by pressing the first friction body 21H between the armature 40H and a mounting member 20H in the same manner as the brake device 100 in the embodiment. The first friction body 21H is arranged between the armature 40H and the mounting member 20H. The brake device 100H can thereby reduce cost by employing what is called a single plate-type brake mechanism.

The first friction body 21H has a gear-shaped through-hole 212H in a center portion when seen from above in the same manner as the brake device 100C in the third modification. The first friction body 21H includes a restricting member 211H having, for example, a gear shape and fixed to the shaft 61H by a screw 210H, and the restricting member 211H is inserted through the through-hole 212H. The first friction body 21H thereby rotates together with the shaft 61H.

As illustrated in FIG. 25, spring members 50H are arranged on both of end portions of the cylindrical body 9H in the same manner as the brake device 100A in the first modification. For example, six spring members 50H are arranged on both of the end portions of the cylindrical body 9H. To be specific, for example, three spring members 50H are arranged on each of the end portions of the cylindrical body 9H. For example, the respective spring members 50H are arranged in insertion holes (not illustrated) provided on both of end portions of a field 91H of the cylindrical body 9H. The cylindrical body 9H is formed into such shape (for example, rectangular shape) that the above-mentioned spring members 50H can be arranged therein. The brake device 100H can thereby implement a stronger brake with biasing force of the spring members 50H.

The armature 40H is, for example, fixed to the plunger 30H. The flange portion 311H of the plunger 30H has insertion holes 312H through which projections 202H of the mounting member 20H are inserted. The insertion holes 312H of the flange portion 311H are provided at positions corresponding to the projections 202H of the mounting member 20H and the corresponding projections 202H are inserted through the respective insertion holes 312H.

In the brake device 100H, the outer shapes of the first case 7H and the second case 8H when seen from above are formed into substantially elliptical shapes to thereby reduce cost in comparison with the case in which the outer shapes of the first case and the second case when seen from above are formed into rectangular shapes. Employment of the above-mentioned configuration can implement the brake device 100H achieving the cost and the brake strength with a good balance in comparison with the other brake devices 100, and 100A to 100G.

It should be noted that the above-mentioned embodiment does not limit the present invention. The present invention also encompasses configurations provided by appropriately combining the above-mentioned components. Those skilled in the art can easily derive further effects and modifications. A wider mode of the present invention is not limited by the above-described embodiment and various changes can be made. A desired motor that is used as the driving source of the driving device may be employed as long as the above-mentioned brake device can be applied thereto and any type of motor, such as a direct drive-type motor and an axial gap-type motor, may be employed.

Second Embodiment

Figure 26:
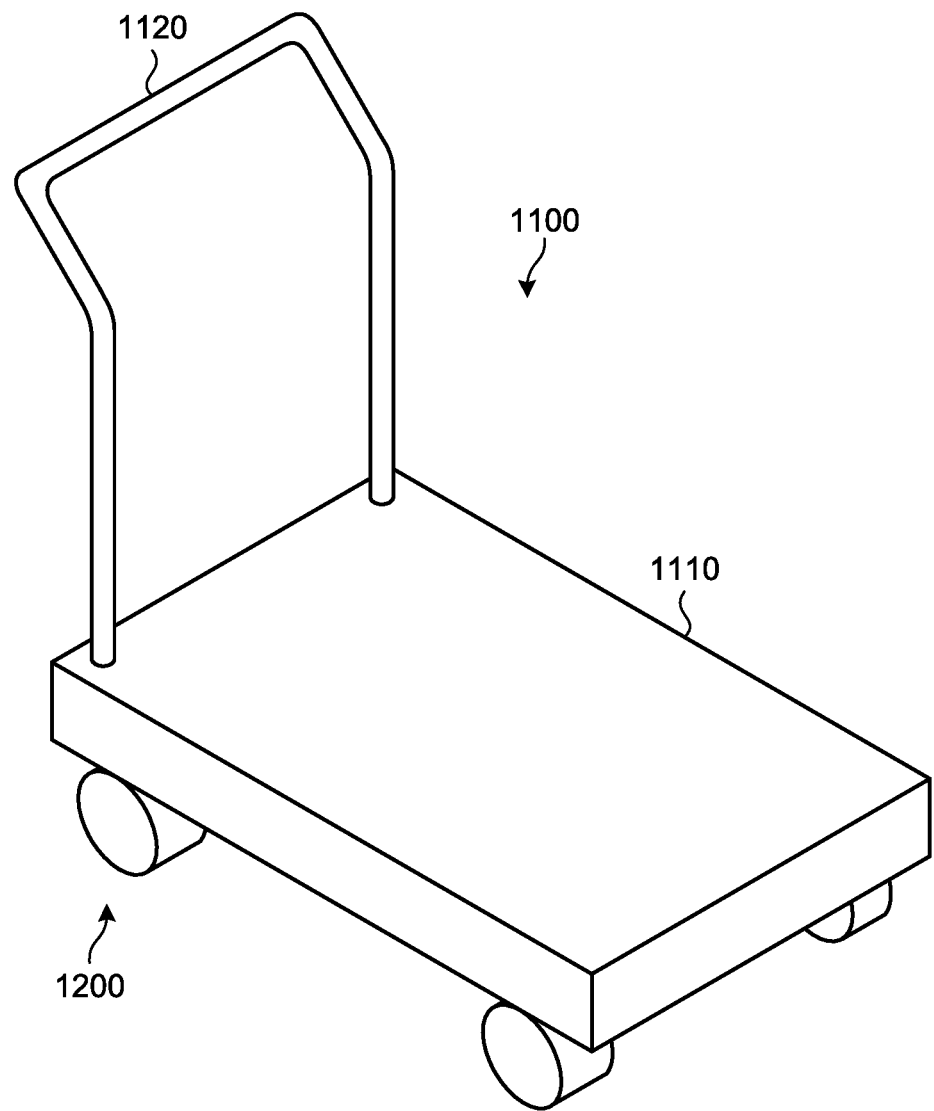
FIG. 26 is a perspective view illustrating an outer appearance of a carriage including a wheel module according to a second embodiment.

FIG. 26 is a perspective view illustrating an outer appearance of a carriage 1100 including a wheel module according to a second embodiment. As illustrated in FIG. 26, the carriage 1100 includes a cargo bed 1110, a handle 1120, and a wheel module 1200. The cargo bed 1110 is a member formed into a thick plate shape and cargo is placed on the surface thereof. The handle 1120 is a bar-shaped curved member that a user grips when moving the carriage 1100, and is mounted on the upper surface of the cargo bed 1110. The wheel module 1200 is a wheel rotating with a driving current supplied from a power supply (not illustrated), and is mounted on the back surface of the cargo bed 1110.

The wheel module 1200 is used as a movement mechanism of the carriage 1100. The wheel module 1200 is driven for an auxiliary purpose when the user loads the cargo on the cargo bed 1110 for transportation, and is driven in accordance with a distance from another carriage when the carriage 1100 has a function of self-running while following another car. The wheel module 1200 may be provided as a front wheel, a rear wheel, or each of the front wheel and rear wheel to the carriage 1100.

Figure 27:
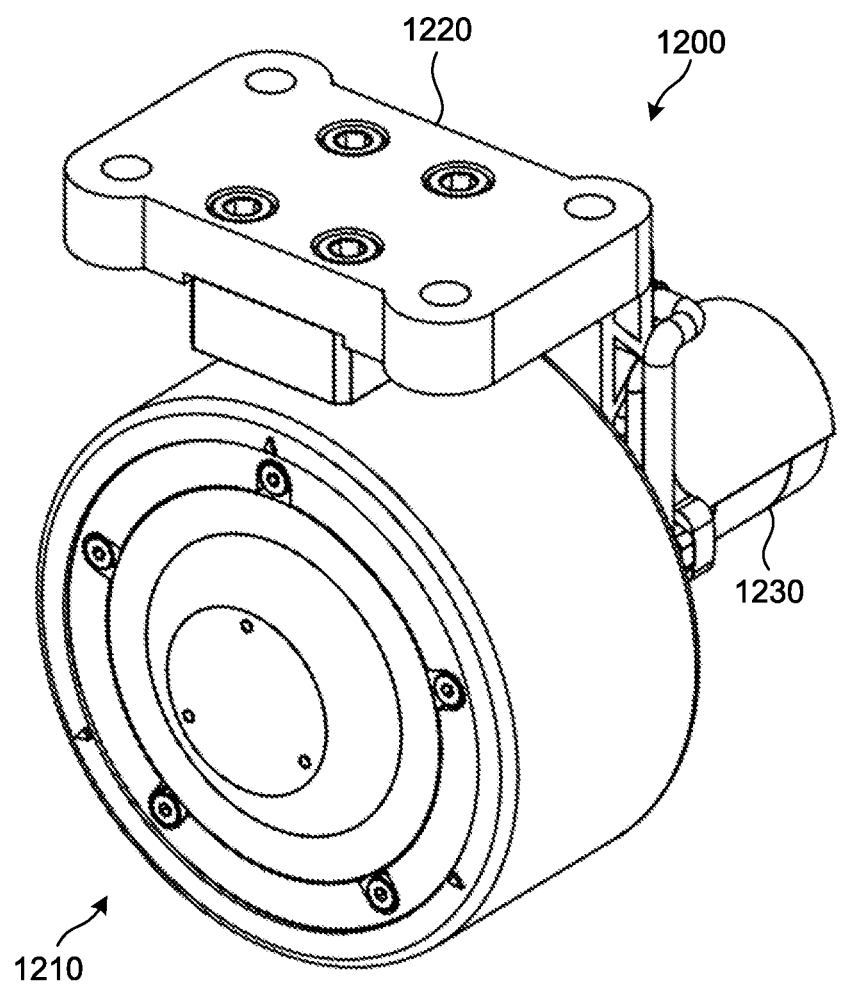
FIG. 27 is a perspective view illustrating an outer appearance of the wheel module in the second embodiment.

FIG. 27 is a perspective view illustrating an outer appearance of the wheel module 1200 in the second embodiment. As illustrated in FIG. 27, the wheel module 1200 includes a wheel portion 1210, a support member 1220, and a brake portion 1230. The wheel portion 1210 is driven with the driving current supplied from the power supply (not illustrated), and rotates about a rotation axis. The support member 1220 is mounted on the back surface of the cargo bed 1110 of the carriage 1100 and supports the wheel portion 1210. The brake portion 1230 stops or releases rotation of the wheel portion 1210 in accordance with control by a control mechanism (not illustrated), a user, or the like.

The support member 1220 supports the rotation axis of the wheel portion 1210 from one side in the axial direction of the wheel portion 1210. That is to say, the wheel module 1200 in the embodiment has a cantilever shaft structure. The wheel module 1200 in the embodiment is configured so as to ensure rigidity even with the cantilever shaft structure, as will be described below.

In the embodiment, the wheel module 1200 is mounted in the vicinity of an end portion of the back surface of the cargo bed 1110 of the carriage 1100 and the wheel portion 1210 is arranged on the outer side of the support member 1220, as an example. In the following description, in the axial direction of the rotation axis of the wheel module 1200, the side close to the inner side of the carriage 1100 is referred to as a "back side" and the side close to the outer side of the carriage 1100 is referred to as a "front side".

Figure 28:
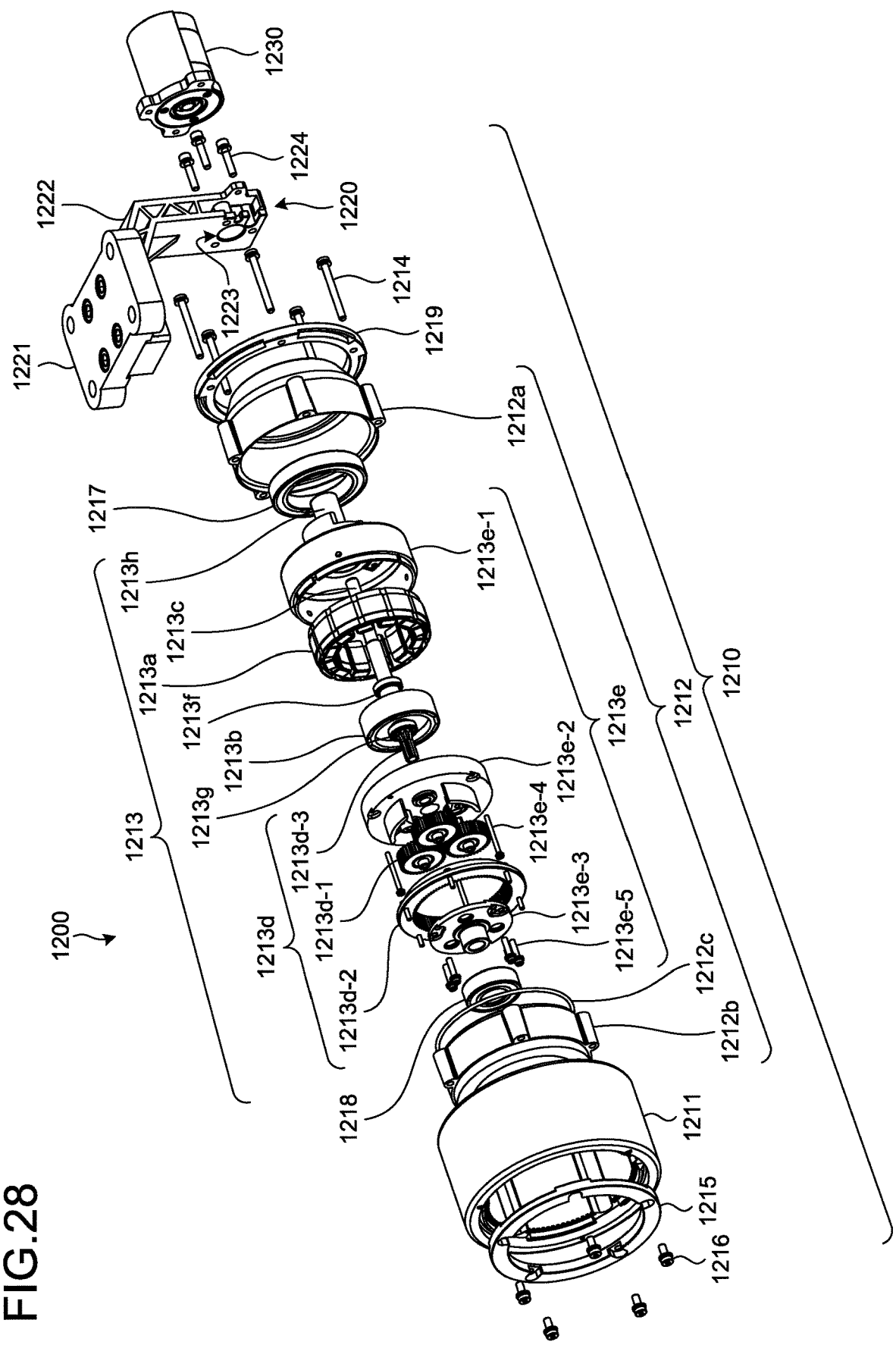
FIG. 28 is an exploded perspective view illustrating the configuration of the wheel module in the second embodiment.
Figure 29:
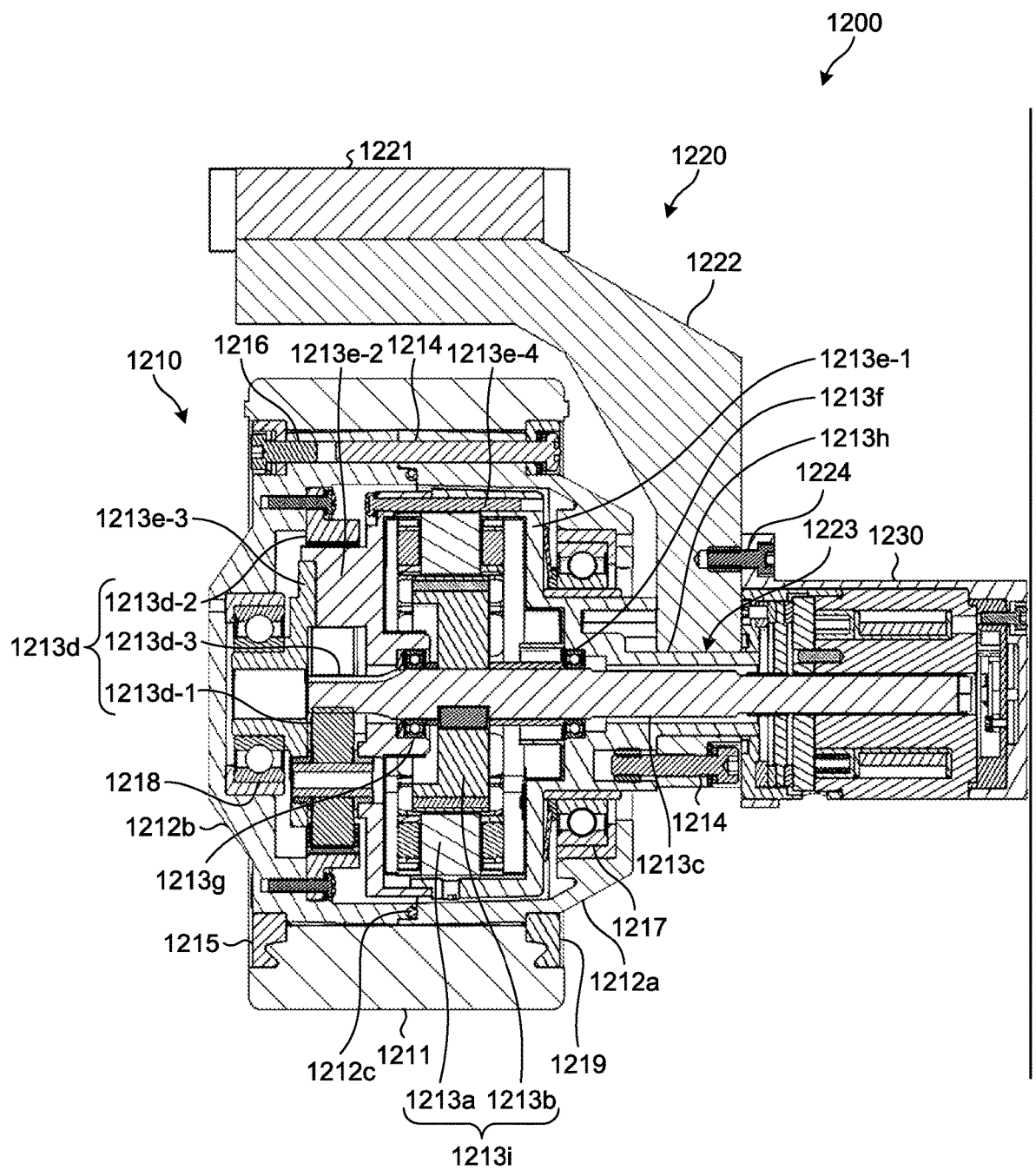
FIG. 29 is a cross-sectional view along a rotation axis of the wheel module in the second embodiment.

FIG. 28 is an exploded perspective view illustrating the configuration of the wheel module 1200 in the second embodiment. FIG. 29 is a cross-sectional view along the rotation axis of the wheel module 1200 in the second embodiment. As illustrated in FIGS. 28 and 29, in the wheel module 1200, the support member 1220 is arranged on the back side of the wheel portion 1210 and the brake portion 1230 is arranged on the back side of the support member 1220 along the axial direction of the rotation axis, for example.

The wheel portion 1210 includes a tire 1211, a wheel 1212, and a driving portion 1213.

The tire 1211 is a cylindrical member made of rubber or the like and having elasticity. The diameter of the tire 1211 is, for example, 100 to 300 mm.

The wheel 1212 is formed into a bottomed cylindrical shape having an opening at the back side and a bottom portion at the front side, and the tire 1211 is mounted thereon on the outer circumferential side. To be specific, the wheel 1212 includes a first wheel member 1212a and a second wheel member 1212b. The respective wheel members are arranged in an adjacent manner along the axial direction, and the first wheel member 1212a is arranged on the back side and the second wheel member 1212b is arranged on the front side.

The first wheel member 1212a is formed into a substantially cylindrical shape having openings at the back side and the front side. The second wheel member 1212b is formed into a bottomed cylindrical shape having an opening at the back side and a bottom portion at the front side. An O-ring 1212c made of rubber or the like is arranged between the opening of the first wheel member 1212a at the front side and the opening of the second wheel member 1212b at the back side in a close contact state. The wheel 1212 is thereby made into a state in which a portion excluding the opening is sealed.

The first wheel member 1212a is fixed to the second wheel member 1212b with bolts 1214 through a first plate 1219 formed into a ring shape in a state in which the first plate 1219 is pressed against the first wheel member 1212a from the back side. The first wheel member 1212a and the second wheel member 1212b are thereby coupled and fixed to each other. A second plate 1215 formed into a ring shape is fixed to the second wheel member 1212b with bolts 1216 in a state of being pressed against the second wheel member 1212b from the front side.

The first plate 1219 and the second plate 1215 are formed so as to have diameters larger than the inner circumference of the tire 1211. The inner circumferential end of the tire 1211 is interposed between the first plate 1219 and the second plate 1215 to be fixed to the wheel 1212.

The driving portion 1213 is arranged on the inner side of the wheel 1212, is driven with the driving current supplied from the power supply (not illustrated), and rotates the wheel 1212 about the rotation axis. To be specific, the driving portion 1213 includes a stator 1213a, a rotor 1213b, a rotating shaft 1213c, a planetary gear mechanism 1213d, and a housing 1213e.

The stator 1213a and the rotor 1213b configure an inner rotor-type motor 1213i, and the rotor 1213b rotates about the rotation axis with the driving current supplied from the power supply (not illustrated). Rotation force generated by the rotation of the rotor 1213b is transmitted to the wheel 1212 through the rotating shaft 1213c and the planetary gear mechanism 1213d, which will be described later.

The stator 1213a rotates the rotor 1213b about the rotation axis with the driving current supplied from the power supply (not illustrated). To be specific, the stator 1213a has the configuration in which a plurality of projecting poles are aligned in the circumferential direction on the inner circumferential surface of a stator base portion formed into a hollow cylindrical shape and coils are wound around the respective projecting poles.

The rotor 1213b is arranged on the inner side of the stator 1213a and rotates about the rotation axis relatively to the stator 1213a to thereby rotate the wheel 1212. To be specific, the rotor 1213b has the configuration in which a plurality of magnets are aligned in the circumferential direction along the outer circumferential surface of a base portion formed into a columnar shape, and the respective magnets are arranged so as to oppose the respective coils of the stator 1213a. The rotor 1213b thereby rotates about the rotation axis with electromagnetic force generated in the coils when the drive current flows through the coils of the stator 1213a.

The rotating shaft 1213c is arranged such that a core is identical to the rotation axis, and is fixed to the rotor 1213b in a state of penetrating through the center of the rotor 1213b. The rotating shaft 1213c is supported by the housing 1213e in a rotatable manner through a third bearing 1213f arranged on the back side of the rotor 1213b and a fourth bearing 1213g arranged on the front side of the rotor 1213b. The rotating shaft 1213c rotates about the rotation axis in accordance with the rotation of the rotor 1213b.

The planetary gear mechanism 1213d includes three planetary gears 1213d-1 and an inner gear 1213d-2 arranged so as to surround the three planetary gears 1213d-1. The three planetary gears 1213d-1 are engaged with a sun gear 1213d-3 formed on an end portion of the rotating shaft 1213c at the front side. The inner gear 1213d-2 is engaged with each of the three planetary gears 1213d-1 and is fixed to the inner circumferential surface of the second wheel member 1212b. When the rotating shaft 1213c rotates with the rotation of the rotor 1213b, each of the three planetary gears 1213d-1 engaged with the sun gear 1213d-3 formed on the rotating shaft 1213c rotates. The inner gear 1213d-2 is fixed to the wheel 1212 with screws, so that rotation of the three planetary gears 1213d-1 rotates the inner gear 1213d-2 engaged with the respective planetary gears and the wheel 1212 rotates with the rotation of the inner gear 1213d-2. As a result, rotation force generated with the rotation of the rotor 1213b is transmitted to the wheel 1212 while the rotating speed is decreased.

The housing 1213e is a holding member that is arranged on the inner side of the wheel 1212 and holds the stator 1213a, and accommodates therein the stator 1213a, the rotor 1213b, the rotating shaft 1213c, and the planetary gear mechanism 1213d. To be specific, the housing 1213e includes a first housing member 1213e-1, a second housing member 1213e-2, and a third housing member 1213e-3. The respective housing members are arranged in an adjacent manner along the axial direction, the first housing member 1213e-1 is arranged on the back side of the second housing member 1213*e*-2, and the second housing member 1213*e*-2 is arranged on the back side of the third housing member 1213*e*-3.

The first housing member 1213*e*-1 is formed into a bottomed cylindrical shape having a bottom portion at the back side and an opening at the front side. The second housing member 1213*e*-2 is formed into a bottomed cylindrical shape having an opening at the back side and a bottom portion at the front side. The first housing member 1213*e*-1 and the second housing member 1213*e*-2 accommodate, on the inner side thereof, the stator 1213*a*, the rotor 1213*b*, and the rotating shaft 1213*c*, and the first housing member 1213*e*-1 is fixed to the second housing member 1213*e*-2 with screws 1213*e*-4 in a state in which the openings thereof face each other. The third housing member 1213*e*-3 is formed into a disk shape, and is fixed to the second housing member 1213*e*-2 with screws 1213*e*-5 in a state in which the planetary gear mechanism 1213*d* is interposed between the third housing member 1213*e*-3 and the second housing member 1213*e*-2.

The housing 1213*e* supports the wheel 1212 in a rotatable manner through a first bearing 1217 mounted on an end portion thereof at the back side and a second bearing 1218 mounted on an end portion thereof at the front side. To be specific, the first housing member 1213*e*-1 supports the first wheel member 1212*a* in a rotatable manner through the first bearing 1217 mounted on the end portion at the back side and the third housing member 1213*e*-3 supports the second wheel member 1212*b* in a rotatable manner through the second bearing 1218 mounted on the end portion at the front side.

In the embodiment, the first bearing 1217 has a diameter larger than that of the second bearing 1218. The first bearing 1217 is a seal bearing and is mounted on the opening of the wheel 1212. As described above, the wheel 1212 is formed into a bottomed cylindrical shape having an opening on one side in the axial direction of the rotation axis and a bottom portion on the other side, and the portion thereof excluding the opening is sealed. A space between the wheel 1212 and the housing 1213*e* can therefore be sealed by mounting the first bearing 1217 as the seal bearing on the opening of the wheel 1212.

Through-holes are respectively formed in bottom portions of the first housing member 1213*e*-1 and the second housing member 1213*e*-2 at positions through which the rotation axis passes, and the rotating shaft 1213*c* is arranged such that both of end portions thereof extend while passing through the through-holes of the respective housing members. To be specific, the end portion of the rotating shaft 1213*c* at the back side extends to a position reaching the brake portion 1230 through the support member 1220 while passing through the through-hole of the first housing member 1213*e*-1. The end portion of the rotating shaft 1213*c* at the front side extends to a position at which the sun gear 1213*d*-3 formed on the end portion is engaged with the three planetary gears 1213*d*-1 of the planetary gear mechanism 1213*d* while passing through the through-hole of the second housing member 1213*e*-2. With this configuration, the rotation force generated by the rotation of the rotor 1213*b* is transmitted to the wheel 1212 through the rotating shaft 1213*c* and the planetary gear mechanism 1213*d*, as described above. As a result, the wheel 1212 rotates about the rotation axis in accordance with the rotation of the rotor 1213*b*.

The support member 1220 is mounted on the back surface of the cargo bed 1110 of the carriage 1100 and supports the wheel portion 1210. To be specific, the support member 1220 includes a support table 1221 and a bracket 1222. The support table 1221 is a member formed into a thick plate shape and the upper surface thereof is mounted on the back surface of the cargo bed 1110 of the carriage 1100. The bracket 1222 is fixed to the lower surface of the support table 1221. The bracket 1222 is a bar-shaped member curved into a substantially L shape, and is arranged such that an upper end portion thereof is fixed to the lower surface of the support table 1221 and a lower end portion thereof is substantially orthogonal to the rotation axis. The shape and the configuration of the support member 1220 are not limited to those described herein, and the support member 1220 may have another shape and configuration as long as it is arranged such that the lower end portion thereof intersects with the rotation axis.

With this configuration, in the embodiment, the housing 1213*e* includes the first housing member 1213*e*-1, the second housing member 1213*e*-2, and the third housing member 1213*e*-3, and they are fixed by the screws and the like, as described above. The thus integrally fixed housing 1213*e* supports a main part related to rotating motion, such as the stator 1213*a*, the rotor 1213*b*, the rotating shaft 1213*c*, and the planetary gear mechanism 1213*d*. The housing 1213*e* includes, at the back side, a fixing portion 1213*h* extending along the rotation axis, and the fixing portion 1213*h* is fixed to and supported by the support member 1220. Thus, the housing 1213*e* accommodating therein the stator 1213*a* and the rotor 1213*b* is fixed to the support member 1220 by the fixing portion 1213*h*, and rigidity can therefore be ensured even with the cantilever shaft structure like the wheel module 1200 in the embodiment. In the case of the cantilever shaft structure, for example, as illustrated in FIG. 29, the bracket 1222 can be configured on only one side of the wheel module 1200 in the rotation axis direction unlike a double-end support shaft structure. With this configuration, when the wheel module 1200 is used for, for example, a device including a cargo bed, such as the carriage 1100, respective wheel modules can also be arranged such that all of the wheel modules are accommodated on the inner side of the cargo bed.

To be specific, the fixing portion 1213*h* is formed into a cylindrical shape, and is provided so as to extend to the back side along the rotation axis from an end portion of the first housing member 1213*e*-1 at the back side on which the first bearing 1217 is mounted. The fixing portion 1213*h* is formed integrally with the first housing member 1213*e*-1. The fixing portion 1213*h* is inserted and fitted into a through-hole 1223 formed in a lower end portion of the bracket 1222 of the support member 1220 to be fixed. In the state in which the fixing portion 1213*h* is thus fitted into the through-hole 1223 of the bracket 1222, the bracket 1222 is fixed to the end portion of the first housing member 1213*e*-1 at the back side with bolts 1224. The housing 1213*e* and the fixing portion 1213*h* are thereby fixed to and supported by the support member 1220.

With this configuration, the housing 1213*e* is supported by the end portion at the back side on which the first bearing 1217 is arranged. For example, when the carriage 1100 climbs over a step or travels on a rough surface, such as a stone path and a gravel road, larger load acts on the first bearing 1217 than that on the second bearing 1218. In the embodiment, the first bearing 1217 therefore has a diameter larger than that of the second bearing 1218. Rigidity of a fulcrum portion of the cantilever shaft structure can thereby be increased. In addition, the rotating shaft 1213*c* as the rotation axis can be made to extend to the brake portion 1230 from the inner diameter side of the first bearing 1217 by increasing the diameter of the first bearing 1217 close to the support member 1220 as described above. An effect of making various cables connecting the driving portion 1213, the brake portion 1230, a control mechanism (not illustrated), and the like easy to extend is also provided.

As a material of the housing 1213e including the fixing portion 1213h, an appropriate material is used in accordance with a weight that is applied to the wheel module 1200. The fixing portion 1213h is formed to have a thickness and length capable of providing strength required for the fixing portion 1213h in consideration of the material of the housing 1213e. The housing 1213e including the fixing portion 1213h is produced by, for example, die casting using aluminum as the material. The housing 1213e including the fixing portion 1213h is made of iron, titanium, or the like when higher strength is required therefor. When the housing 1213e including the fixing portion 1213h is made of carbon fiber carbon resin, it is advantageous for weight reduction.

The fixing portion 1213h is formed to have a through-hole along the center axis. The through-hole of the fixing portion 1213h is formed so as to be continuous to the through-hole of the first housing member 1213e-1, and the end portion of the rotating shaft 1213c at the back side is arranged so as to pass through the respective through-holes. The end portion of the rotating shaft 1213c at the back side is thereby arranged so as to pass through the through-hole of the first housing member 1213e-1 and the through-hole of the fixing portion 1213h and extend to the back side from the through-hole 1223 formed in the bracket 1222 of the support member 1220. The end portion of the rotating shaft 1213c at the back side that extends from the through-hole 1223 of the bracket 1222 is arranged in a state of being inserted into the inner side of the brake portion 1230.

The brake portion 1230 stops or releases rotation of the wheel module 1200 in accordance with control by a control mechanism (not illustrated), a user, or the like. To be specific, the brake portion 1230 acts on the end portion of the rotating shaft 1213c at the back side that extends from the through-hole 1223 of the bracket 1222 by an incorporated brake mechanism to thereby stop or release the rotation of the wheel portion 1210.

As described above, in the second embodiment, the housing 1213e accommodating therein the stator 1213a and the rotor 1213b includes the first housing member 1213e-1, the second housing member 1213e-2, and the third housing member 1213e-3, and they are integrally formed through fixing with screws and the like. The housing 1213e includes the fixing portion 1213h extending along the rotation axis on one side in the axial direction of the rotation axis, and the fixing portion 1213h is fixed to and supported by the support member 1220. With this configuration, the housing 1213e accommodating therein the stator 1213a and the rotor 1213b is fixed to the support member 1220 through the fixing portion 1213h. Even the cantilever shaft structure can thereby ensure the rigidity.

In the second embodiment, the housing 1213e supports the wheel 1212 in a rotatable manner through the first bearing 1217 mounted on the one end portion thereof in the axial direction of the rotation axis and the second bearing 1218 mounted on the other end portion thereof, and the first bearing 1217 has a diameter larger than that of the second bearing 1218. The rigidity of the fulcrum portion of the cantilever shaft structure can therefore be increased.

In the second embodiment, the wheel 1212 is formed into a bottomed cylindrical shape having an opening on one side in the axial direction of the rotation axis and a bottom portion on the other side, and the first bearing 1217 is the seal bearing and is mounted on the opening of the wheel 1212 to closely seal the space between the wheel 1212 and the housing 1213e. One seal bearing can therefore implement waterproofing in the wheel 1212, thereby reducing rotation loss.

In the second embodiment, the inner circumferential end of the tire 1211 is interposed between the first plate 1219 and the second plate 1215 to be fixed to the first wheel member 1212a and the second wheel member 1212b. The tire 1211 is thereby mounted on the wheel 1212 in a detachable manner to the other side in the axial direction.

Figure 30:
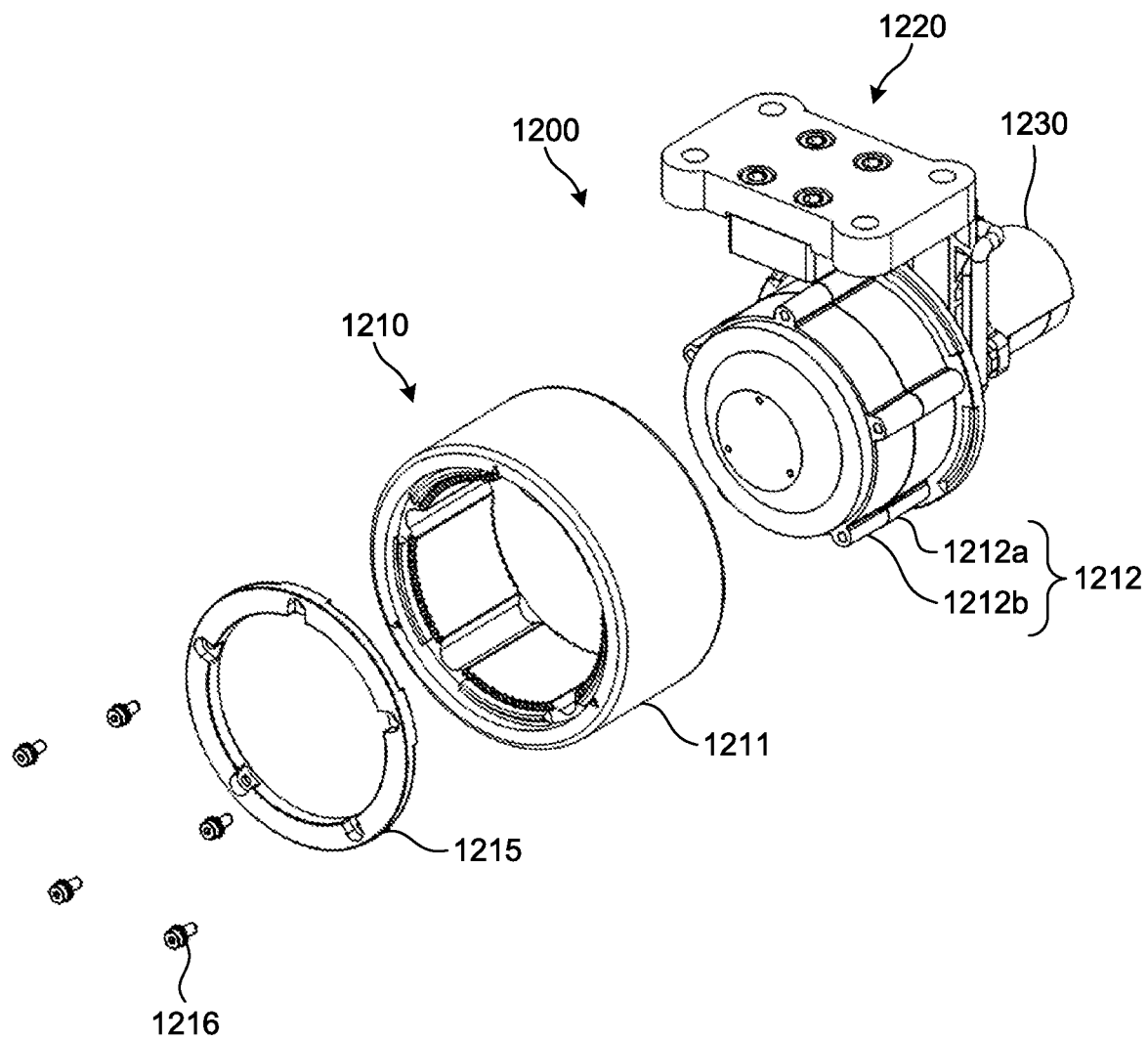
FIG. 30 is a perspective view illustrating attachment and detachment of a tire in the wheel module in the second embodiment.

FIG. 30 is a perspective view illustrating attachment and detachment of the tire 1211 in the wheel module 1200 in the second embodiment. In the case of the double-sided support shaft, the whole wheel module must be once detached making it a troublesome effort to replace the tire. By contrast, as illustrated in FIG. 30, in the embodiment, the tire 1211 can be detached to the front side by detaching the second plate 1215 mounted at the front side of the wheel 1212. The tire 1211 can therefore be easily replaced even in the state in which the wheel module 1200 is mounted on the carriage 1100.

In the embodiment, when the rotor 1213b has the configuration of an interior permanent magnet (IPM) motor with a plurality of linear magnets aligned and embedded therein in the circumferential direction, the wheel module 1200 can easily provide necessary torque, the rotor 1213b can hold the magnets reliably, and the magnets can be prevented from being separated due to centrifugal force during rotation of the motor.

In the above-mentioned embodiment, the wheel module 1200 has the configuration of what is called an inner rotor-type motor in which the rotor 1213b is arranged on the inner side of the stator 1213a, as an example. The embodiment is not however limited thereto. The wheel module 1200 may have the configuration of an outer rotor-type motor in which the stator is arranged on the inner side of the rotor.

Hereinafter, examples of the case in which a wheel module has the configuration of the outer rotor-type motor will be described as third and fourth embodiments. In the following embodiments, point differing from the second embodiment are mainly described and detail description of components having the same functions as those in the second embodiment is omitted.

Third Embodiment

First, the third embodiment will be described. The third embodiment is an example of the case in which the outer rotor-type motor is included instead of the inner rotor-type motor described in the second embodiment.

Figure 31:
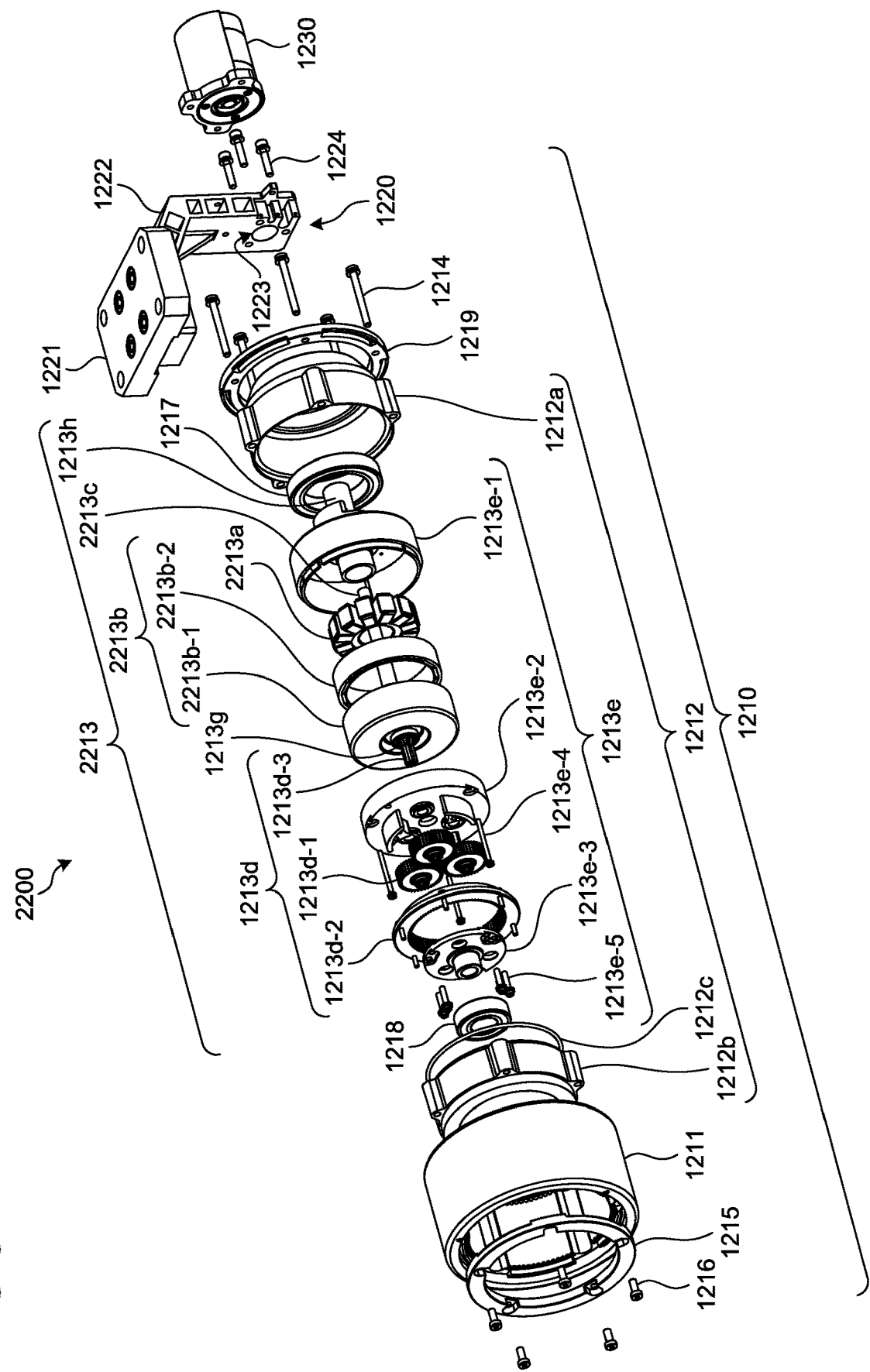
FIG. 31 is an exploded perspective view illustrating the configuration of a wheel module according to a third embodiment.
Figure 32:
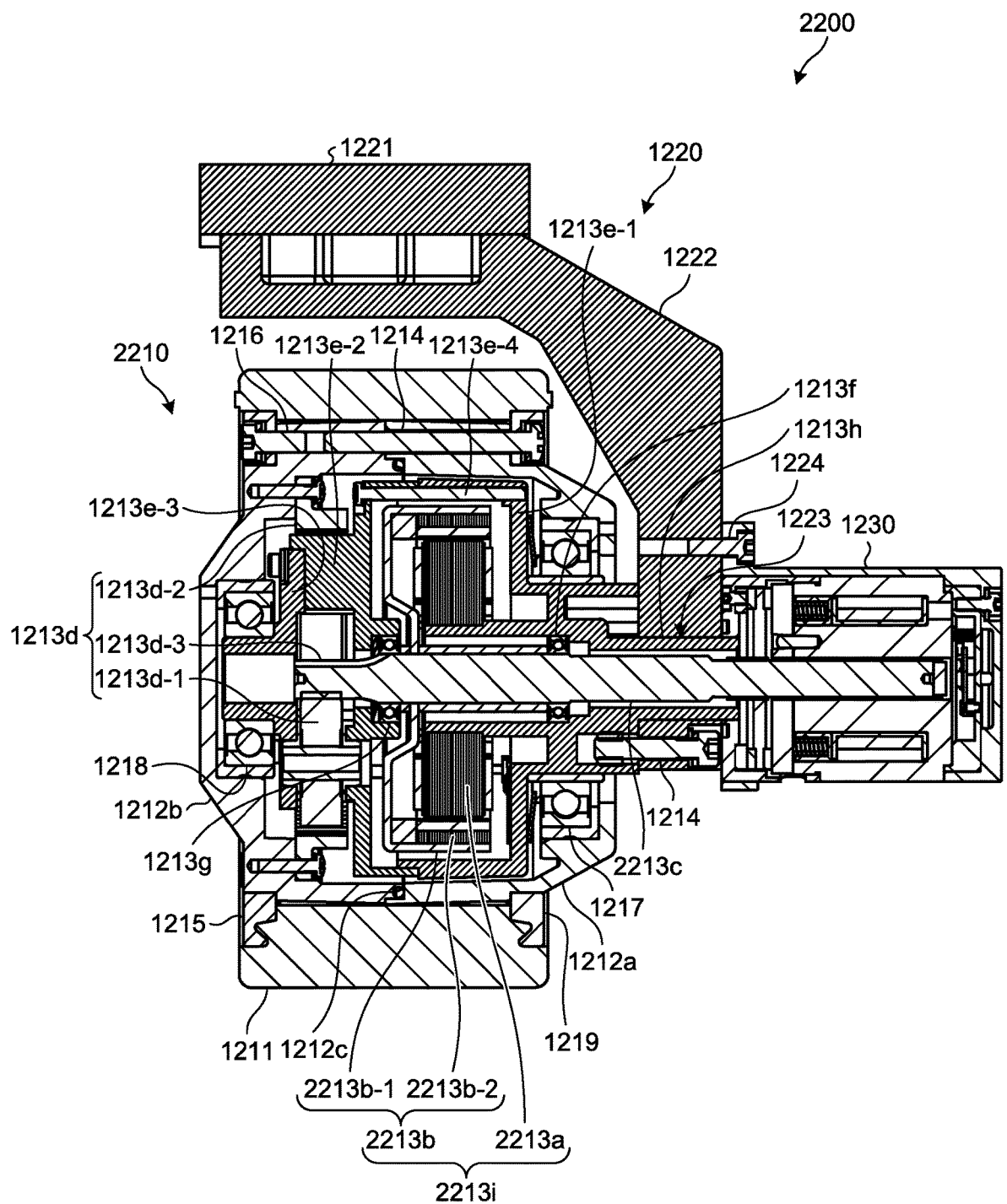
FIG. 32 is a cross-sectional view along a rotation axis of the wheel module in the third embodiment.

FIG. 31 is an exploded perspective view illustrating the configuration of a wheel module 2200 in the embodiment. FIG. 32 is a cross-sectional view along a rotation axis of the wheel module 2200 in the embodiment. As illustrated in FIGS. 31 and 32, in the wheel module 2200, the support member 1220 is arranged on the back side of a wheel portion 2210 and the brake portion 1230 is arranged on the back side of the support member 1220 along the axial direction of the rotation axis.

The wheel portion 2210 includes the tire 1211, the wheel 1212, and a driving portion 2213. The wheel portion 2210 in the embodiment is different from the wheel portion 1210 described in the second embodiment in the configuration of the driving portion 2213.

The driving portion 2213 is arranged on the inner side of the wheel 1212, is driven with a driving current supplied from a power supply (not illustrated), and rotates the wheel 1212 about the rotation axis. To be specific, the driving portion 2213 includes a stator 2213a, a rotor 2213b, a rotating shaft 2213c, the planetary gear mechanism 1213d, and the housing 1213e. The driving portion 2213 in the embodiment is different from the driving portion 1213 described in the second embodiment in the configurations of the stator 2213a, the rotor 2213b, and the rotating shaft 2213c.

The stator 2213a and the rotor 2213b configure an outer rotor-type motor 2213i, and the rotor 2213b rotates about the rotation axis with the driving current supplied from the power supply (not illustrated). Rotation force generated by the rotation of the rotor 2213b is transmitted to the wheel 1212 through the rotating shaft 2213c, which will be described later, and the planetary gear mechanism 1213d.

The stator 2213a rotates the rotor 2213b about the rotation axis with the driving current supplied from the power supply (not illustrated). To be specific, the stator 2213a has the configuration in which a plurality of projecting poles is aligned in the circumferential direction on the outer circumferential surface of a stator base portion formed into a hollow cylindrical shape, and coils are wound around the respective projecting poles.

The rotor 2213b is arranged on the outer side of the stator 2213a and rotates about the rotation axis relatively to the stator 2213a to thereby rotate the wheel 1212. To be specific, the rotor 2213b includes a rotor frame 2213b-1 formed into a hollow bottomed cylindrical shape and a plurality of magnets 2213b-2 aligned in the circumferential direction along the inner circumferential surface of the rotor frame 2213b-1, and the respective magnets are arranged so as to oppose the respective coils of the stator 2213a. The rotor 2213b thereby rotates about the rotation axis with electromagnetic force generated in the coils when the drive current flows through the coils of the stator 2213a.

The rotating shaft 2213c is arranged such that a core is identical to the rotation axis, and is fixed to the rotor 2213b in a state of penetrating through a through-hole formed in a bottom portion of the rotor frame 2213b-1. The rotating shaft 2213c is supported by the housing 1213e in a rotatable manner through the third bearing 1213f arranged on the back side of the stator 2213a and the fourth bearing 1213g arranged on the front side of the stator 2213a. The rotating shaft 2213c thereby rotates about the rotation axis in accordance with the rotation of the rotor 2213b.

With this configuration, in the embodiment, the housing 1213e includes the first housing member 1213e-1, the second housing member 1213e-2, and the third housing member 1213e-3, and they are fixed by screws and the like. The thus integrally fixed housing 1213e supports a main part related to rotating motion, such as the stator 2213a, the rotor 2213b, the rotating shaft 2213c, and the planetary gear mechanism 1213d. The housing 1213e includes, at the back side, the fixing portion 1213h extending along the rotation axis, and the fixing portion 1213h is fixed to and supported by the support member 1220. Thus, the housing 1213e accommodating therein the stator 2213a and the rotor 2213b is fixed to the support member 1220 by the fixing portion 1213h, and rigidity can therefore be ensured even with the cantilever shaft structure like the wheel module 2200 in the embodiment. In the case of the cantilever shaft structure, for example, as illustrated in FIG. 32, the bracket 1222 can be configured on only one side of the wheel module 2200 in the rotation axis direction unlike a double-end support shaft structure. With this configuration, when the wheel module 2200 is used for, for example, a device including a cargo bed, such as the carriage 1100, respective wheel modules can also be arranged such that all of the wheel modules are accommodated on the inner side of the cargo bed.

To be specific, the fixing portion 1213h is formed into a cylindrical shape, and is provided so as to extend to the back side along the rotation axis from an end portion of the first housing member 1213e-1 at the back side on which the first bearing 1217 is mounted. The fixing portion 1213h is formed integrally with the first housing member 1213e-1. The fixing portion 1213h is inserted and fitted into the through-hole 1223 formed in a lower end portion of the bracket 1222 of the support member 1220 to be fixed. In the state in which the fixing portion 1213h is thus fitted into the through-hole 1223 of the bracket 1222, the bracket 1222 is fixed to the end portion of the first housing member 1213e-1 at the back side with the bolts 1224. The housing 1213e and the fixing portion 1213h are thereby fixed to and supported by the support member 1220.

With this configuration, the housing 1213e is supported by the end portion at the back side on which the first bearing 1217 is arranged. For example, when the carriage 1100 climbs over a step or travels on a rough surface, such as a stone path and a gravel road, larger load acts on the first bearing 1217 than that on the second bearing 1218. In the embodiment, the first bearing 1217 therefore has a diameter larger than that of the second bearing 1218. Rigidity of a fulcrum portion of the cantilever shaft structure can thereby be increased. In addition, the rotating shaft 2213c as the rotation axis can be made to extend to the brake portion 1230 from the inner diameter side of the first bearing 1217 by increasing the diameter of the first bearing 1217 close to the support member 1220 as described above. An effect of making various cables connecting the driving portion 2213, the brake portion 1230, a control mechanism (not illustrated), and the like easy to extend is also provided.

As a material of the housing 1213e including the fixing portion 1213h, an appropriate material is used in accordance with a weight that is applied to the wheel module 2200. The fixing portion 1213h is formed to have a thickness and length capable of providing strength required for the fixing portion 1213h in consideration of the material of the housing 1213e. The housing 1213e including the fixing portion 1213h is produced by, for example, die casting using aluminum as the material. The housing 1213e including the fixing portion 1213h is made of iron, titanium, or the like when higher strength is required therefor. When the housing 1213e including the fixing portion 1213h is made of carbon fiber carbon resin, it is advantageous for weight reduction.

The fixing portion 1213h is formed to have a through-hole along the center axis. The through-hole of the fixing portion 1213h is formed so as to be continuous to the through-hole of the first housing member 1213e-1, and the end portion of the rotating shaft 2213c at the back side is arranged so as to pass through the respective through-holes. The end portion of the rotating shaft 2213c at the back side is thereby arranged so as to pass through the through-hole of the first housing member 1213e-1 and the through-hole of the fixing portion 1213h and extend to the back side from the through-hole 1223 formed in the bracket 1222 of the support member 1220. The end portion of the rotating shaft 2213c at the back side that extends from the through-hole 1223 of the bracket 1222 is arranged in a state of being inserted into the inner side of the brake portion 1230.

As described above, in the third embodiment, the housing 1213e accommodating therein the stator 2213a and the rotor 2213b includes the first housing member 1213e-1, the second housing member 1213e-2, and the third housing member 1213e-3, and they are integrally formed through fixing with screws and the like. The housing 1213e includes the fixing portion 1213h extending along the rotation axis on one side in the axial direction of the rotation axis, and the fixing portion 1213h is fixed to and supported by the support member 1220. With this configuration, the housing 1213e accommodating therein the stator 2213a and the rotor 2213b is fixed to the support member 1220 through the fixing portion 1213h. Even the cantilever shaft structure can thereby ensure the rigidity.

In the third embodiment, the housing 1213e supports the wheel 1212 in a rotatable manner through the first bearing 1217 mounted on the one end portion thereof in the axial direction of the rotation axis and the second bearing 1218 mounted on the other end portion thereof, and the first bearing 1217 has a diameter larger than that of the second bearing 1218. The rigidity of the fulcrum portion of the cantilever shaft structure can therefore be increased.

In the third embodiment, the wheel 1212 is formed into a bottomed cylindrical shape having an opening on one side in the axial direction of the rotation axis and a bottom portion on the other side, and the first bearing 1217 is the seal bearing and is mounted on the opening of the wheel 1212 to closely seal the space between the wheel 1212 and the housing 1213e. One seal bearing can therefore implement waterproofing in the wheel 1212, thereby reducing rotation loss.

Furthermore, in the third embodiment, the outer rotor-type motor is used to thereby increase the diameter of the rotor in comparison with the case of using the inner rotor-type motor, thereby easily providing torque. In the third embodiment, the outer rotor-type motor is used to thereby reduce a current in comparison with the case of using the inner rotor-type motor when the volumes of the motors thereof are the same.

In the embodiment, when the rotor 2213b has the configuration of an interior permanent magnet (IPM) motor with a plurality of linear magnets aligned and embedded therein in the circumferential direction, the wheel module 1200 can easily provide necessary torque, the risk of strip-off of the magnets due to attraction and repulsion forces that are repeatedly generated in conduction can be reduced, and the rotor 2213b can hold the magnets reliably.

Fourth Embodiment

Next, the fourth embodiment will be described. The fourth embodiment is an example of the case in which a wheel module includes the outer rotor-type motor and has what is called a direct drive configuration of transmitting rotation force of a motor directly to a wheel with no gear mechanism interposed therebetween.

Figure 33:
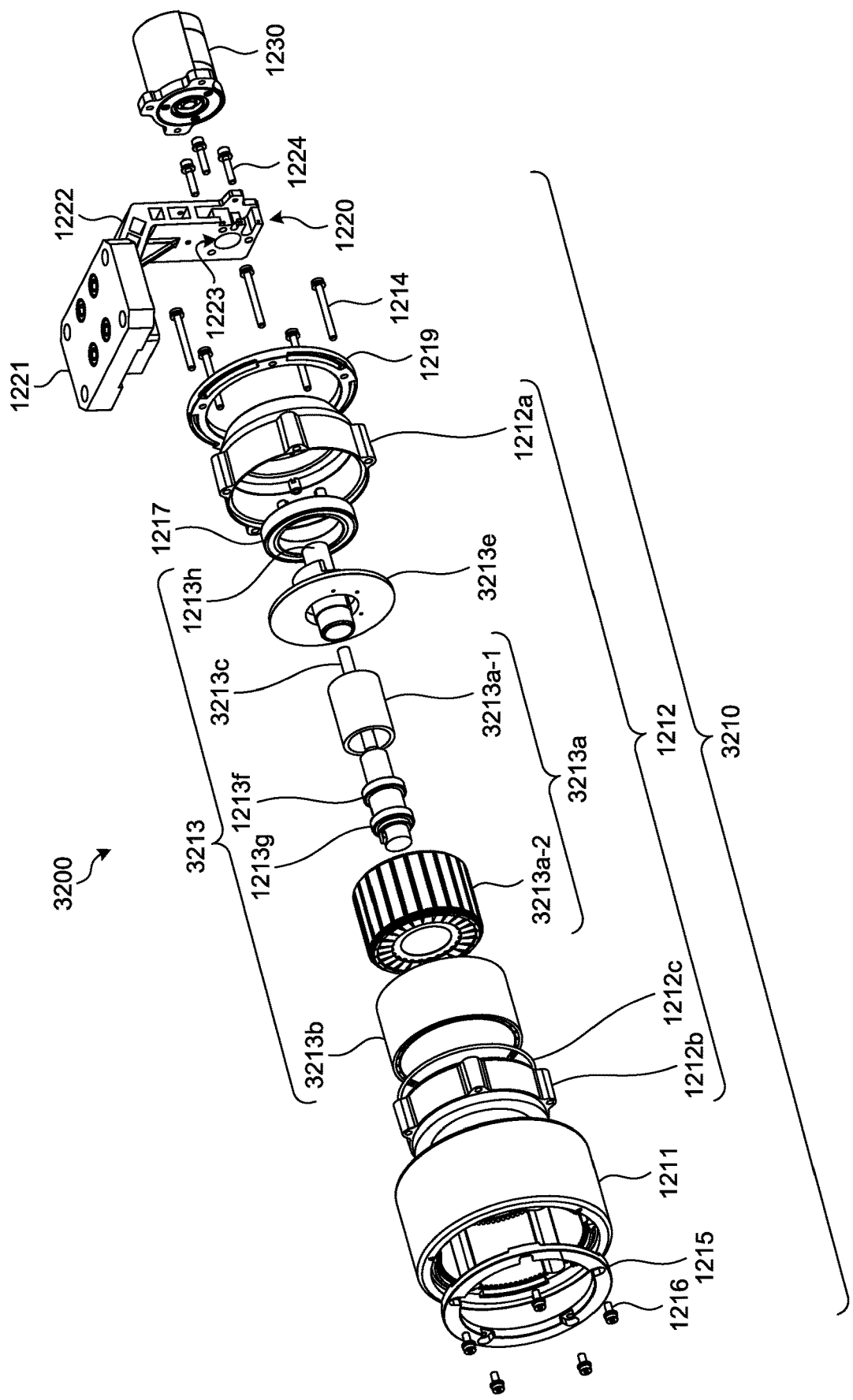
FIG. 33 is an exploded perspective view illustrating the configuration of a wheel module according to a fourth embodiment.
Figure 34:
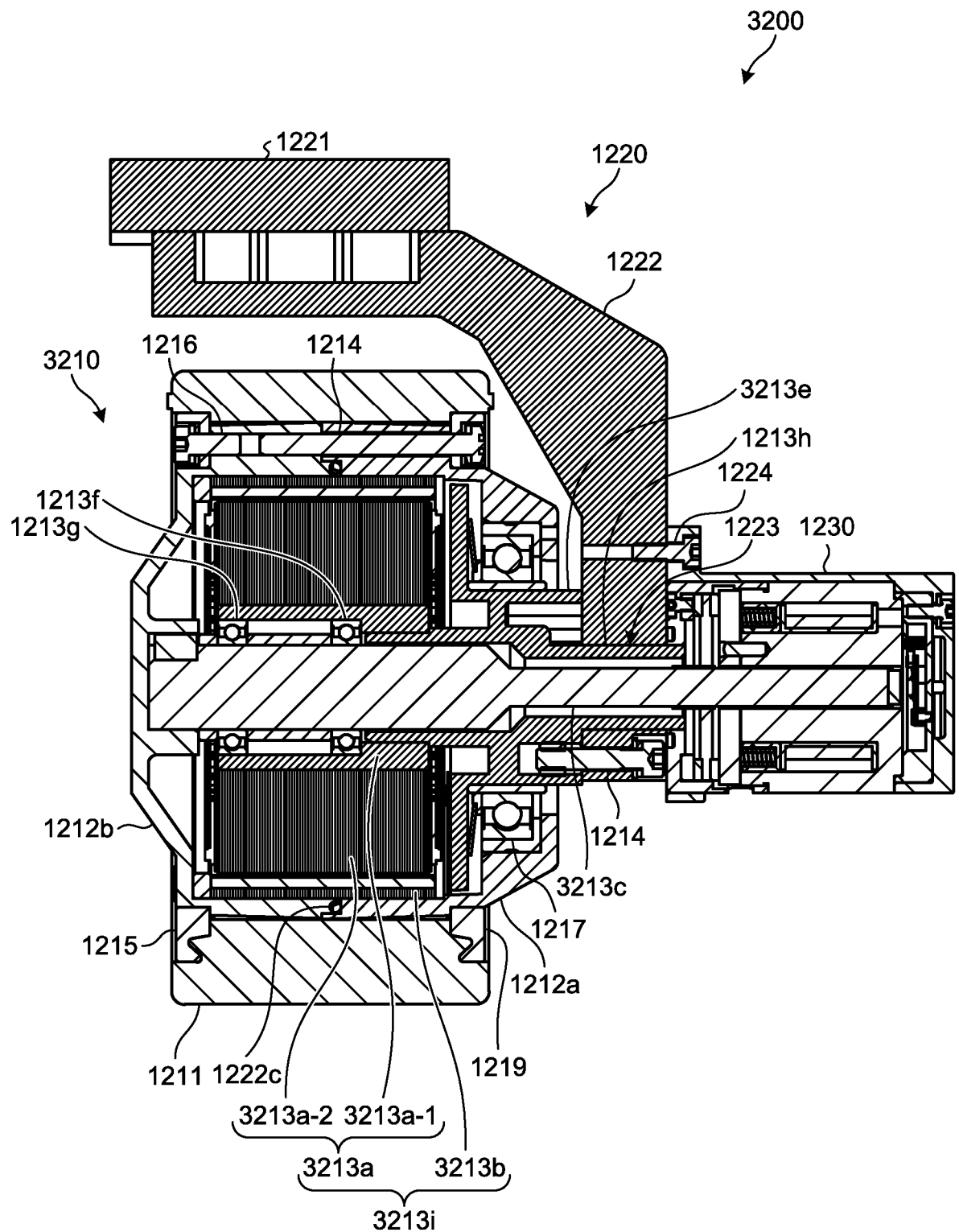
FIG. 34 is a cross-sectional view along a rotation axis of a wheel module 3200 in the fourth embodiment.

FIG. 33 is an exploded perspective view illustrating the configuration of a wheel module 3200 according to the fourth embodiment. FIG. 34 is a cross-sectional view along the rotation axis of the wheel module 3200 in the fourth embodiment. As illustrated in FIGS. 33 and 34, in the wheel module 3200, the support member 1220 is arranged on the back side of a wheel portion 3210 and the brake portion 1230 is arranged on the back side of the support member 1220 along the axial direction of the rotation axis.

The wheel portion 3210 includes the tire 1211, the wheel 1212, and a driving portion 3213. The wheel portion 2210 in the embodiment is different from the wheel portion 1210 described in the second embodiment in the configuration of the driving portion 3213.

The driving portion 3213 is arranged on the inner side of the wheel 1212, is driven with a driving current supplied from a power supply (not illustrated), and rotates the wheel 1212 about the rotation axis. To be specific, the driving portion 3213 includes a stator 3213a, a rotor 3213b, a rotating shaft 3213c, and a holding member 3213e. The driving portion 3213 in the embodiment is different from the driving portion 1213 described in the second embodiment in the configurations of the stator 3213a, the rotor 3213b, and the rotating shaft 3213c and in the point that it includes the holding member 3213e instead of the housing 1213e.

The stator 3213a and the rotor 3213b configure an outer rotor-type motor 3213i, and the rotor 3213b rotates about the rotation axis with the driving current supplied from the power supply (not illustrated). Rotation force generated by the rotation of the rotor 3213b is transmitted directly to the wheel 1212 through the rotating shaft 3213c, which will be described later.

The stator 3213a rotates the rotor 3213b about the rotation axis with the driving current supplied from the power supply (not illustrated). To be specific, the stator 3213a includes a stator base portion 3213a-1 formed into a hollow cylindrical shape and a stator core 3213a-2 fixed to the outer circumferential surface of the stator base portion 3213a-1. The stator core 3213a-2 includes a plurality of projecting poles aligned in the circumferential direction along the outer circumferential surface of the stator base portion 3213a-1 and coils are wound around the respective projecting poles.

The rotor 3213b is arranged on the outer side of the stator 3213a and rotates about the rotation axis relatively to the stator 3213a to thereby rotate the wheel 1212. To be specific, the rotor 3213b includes a plurality of magnets aligned in the circumferential direction along the inner circumferential surface of the second wheel member 1212b, and the respective magnets are arranged so as to oppose the respective coils of the stator 3213a. That is to say, in the embodiment, the second wheel member 1212b also serves as a rotor frame. The rotor 3213b thereby rotates about the rotation axis with electromagnetic force generated in the coils when the drive current flows through the coils of the stator 3213a.

The rotating shaft 3213c is arranged such that a core is identical to the rotation axis, and an end portion thereof at the front side is fixed to the second wheel member 1212b. The rotating shaft 3213c is supported by the stator 3213a in a rotatable manner through a second bearing (the third bearing 1213f, the fourth bearing 1213g) mounted on the stator 3213a. To be specific, the rotating shaft 3213c is supported by the stator 3213a in a rotatable manner through the third bearing 1213f arranged on the inner circumferential surface of the stator 3213a at the back side and the fourth bearing 1213g mounted on the inner circumferential surface of the stator 3213a at the front side. The rotating shaft 3213c thereby rotates about the rotation axis in accordance with the rotation of the rotor 3213b, and rotation force generated by the rotation of the rotor 3213b is transmitted directly to the wheel 1212 without any gear mechanism interposed therebetween.

The holding member 3213e is arranged on the inner side of the wheel 1212 and holds the stator 3213a. To be specific, the holding member 3213e is arranged on the back side of the stator 3213a, and an end portion thereof at the front side is integrally fixed to the stator base portion 3213a-1 of the stator 3213a.

The holding member 3213e supports an end portion of the wheel 1212 (first wheel member 1212a) at the back side in a rotatable manner through the first bearing 1217 mounted on an end portion of the holding member 3213e at the back side. The holding member 3213e holds the stator 3213a to thereby support the rotating shaft 3213c in a rotatable manner through the third bearing 1213*f* and the fourth bearing 1213*g* mounted on the stator 3213*a*. The holding member 3213*e* thereby supports an end portion of the wheel 1212 (second wheel member 1212*b*) fixed to the rotating shaft 3213*c* at the front side in a rotatable manner.

In the embodiment, the first bearing 1217 has a diameter larger than those of the third bearing 1213*f* and the fourth bearing 1213*g* mounted on the stator 3213*a*. The first bearing 1217 is a seal bearing and is mounted on an opening of the wheel 1212. As described above, the wheel 1212 is formed into a bottomed cylindrical shape having an opening on one side in the axial direction of the rotation axis and a bottom portion on the other side, and the portion thereof excluding the opening is sealed. A space on the inner side of the wheel 1212 can therefore be sealed by mounting the first bearing 1217 as the seal bearing on the opening of the wheel 1212.

A through-hole is formed in the holding member 3213*e* at a position through which the rotation axis passes, and an end portion of the rotating shaft 3213*c* at the back side extends to a position reaching the brake portion 1230 through the support member 1220 while passing through the through-hole of the holding member 3213*e*. An end portion of the rotating shaft 3213*c* at the front side extends to a position reaching the second wheel member 1212*b* and is fixed to the second wheel member 1212*b*. As described above, the rotation force generated by the rotation of the rotor 3213*b* is transmitted directly to the wheel 1212 through the rotating shaft 3213*c*. As a result, the wheel 1212 rotates about the rotation axis in accordance with the rotation of the rotor 3213*b*.

With this configuration, in the embodiment, the holding member 3213*e* is integrally fixed to the stator base portion 3213*a*-1 of the stator 3213*a*, as described above. The holding member 3213*e* supports a main part related to rotating motion, such as the stator 3213*a*, the rotor 3213*b*, and the rotating shaft 3213*c*. The holding member 3213*e* includes, at the back side, the fixing portion 1213*h* extending along the rotation axis, and the fixing portion 1213*h* is fixed to and supported by the support member 1220. Thus, the holding member 3213*e* holding the stator 3213*a* is fixed to the support member 1220 by the fixing portion 1213*h*, and rigidity can therefore be ensured even with the cantilever shaft structure like the wheel module 3200 in the embodiment. In the case of the cantilever shaft structure, for example, as illustrated in FIG. 34, the bracket 1222 can be configured on only one side of the wheel module 3200 in the rotation axis direction unlike a double-end support shaft structure. With this configuration, when the wheel module 3200 is used for, for example, a device including a cargo bed, such as the carriage 1100, respective wheel modules can also be arranged such that all of the wheel modules are accommodated on the inner side of the cargo bed.

To be specific, the fixing portion 1213*h* is formed into a cylindrical shape, and is provided so as to extend to the back side along the rotation axis from an end portion of the holding member 3213*e* at the back side on which the first bearing 1217 is mounted. The fixing portion 1213*h* is formed integrally with the holding member 3213*e*. The fixing portion 1213*h* is inserted and fitted into the through-hole 1223 formed in a lower end portion of the bracket 1222 of the support member 1220 to be fixed. In the state in which the fixing portion 1213*h* is thus fitted into the through-hole 1223 of the bracket 1222, the bracket 1222 is fixed to the end portion of the holding member 3213*e* at the back side with the bolts 1224. The holding member 3213*e* and the fixing portion 1213*h* are thereby fixed to and supported by the support member 1220.

With this configuration, the holding member 3213*e* is supported by the end portion at the back side on which the first bearing 1217 is arranged. For example, when the carriage 1100 climbs over a step or travels on a rough surface, such as a stone path and a gravel road, larger load acts on the first bearing 1217 than that on the second bearing 1218. In the embodiment, the first bearing 1217 therefore has a diameter larger than those of the third bearing 1213*f* and the fourth bearing 1213*g*. Rigidity of a fulcrum portion of the cantilever shaft structure can thereby be increased. In addition, the rotating shaft 3213*c* as the rotation axis can be made to extend to the brake portion 1230 from the inner diameter side of the first bearing 1217 by increasing the diameter of the first bearing 1217 close to the support member 1220 as described above. An effect of making various cables connecting the driving portion 1213, the brake portion 1230, a control mechanism (not illustrated), and the like easier to extend is also provided.

As a material of the holding member 3213*e* including the fixing portion 1213*h*, an appropriate material is used in accordance with a weight that is applied to the wheel module 3200. The fixing portion 1213*h* is formed to have a thickness and length capable of providing strength required for the fixing portion 1213*h* in consideration of the material of the holding member 3213*e*. The holding member 3213*e* including the fixing portion 1213*h* is produced by, for example, die casting using aluminum as the material. The holding member 3213*e* including the fixing portion 1213*h* is made of iron, titanium, or the like when higher strength is required therefor. When the holding member 3213*e* including the fixing portion 1213*h* is made of carbon fiber carbon resin, it is advantageous for weight reduction.

The fixing portion 1213*h* is formed to have a through-hole along the center axis. The through-hole of the fixing portion 1213*h* is formed so as to be continuous to the through-hole of the holding member 3213*e*, and the end portion of the rotating shaft 3213*c* at the back side is arranged so as to pass through the respective through-holes. The end portion of the rotating shaft 3213*c* at the back side is thereby arranged so as to pass through the through-hole of the holding member 3213*e* and the through-hole of the fixing portion 1213*h* and extend to the back side from the through-hole 1223 formed in the bracket 1222 of the support member 1220. The end portion of the rotating shaft 3213*c* at the back side that extends from the through-hole 1223 of the bracket 1222 is arranged in a state of being inserted into the inner side of the brake portion 1230.

As described above, in the fourth embodiment, the holding member 3213*e* holding the stator 3213*a* is integrally fixed to the stator base portion 3213*a*-1 of the stator 3213*a*. The holding member 3213*e* includes the fixing portion 1213*h* extending along the rotation axis on one side in the axial direction of the rotation axis, and the fixing portion 1213*h* is fixed to and supported by the support member 1220. With this configuration, the holding member 3213*e* holding the stator 3213*a* is fixed to the support member 1220 through the fixing portion 1213*h*. Even the cantilever shaft structure can thereby ensure the rigidity.

In the fourth embodiment, the holding member 3213*e* supports the wheel 1212 in a rotatable manner through the first bearing 1217 mounted on the one end portion thereof in the axial direction of the rotation axis and the third bearing 1213*f* and the fourth bearing 1213*g* mounted on the stator 3213*a*, and the first bearing 1217 has a diameter larger than those of the third bearing 1213*f* and the fourth bearing 1213*g*. This configuration can increase the rigidity of the fulcrum portion of the cantilever shaft structure.

In the fourth embodiment, the wheel 1212 is formed into a bottomed cylindrical shape having an opening on one side in the axial direction of the rotation axis and a bottom portion on the other side, and the first bearing 1217 is the seal bearing and is mounted on the opening of the wheel 1212 to closely seal the space on the inner side of the wheel 1212. One seal bearing can therefore implement waterproofing in the wheel 1212, thereby reducing rotation loss.

Furthermore, in the fourth embodiment, the outer rotor-type motor is used to thereby increase the outer diameter of the rotor 3213*b* in comparison with the case of using the inner rotor-type motor, thereby easily providing torque. In the fourth embodiment, what is called a direct drive configuration of transmitting the rotation force of the motor directly to the wheel 1212 with no gear mechanism interposed therebetween is provided, thereby reducing the number of components and easily assembling them in comparison with the case using the gear mechanism. In the fourth embodiment, the rotating speed of the motor is lowered and noise of a reduction gear itself is not generated, so that an operation sound of the wheel module 3200 is silent in comparison with the case using the gear mechanism. In the fourth embodiment, the second wheel member 1212*b* also serves as a rotor frame, so that the wheel 1212 and the rotor frame can be implemented by one component, thereby further reducing the number of components.

In each of the above-mentioned embodiments, the wheel module 1200, 2200, or 3200 is used as the wheel of the carriage 1100. The embodiment is not however limited thereto. The wheel module 1200, 2200, or 3200 described in each of the above-mentioned embodiments can also be used as a wheel of, for example, a moving device for passenger use or transportation, such as a baby buggy, a wheelchair, a scooter, a shopping cart, and a golf cart. The wheel module 1200, 2200, or 3200 described in each of the above-mentioned embodiments can also be used in, for example, various robots of a system moving with wheels. Examples of the various robots referred herein include autonomous-type robots and operation-type robots such as cleaning robots that clean indoors, robots that guide users in hotels, event spaces, or the like, robots that support movement of patients, transportation of medical charts, and the like in hospitals.

In each of the above-mentioned embodiments, the wheel module (200, 2200, or 3200) is applied to a four-wheel carriage, as an example. The embodiment is however not limited thereto. The wheel module described in each of the above-mentioned embodiments can also be applied to a six-wheel carriage or a carriage with a larger number of wheels in the same manner. For example, when the wheel module is applied to a six-wheel carriage, the wheel module is preferably used as each of two wheels in a center portion that are provided between the front wheels and the rear wheels.

The brake portion 1230 described in each of the above-mentioned second to fourth embodiments has, for example, the same configuration as the brake device described in the first embodiment and the modifications thereof.

The wheel module in each of the above-mentioned embodiments and modifications thereof includes the wheel, the motor, the holding member, and the brake. The tire is mounted on the wheel. The motor is arranged on the inner side of the wheel and includes the stator and the rotor. The shaft is fixed to the rotor coaxially with the rotation axis of the rotor and transmits the rotation force of the rotor to the wheel. The holding member holds the stator. The brake restricts the rotation of the shaft. One end portion of the holding member in the axial direction of the rotation axis of the rotor is fixed to and supported by the support member. The brake is arranged on the opposite side to the wheel with the support member interposed therebetween. The shaft extends into the inner portion of the brake while passing through the through-holes formed in one end portion of the holding member and the support member.

The carriages 1 and 1A to 1G in the first embodiment and the modifications thereof are examples of the above-mentioned wheel module. The wheel 64 in the first embodiment and the modifications thereof is an example of the above-mentioned wheel. The motors 65 and 65D to 65H in the first embodiment and the modifications thereof are examples of the above-mentioned motor. The carriages 1 and 1A to 1G in the first embodiment and the modifications thereof are examples of the above-mentioned holding member. The brake devices 100 and 100A to 100H in the first embodiment and the modifications thereof are examples of the above-mentioned brake. The support plate 5 in the first embodiment and the modifications thereof are examples of the above-mentioned support member. The shafts 61 and 61A to 61H in the first embodiment and the modifications thereof are examples of the above-mentioned shaft.

For example, the wheel modules 1200, 2200, and 3200 in the second to fourth embodiments are examples of the above-mentioned wheel module. The wheel 1212 in the second to fourth embodiments is an example of the above-mentioned wheel. The motors 1213*i*, 2213*i*, and 3213*i* in the second to fourth embodiments are examples of the above-mentioned motor. The stators 1213*a*, 2213*a*, and 3123*a* in the second to fourth embodiments are examples of the above-mentioned stator. The housing member 1213*e* and the holding member 3213*e* in the second to fourth embodiments are examples of the above-mentioned holding member. The brake portion 1230 in the second to fourth embodiments are examples of the above-mentioned brake. The support plate 1220 in the second to fourth embodiments are examples of the above-mentioned support member. The rotating shafts 1213*c*, 2213*c*, and 3213*c* in the second to fourth embodiments are examples of the above-mentioned shaft.

It should be noted that the above-mentioned embodiments do not limit the present invention. The present invention also encompasses configurations provided by appropriately combining the above-mentioned components. Those skilled in the art can easily derive further effects and modifications. A wider mode of the present invention is not limited by the above-described embodiments and various changes can be made.

The invention claimed is:
1. A wheel module comprising:
a wheel on which a tire is mounted;
a motor that is arranged on an inner side of the wheel and includes a stator and a rotor;
a shaft that is fixed to the rotor coaxially with a rotation axis of the rotor and transmits rotation force of the rotor to the wheel;
a holding member that holds the stator; and
a brake that restricts rotation of the shaft, wherein
one end portion of the holding member in an axial direction of the rotation axis is fixed to and supported by a support member;
the brake is arranged on an opposite side to the wheel with the support member interposed between the brake and the wheel, the shaft extends to an inner portion of the brake while passing through through-holes formed in the one end portion of the holding member and the support member, the holding member is a housing accommodating therein the stator and the rotor, and supports the wheel in a rotatable manner through a first bearing mounted on the holding member, the stator supports the wheel in a rotatable manner through a second bearing mounted on the stator, and the first bearing has a diameter larger than a diameter of the second bearing.

2. The wheel module according to claim 1, wherein the brake includes:
   a first friction body that rotates together with the shaft;
   a second friction body that is arranged so as to be overlapped with the first friction body in a direction of a rotation axis of the shaft and mounted on a mounting member, and is restricted from rotating; and
   a switching mechanism that is capable of switching between a first state in which the first friction body and the second friction body are pressed against the mounting member and a second state in which pressure to the mounting member is released.

3. The wheel module according to claim 2, wherein the brake further includes:
   an armature that has magnetism and is arranged at a position at which the first friction body and the second friction body are interposed between the armature and the mounting member along the direction of the rotation axis;
   a biasing body that biases the armature to the mounting member side along the direction of the rotation axis;
   a cylindrical body that has a hollow hole penetrating in the direction of the rotation axis and causes the armature to move forward and backward in the direction of the rotation axis with magnetic force; and
   a plunger that is arranged in the hollow hole of the cylindrical body and has an end portion projecting from the hollow hole and subjected to screw processing.

4. The wheel module according to claim 3, wherein the switching mechanism is a lever or a wire member including a receiving portion that is screwed together with the end portion of the plunger, and switching, with rotational movement of the receiving portion, between the first state in which the plunger is pressed against the armature, the second state in which pressure to the armature by the plunger is released, and a third state in which the receiving portion is located at a position between the first state and the second state, and the biasing body biases the armature to the mounting member side in a non-conduction state whereas the magnetic force of the cylindrical body attracts the armature to the plunger side in a conduction state.

5. The wheel module according to claim 4, wherein
   the plunger is movable in a predetermined range in the direction of the rotation axis in the receiving portion of the lever or the wire member, and
   the armature is attracted with the magnetic force of the cylindrical body to cause the end portion of the plunger to shift in an opposite direction to a pressing direction against the armature in the third state of the lever or the wire member.

6. The wheel module according to claim 1, further comprising a magnetic sensor that is arranged on the rotation axis and detects an angle position of the motor.

7. The wheel module according to claim 6, further comprising a packing surrounding a substrate of the magnetic sensor.

8. The wheel module according to claim 1, wherein
   the first bearing mounted on one end portion in the axial direction and a second bearing mounted on the other end portion.

9. The wheel module according to claim 1, wherein the rotor is arranged on an inner side of the stator.

10. The wheel module according to claim 1, wherein the rotor is arranged on an outer side of the stator.

11. The wheel module according to claim 1, wherein the motor transmits rotation force generated by rotation of the rotor to the wheel through a gear mechanism.

12. The wheel module according to claim 1, wherein the motor transmits rotation force generated by rotation of the rotor directly to the wheel.

13. The wheel module according to claim 8, wherein
   the wheel is formed into a bottomed cylindrical shape having an opening on one side in the axial direction and a bottom portion on the other side, and
   the first bearing is a seal bearing and is mounted on the opening to closely seal a space on an inner side of the wheel.

14. The wheel module according to claim 1, wherein
   the wheel is formed into a bottomed cylindrical shape having an opening on one side in the axial direction and a bottom portion on the other side, and
   the first bearing is a seal bearing and is mounted on the opening to closely seal a space on an inner side of the wheel.

15. The wheel module according to claim 1, wherein the tire is mounted on the wheel in a detachable manner to the other side in the axial direction.

16. The wheel module according to claim 1, wherein the tire has a diameter of 100 to 300 mm.

* * * * *